United States Patent
Lee et al.

(10) Patent No.: US 12,459,556 B2
(45) Date of Patent: Nov. 4, 2025

(54) CORNER MODULE APPARATUS FOR VEHICLE

(71) Applicant: HYUNDAI MOBIS CO., LTD., Seoul (KR)

(72) Inventors: Tae Heon Lee, Yongin-si (KR); Won Hyok Choi, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 870 days.

(21) Appl. No.: 17/673,230

(22) Filed: Feb. 16, 2022

(65) Prior Publication Data

US 2023/0159086 A1    May 25, 2023

(30) Foreign Application Priority Data

Nov. 23, 2021   (KR) .......................... 10-2021-0162193

(51) Int. Cl.
 *B62D 5/04*   (2006.01)
 *B62D 21/11*  (2006.01)
 *B60G 11/58*  (2006.01)

(52) U.S. Cl.
 CPC ............ *B62D 5/0418* (2013.01); *B62D 21/11* (2013.01); *B60G 11/58* (2013.01)

(58) Field of Classification Search
 CPC ...... B62D 5/0418; B62D 21/11; B62D 7/159; B62D 7/1509; B62D 7/14; B60G 11/58; B60K 7/0007; B60K 2007/0038
 USPC ........................................................ 180/413
 See application file for complete search history.

(56) References Cited

U.S. PATENT DOCUMENTS

| | | | |
|---|---|---|---|
| 6,336,514 B1 | 1/2002 | Ramacher et al. | |
| 6,367,571 B1 * | 4/2002 | Schwarz .............. | B60K 7/0015 180/252 |
| 2015/0083508 A1 * | 3/2015 | Bluethmann ........ | B62D 5/0418 180/204 |
| 2019/0111803 A1 | 4/2019 | Ryu | |
| 2020/0207405 A1 * | 7/2020 | Kuribayashi ........... | B60G 3/18 |
| 2021/0023899 A1 | 1/2021 | Wuebbolt-Gorbatenko et al. | |
| 2021/0086822 A1 * | 3/2021 | Furuyoshi ............ | B62D 5/0484 |
| 2021/0316604 A1 | 10/2021 | Tao et al. | |

(Continued)

FOREIGN PATENT DOCUMENTS

| | | |
|---|---|---|
| CN | 105799503 A | 7/2016 |
| CN | 106739909 A | 5/2017 |
| CN | 108791477 A | 11/2018 |

(Continued)

OTHER PUBLICATIONS

Richard Crowder, Electric Drives and Electromechanical Systems, 2020, Butterworth-Heinemann, Second Edition, pp. 85-88 (Year: 2020).*

(Continued)

*Primary Examiner* — Valentin Neacsu
*Assistant Examiner* — Tyler Jay Stanley
(74) *Attorney, Agent, or Firm* — NSIP Law

(57) ABSTRACT

A corner module apparatus for a vehicle may include a driver configured to provide a driving force to a wheel of a vehicle, a suspension connected to the driver, and being configured to absorb shock transferred from a road surface, and a steering unit connected to the suspension, the steering unit rotatably installed under a frame module coupled to a vehicle body, and being configured to adjust a steering angle of the wheel.

7 Claims, 46 Drawing Sheets

(56) References Cited

U.S. PATENT DOCUMENTS

2022/0185096 A1* 6/2022 Ameye .................... B62D 7/06

FOREIGN PATENT DOCUMENTS

| CN | 113276939 A | 8/2021 |
|---|---|---|
| CN | 113460156 A | 10/2021 |
| DE | 197 11 381 A1 | 9/1998 |
| DE | 20 2014 000 755 U1 | 6/2015 |
| DE | 10 2015 212 580 A1 | 1/2017 |
| DE | 10 2017 001 060 A1 | 8/2018 |
| EP | 3 892 524 A1 | 10/2021 |
| EP | 3 909 831 A1 | 11/2021 |
| EP | 3 967 575 A1 | 3/2022 |
| EP | 4 000 970 A1 | 5/2022 |
| FR | 2 836 654 A1 | 9/2003 |
| JP | 2020-97257 A | 6/2020 |
| KR | 10-2019-0041855 A | 4/2019 |
| WO | WO 98/19875 A1 | 5/1998 |
| WO | WO 00/32462 A1 | 6/2000 |
| WO | WO 01/53141 A1 | 7/2001 |
| WO | WO 2008/128379 A1 | 10/2008 |
| WO | WO 2011/147648 A1 | 12/2011 |
| WO | WO 2019/185090 A1 | 10/2019 |
| WO | WO 2020/201984 A1 | 10/2020 |

OTHER PUBLICATIONS

Bottom—Definition by Merriam-Webster Online Dictionary. Retrieved from URL https://www.merriam-webster.com/dictionary/bottom on Apr. 9, 2025 (Year: 2025).*

Office Action, People's Republic of China, Jan. 26, 2025 (Original w/ English Translation) (Year: 2025).*

Extended European search report issued on Sep. 9, 2022, in counterpart European Patent Application No. 22157519.4 (14 pages in English).

Korean Office Action issued on Aug. 3, 2023, in counterpart Korean Patent Application No. 10-2021-0162193 (5 pages in Korean).

Chinese Office Action issued on Jan. 26, 2025 in corresponding Chinese Patent Application No. 202210152933.7 (8 pages in Korean).

* cited by examiner

CORNER MODULE APPARATUS FOR VEHICLE

CROSS-REFERENCE TO RELATED APPLICATION

This application claims the benefit under 35 USC § 119(a) of Korean Patent Application No. 10-2021-0162193, filed on Nov. 23, 2021, in the Korean Intellectual Property Office, the entire disclosure of which is incorporated herein by reference for all purposes.

BACKGROUND

1. Field

The following description relate to a corner module apparatus for a vehicle, and more particularly, to a corner module apparatus for a vehicle, in which driving, braking, steering and suspension systems are integrated.

2. Description of the Related Art

In general, an electric vehicle refers to an environment-friendly vehicle which discharges no exhaust gas. The electric vehicle includes a high voltage battery configured to supply energy for driving, and a driving motor configured to generate a rotational force from power outputted from the high voltage battery, and is driven by the rotational force of the motor, transferred to a wheel through a driving shaft.

Recently, a middle-stage power transmission unit such as a reducer or differential gear may be omitted to reduce the weight of the vehicle, and much attention is being paid to an in-wheel motor vehicle which includes a motor installed in a wheel in order to directly transfer power of the motor to the wheel, in consideration of an advantage of the in-wheel motor vehicle which can reduce an energy loss in a power transmission process. Furthermore, a wheel in which braking, steering and suspension systems as well as a driving system are integrated is being actively developed.

The related art of the present disclosure is disclosed in Korean Patent Application Publication No. 10-2019-0041855 published on Apr. 23, 2019 and entitled "Steering System of In-Wheel Motor Vehicle".

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, there is provided a corner module apparatus for a vehicle, including a driver configured to provide a driving force to a wheel of a vehicle, a suspension connected to the driver, and being configured to absorb shock transferred from a road surface, and a steering unit connected to the suspension, the steering unit rotatably installed under a frame module coupled to a vehicle body, and being configured to adjust a steering angle of the wheel.

The steering unit may include a steering body disposed to face a bottom surface of the frame module, and being configured to support the suspension unit, and a steering driver installed in the steering body, and being configured to rotatably support the steering body with respect to the frame module.

The steering driver may include a power generation module configured to receive power and generate a rotational force, a rotating module spaced apart from the power generation module, and being configured to rotate around the frame module based on the rotational force generated by the power generation module, and a power transmission module provided between the power generation module and the rotating module, and being configured to transmit the rotational force, generated by the power generation module, to the rotating module.

The power generation module may revolve around the rotating module, in response to the rotating module rotating around the frame module.

A center axis of the power generation module may be disposed in parallel to a center axis of the rotating module.

The rotating module may include a mounting unit fixed to the bottom surface of the frame module, an input shaft rotated by the rotational force received from the power transmission module, an output shaft rotatably supported by the mounting unit, and being configured to rotate the steering body around the mounting unit based on a rotation of the input shaft, and a reducer provided between the input shaft and the output shaft.

A center axis of the rotating module may be disposed on a same plane as a center plane of the wheel.

The reducer may include a strain wave gear.

The steering driver may include a measurement module fixed to the mounting unit, and being configured to measure a rotation angle of the rotating module.

The rotating module may include a rotating module body installed to be rotatable relative to the mounting unit, and rotated with the output shaft, and a steering guide extended from the rotating module body, and being configured to rotate an inner diameter part of the measurement module in connection with a rotation of the rotating module body.

The power transmission module may be moved in a caterpillar manner between the power generation module and the rotating module.

Other features and aspects will be apparent from the following detailed description, the drawings, and the claims.

DETAILED DESCRIPTION OF THE ILLUSTRATED EMBODIMENTS

Figure 1:
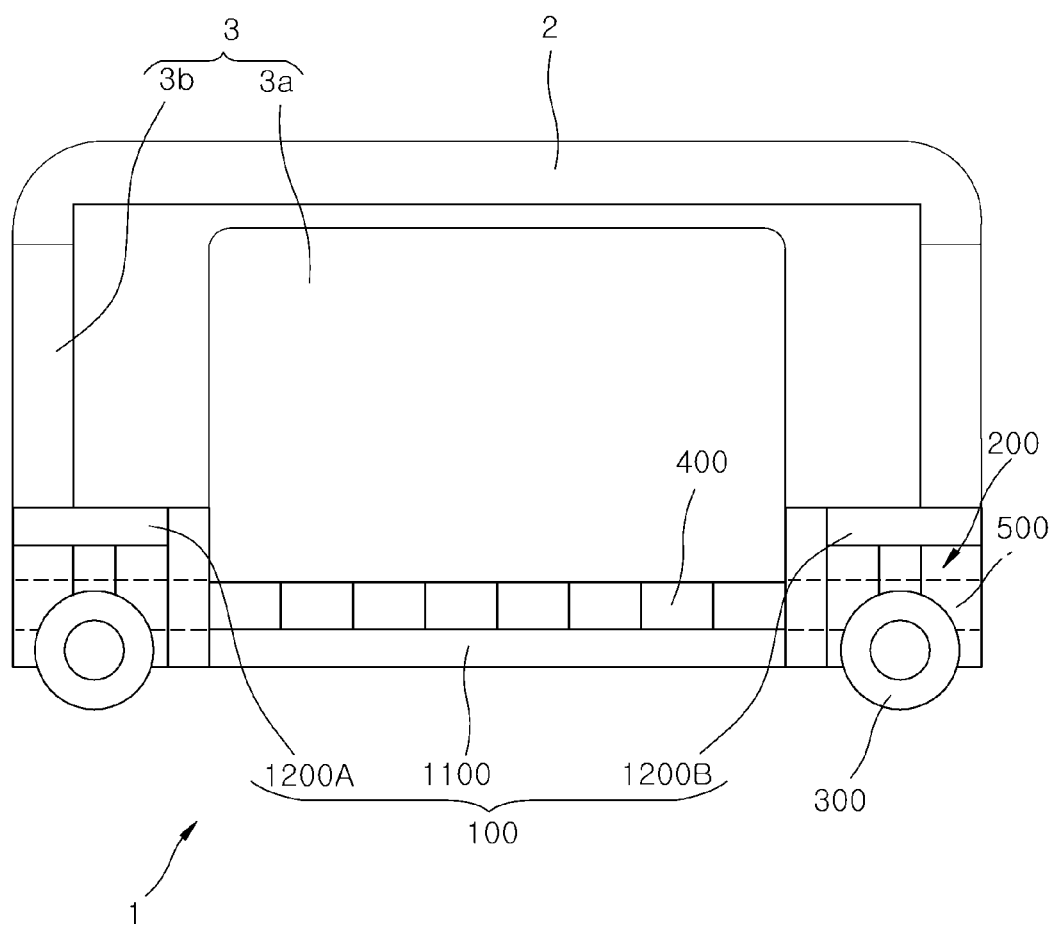
FIG. 1 is a front view schematically illustrating a configuration of a vehicle including a corner module apparatus for a vehicle in accordance with an embodiment of the present disclosure.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

It should be noted that the drawings are not to precise scale and may be exaggerated in thickness of lines or sizes of components for descriptive convenience and clarity only. Furthermore, the terms as used herein are defined by taking functions of the invention into account and can be changed according to the custom or intention of users or operators. Therefore, definition of the terms should be made according to the overall disclosures set forth herein.

The terminology used herein is for the purpose of describing particular examples only and is not to be limiting of the examples. The singular forms "a", "an", and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

Throughout the specification, when one element is referred to as being "connected to" or "coupled to" another element, it may indicate that the elements are "directly connected or coupled to" each other or the elements are "indirectly connected or coupled to" each other with still another element interposed therebetween. In this specification, when an element "includes or has" a component, it may indicate that the element does not exclude another component unless referred to the contrary, but can further "include or have" another component.

Through this specification, like reference numerals may represent the same components. Although like or similar reference numbers are not mentioned or described in a specific drawing, the reference numerals may be described with reference to other drawings. Furthermore, although a component is not represented by a reference numeral in a specific drawing, the component may be described with reference to other drawings. Furthermore, the number, shape and size of subcomponents included in the drawings of this application and the relative difference between sizes are set for convenience of description, and may not limit embodiments but may be set to various values.

I. Structure of Vehicle Including Corner Module Apparatus for Vehicle

Figure 2:
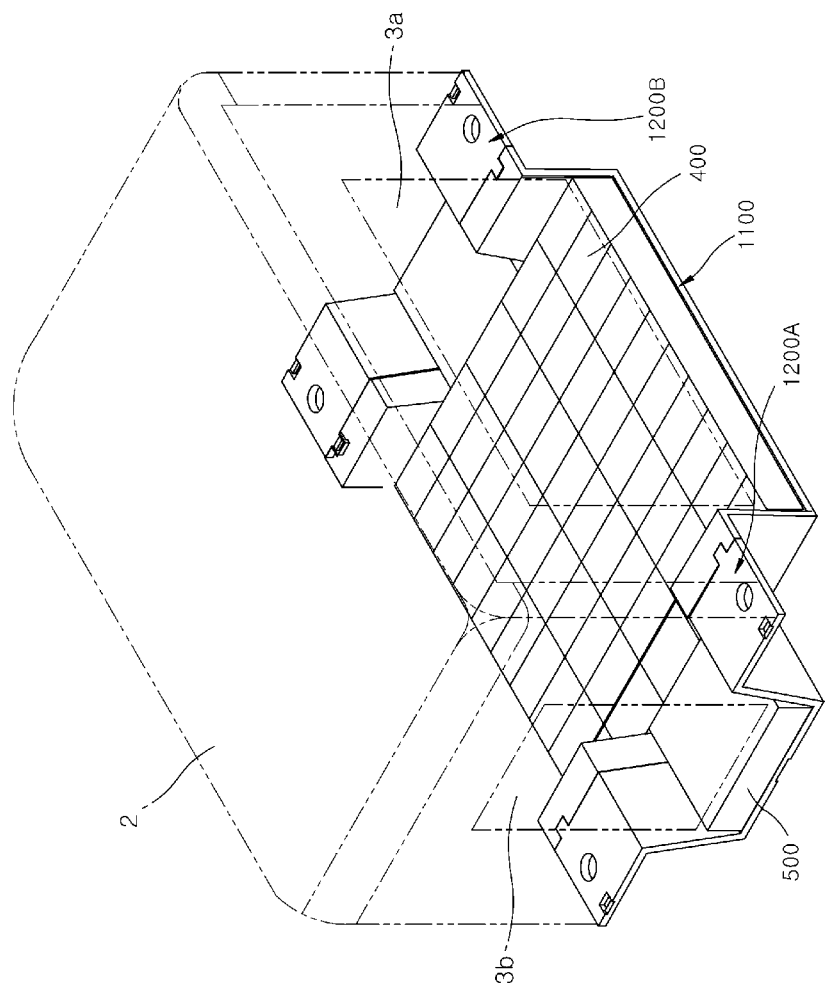
FIG. 2 is a perspective view schematically illustrating the configuration of the vehicle including a corner module apparatus for a vehicle in accordance with the embodiment of the present disclosure.

FIG. 1 is a diagram schematically illustrating a configuration of a vehicle including a corner module apparatus for a vehicle in accordance with an embodiment of the present disclosure, and FIG. 2 is a perspective view schematically illustrating the configuration of the vehicle including a corner module apparatus for a vehicle in accordance with the embodiment of the present disclosure.

Referring to FIGS. 1 and 2, the vehicle including the corner module apparatus for a vehicle in accordance with the embodiment of the present disclosure includes a corner module apparatus 1, a top hat 2 and a door part 3.

The corner module apparatus 1 for a vehicle in accordance with the embodiment of the present disclosure includes a frame module 100 and a corner module 200.

The frame module 100 is installed at the bottom of a vehicle body, and supports the corner module 200, a battery 400 and an inverter 500.

Referring to FIG. 2, the frame module 100 in accordance with the embodiment of the present disclosure includes a main platform 1100, a first corner module platform 1200A and a second corner module platform 1200B.

The main platform 1100 is installed at the bottom of the vehicle body, and has the battery 400 mounted therein, the battery 400 serving to supply power to the corner module 200 which will be described below. The main platform 1100 may be made of a high-stiffness material such as metal, in order to sufficiently withstand a load applied from the battery 400. The battery 400 has a smaller height than the main platform 1100.

Figure 3:
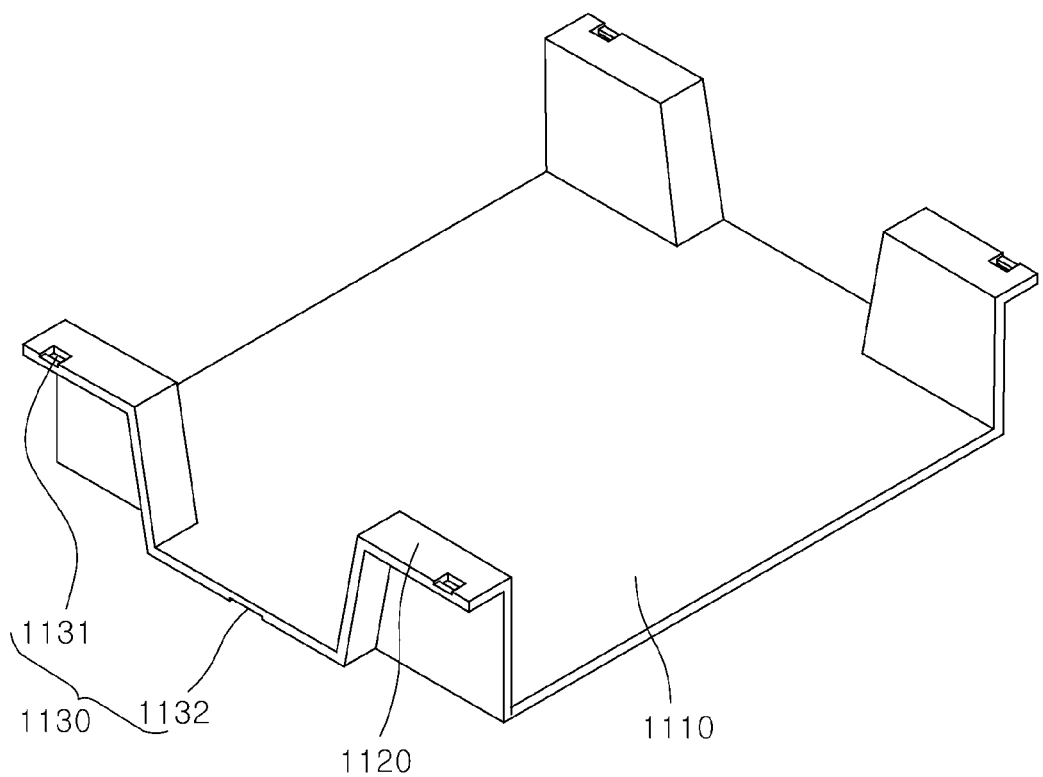
FIG. 3 is a perspective view schematically illustrating a configuration of a main platform in accordance with an embodiment of the present disclosure.

FIG. 3 is a perspective view schematically illustrating a configuration of the main platform 1100 in accordance with an embodiment of the present disclosure.

Referring to FIG. 3, the main platform 1100 in accordance with the embodiment of the present disclosure includes a main plate 1110, a main wheel housing 1120 and a main fastener 1130.

The main plate 1110 forms the exterior of the central portion of the main platform 1100, and supports the entire main wheel housings 1120 which will be described below. The main plate 1110 in accordance with the embodiment of the present disclosure may be formed in a flat plate shape and disposed in parallel to the ground surface. The battery 400 is seated on the top surface of the main plate 1110, and the inverter 500 may be seated on the top surface of the main plate 1110, if necessary. The area of the main plate 1110 may be varied in design depending on the size of the vehicle body, the size of the battery 400 and the like.

The main wheel housing 1120 is extended from the main plate 1110, and provides a space in which the corner module 200 is housed. The main wheel housing 1120 in accordance with the embodiment of the present disclosure may have a pillar shape which is vertically extended upward from the top surface of the main plate 1110. More specifically, the main wheel housing 1120 is disposed at each corner of the main plate 1110, and has an open outer surface. For example, the main wheel housing 1120 may have an approximately L-shaped cross-section as illustrated in FIG. 3, and may be extended from the top surface of the corresponding corner of the main plate 1110. Thus, the main wheel housing 1120 may have an internal space in which the corner module 200 is housed.

An upper end portion of the main wheel housing 1120 has a plate shape disposed in parallel to the main plate 1110. Thus, the upper end portion of the main wheel housing 1120 may have a space in which the main fastener 1130 to be described below may be formed.

The main wheel housing 1120 may be provided as a plurality of main wheel housings. The plurality of main wheel housings 1120 may be disposed at the respective corners of the main plate 1110.

The main fastener 1130 is formed in the main plate 1110 and the main wheel housing 1120, and fastened to a second platform 1200 which will be described below.

Figure 4:
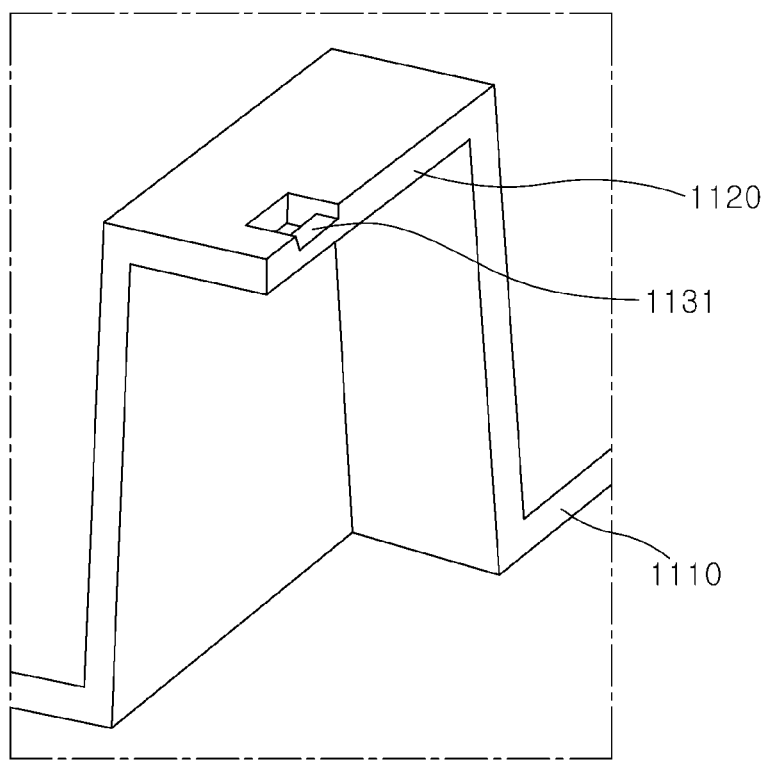
FIGS. 4 and 5 are expanded views schematically illustrating a configuration of a main fastener in accordance with an embodiment of the present disclosure.
Figure 5:
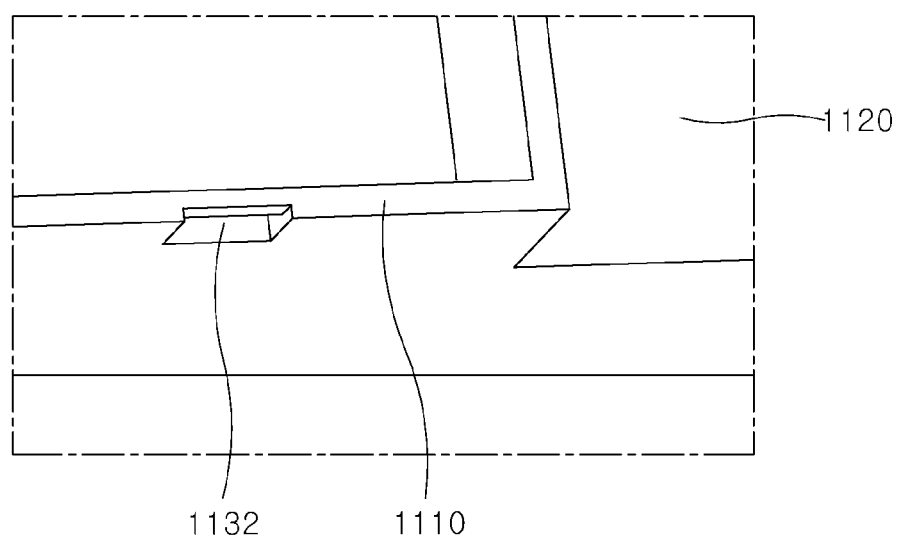

FIGS. 4 and 5 are expanded views schematically illustrating a configuration of the main fastener in accordance with an embodiment of the present disclosure.

Referring to FIGS. 3 to 5, the main fastener 1130 in accordance with the embodiment of the present disclosure includes an upper main fastener 1131 and a lower main fastener 1132.

The upper main fastener 1131 in accordance with the embodiment of the present disclosure may have a groove shape which is formed concavely from the outer surface of the main wheel housing 1120. The upper main fastener 1131 is vertically extended downward from the top surface of the main wheel housing 1120. The upper main fastener 1131 may have a stair-shaped cross-section so as to be hooked and coupled to a first corner module upper fastener 1231A and a second corner module upper fastener 1231B, which will be described below. The upper main fastener 1131 is disposed at an end of the main wheel housing 1120 facing the first corner module platform 1200A or the second corner module platform 1200B which will be described below. The upper main fastener 1131 may be provided as a plurality of upper main fasteners which are disposed at the respective main wheel housings 1120.

The lower main fastener 1132 in accordance with the embodiment of the present disclosure may have a groove shape which is formed concavely from the outer surface of the main plate 1110. The lower main fastener 1132 may have a stair-shaped cross-section so as to be hooked and coupled to a first corner module lower fastener 1232A and a second corner module lower fastener 1232B, which will be described below.

The lower main fastener 1132 is extended in the opposite direction of the upper main fastener 1131. More specifically, the lower main fastener 1132 is vertically extended upward from the bottom surface of the main plate 1110. Thus, when fastened to a first corner module fastener 1230A and a second corner module fastener 1230B which will be described below, the upper main fastener 1131 and the lower main fastener 1132 may prevent the first and second corner module fasteners 1230A and 1230B from separating in any one direction.

The lower main fastener 1132 is provided as a pair of lower main fasteners which are disposed at ends of the main plate 1110, facing the first and second corner module platforms 1200A and 1200B described below, respectively.

The first and second corner module platforms 1200A and 1200B are detachably coupled to both sides of the main platform 1100, respectively. The corner module 200 which will be described below is coupled to the bottoms of the first and second corner module platforms 1200A and 1200B, such that the first and second corner module platforms 1200A and 1200B support the corner module 200. The first and second corner module platforms 1200A and 1200B each have the corner module 200 and the inverter 500 mounted therein, the inverter 500 serving to convert DC power supplied from the battery 400 into AC power, and transfer the AC power to the corner module 200. The inverter 500 has a smaller height than the first corner module platform 1200A of a first corner module plate 1210A. The first and second corner module platforms 1200A and 1200B may be made of a high-stiffness material such as metal so as to sufficiently withstand a load applied from the corner module 200 and the battery 400.

Figure 6:
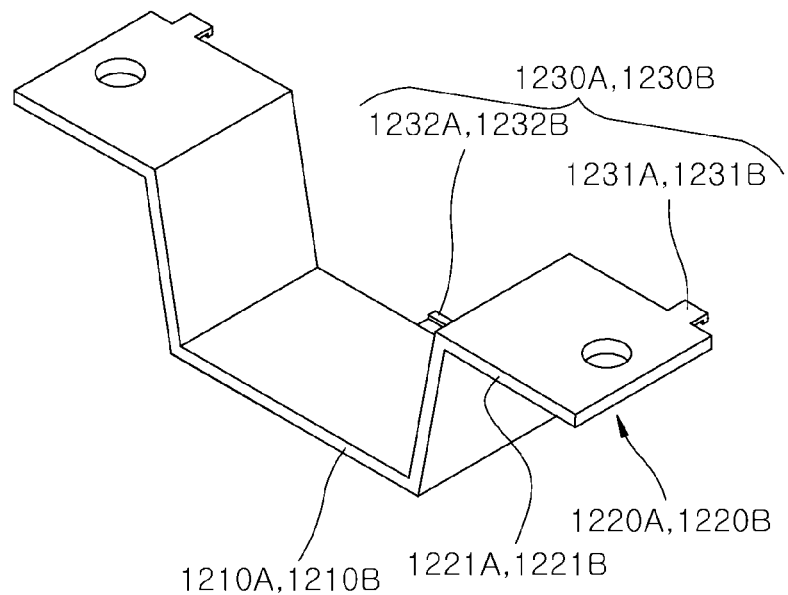
FIG. 6 is a perspective view schematically illustrating configurations of a first corner module platform and a second corner module platform in accordance with an embodiment of the present disclosure.

FIG. 6 is a perspective view schematically illustrating configurations of the first corner module platform and the second corner module platform in accordance with an embodiment of the present disclosure.

Referring to FIG. 6, the first corner module platform 1200A in accordance with the embodiment of the present disclosure includes the first corner module plate 1210A, a first corner module wheel housing 1220A and the first corner module fastener 1230A.

The first corner module plate 1210A forms the exterior of the central portion of the first corner module platform 1200A, and supports the entire first corner module wheel housing 1220A which will be described below. The first corner module plate 1210A in accordance with the embodiment of the present disclosure may be formed in a flat plate shape and disposed in parallel to the ground surface. The inverter 500 may be seated on the top surface of the first corner module plate 1210A, and the battery 400 may be seated on the top surface of the first corner module plate 1210A, if necessary. The area of the first corner module plate 1210A may be varied in design, depending on the sizes of the main plate 1110 and the inverter 500.

The first corner module wheel housing 1220A is extended from the first corner module plate 1210A, and provides a space in which the corner module 200 is housed. The first corner module wheel housing 1220A in accordance with the embodiment of the present disclosure may have a plate shape which is extended upward from the top surface of the main plate 1110. The first corner module wheel housing 1220A may be provided as a pair of first corner module wheel housings which are disposed at widthwise ends of the first corner module plate 1210A, respectively.

The first corner module wheel housing 1220A has a first mounting plate 1221A to support the corner module 200. The first mounting plate 1221A may have a plate shape which is extended from an upper end of the first corner module wheel housing 1220A in the widthwise direction of the first corner module plate 1210A. The first mounting plate 1221A is disposed in parallel to the first corner module plate 1210A. The bottom surface of the first mounting plate 1221A is detachably coupled to the corner module 200 through bolting or the like.

In this case, the first corner module wheel housing 1220A may have an approximately L-shaped cross-section as illustrated in FIG. 6, and may be extended to the outside of the first corner module plate 1210A in the widthwise direction. Thus, the first corner module wheel housing 1220A may have an internal space in which the corner module 200 is housed.

The first corner module fastener 1230A is formed on the first corner module plate 1210A and the first corner module wheel housing 1220A, and fastened to the main fastener 1130 disposed on one side of the main platform 1110. When the main platform 1100 and the first corner module platform 1200A are assembled, the first corner module fastener 1230A is disposed at a position facing the main fastener 1130 disposed on one side of the main platform 1110. As the first corner module platform 1200A is brought into contact with the main platform 1100 in a direction parallel to the longitudinal direction of the vehicle, the first corner module fastener 1230A is hooked and coupled to the main fastener 1130 disposed on one side of the main platform 1110. Thus, the main fastener 1130 and the first corner module fastener 1230A may improve the assembly performance between the main platform 1100 and the first corner module platform 1200A.

Figure 7:
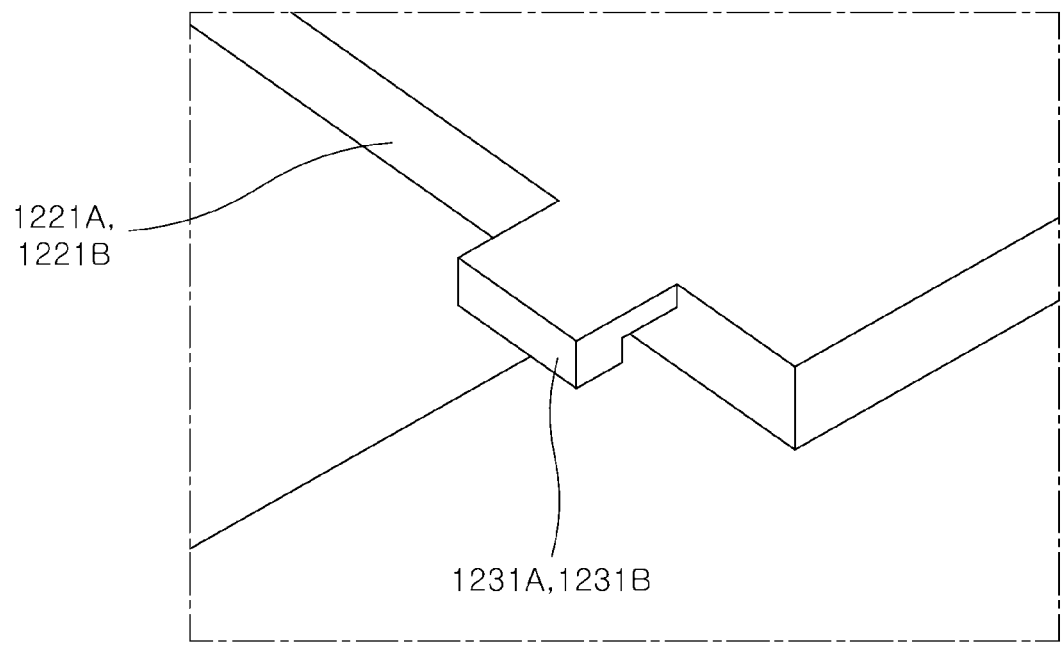
FIGS. 7 and 8 are expanded views schematically illustrating configurations of first and second corner module fasteners in accordance with the embodiment of the present disclosure.
Figure 8:
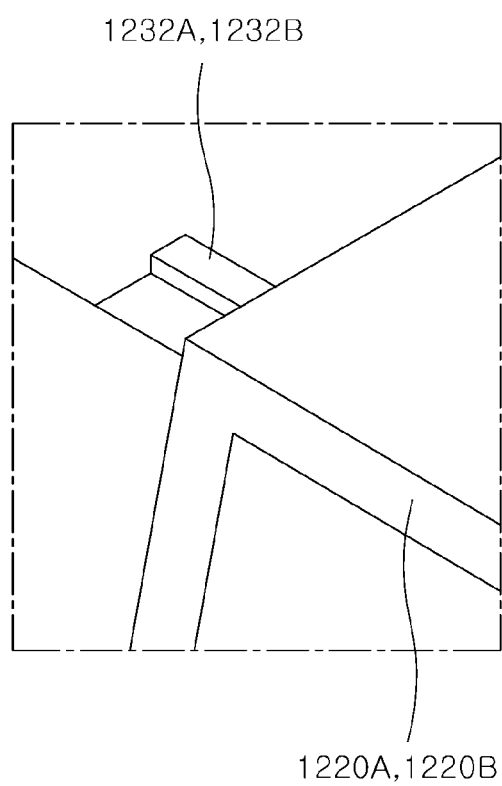

FIGS. 7 and 8 are expanded views schematically illustrating configurations of the first and second corner module fasteners in accordance with an embodiment of the present disclosure.

Referring to FIGS. 6 to 8, the first corner module fastener 1230A in accordance with the embodiment of the present disclosure includes the first corner module upper fastener 1231A and the first corner module lower fastener 1232A.

The first corner module upper fastener 1231A in accordance with the embodiment of the present disclosure may have a protrusion shape that protrudes from the outer surface of the first corner module wheel housing 1220A. More specifically, the first corner module upper fastener 1231A is horizontally extended from a front or rear end of the first mounting plate 1221A, or more specifically an end facing one end of the main platform 1100. As the first corner module platform 1200A is brought into contact with the main platform 1100 in the direction parallel to the longitudinal direction of the vehicle, the first corner module upper fastener 1231A is inserted into the upper main fastener 1131 disposed on one side of the main platform 1110. In this case, the first corner module upper fastener 1231A may have an end bent in a hook shape, and thus may be hooked and coupled to the upper main fastener 1131 disposed on the one side of the main platform 1100. The first corner module upper fastener 1231A may be provided as a plurality of first corner module upper fasteners which are disposed at the respective first corner module wheel housings 1220A.

The first corner module lower fastener 1232A in accordance with the embodiment of the present disclosure may have a protrusion shape that protrudes from the outer surface of the first corner module plate 1210A. More specifically, the first corner module lower fastener 1232A is horizontally extended from any one end of front and rear ends of the first corner module plate 1210A, or more specifically an end facing the one end of the main platform 1100. As the first corner module platform 1200A is brought into contact with the main platform 1100 in the direction parallel to the longitudinal direction of the vehicle, the first corner module lower fastener 1232A is inserted into the lower main fastener 1132 disposed on the one side of the main platform 1110.

The first corner module lower fastener 1232A may have an end bent in a hook shape, and thus may be hooked and coupled to the lower main fastener 1132. In this case, the end of the first corner module lower fastener 1232A is bent in the opposite direction to the end of the first corner module upper fastener 1231A. For example, the end of the first corner module upper fastener 1231A may be bent downward, and the end of the first corner module lower fastener 1232A may be bent upward. Thus, when fastened to the main fastener 1130, the first corner module upper fastener 1231A and the first corner module lower fastener 1232A may prevent the upper main fastener 1131 and the lower main fastener 1132 from separating in any one direction.

The second corner module platform 1200B in accordance with the embodiment of the present disclosure includes a second corner module plate 1210B, a second corner module wheel housing 1220B and the second corner module fastener 1230B.

The second corner module plate 1210B and the second corner module wheel housing 1220B may have the same shapes as the first corner module plate 1210A and the second corner module wheel housing 1220A, respectively, which are described above.

The second corner module fastener 1230B is formed on the second corner module plate 1210B and the second corner module wheel housing 1220B, and fastened to the main fastener 1130 disposed on the other side of the main platform 1110. When the main platform 1100 and the second corner module platform 1200B are assembled, the second corner module fastener 1230B is disposed at a position facing the main fastener 1130 disposed on the other side of the main platform 1110. As the second corner module platform 1200B is brought into contact with the main platform 1100 in the direction parallel to the longitudinal direction of the vehicle, the second corner module fastener 1230B is hooked and coupled to the main fastener 1130 disposed on the other side of the main platform 1110.

The second corner module fastener 1230B in accordance with the embodiment of the present disclosure includes the second corner module upper fastener 1231B and the second corner module lower fastener 1232B.

The second corner module upper fastener 1231B in accordance with the embodiment of the present disclosure may have a protrusion shape that protrudes from the outer surface of the second corner module wheel housing 1220B. More specifically, the second corner module upper fastener 1231B is horizontally extended from a front or rear end of a second mounting plate 1221B, or more specifically an end facing the other end of the main platform 1100. As the second corner module platform 1200B is brought into contact with the main platform 1100 in the direction parallel to the longitudinal direction of the vehicle, the second corner module upper fastener 1231B is inserted into the upper main fastener 1131 disposed on one side of the main platform 1110. In this case, the second corner module upper fastener 1231B may have an end bent in a hook shape, and thus may be hooked and coupled to the upper main fastener 1131 disposed on the one side of the main platform 1100. The second corner module upper fastener 1231B may be provided as a plurality of first corner module upper fasteners which are disposed at the respective second corner module wheel housings 1220B.

The second corner module lower fastener 1232B in accordance with the embodiment of the present disclosure may have a protrusion shape that protrudes from the outer surface of the second corner module plate 1210B. More specifically, the second corner module lower fastener 1232B is horizontally extended from any one end of front rear ends of the second corner module plate 1210B, or more specifically an end facing the other end of the main platform 1100. As the second corner module platform 1200B is brought into contact with the main platform 1100 in the direction parallel to the longitudinal direction of the vehicle, the second corner module lower fastener 1232B is inserted into the lower main fastener 1132 disposed on the other side of the main platform 1110.

The second corner module lower fastener 1232B may have an end bent in a hook shape, and thus may be hooked and coupled to the lower main fastener 1132. In this case, the end of the second corner module lower fastener 1232B is bent in the opposite direction to the end of the second corner module upper fastener 1231B. For example, the end of the second corner module upper fastener 1231B may be bent downward, and the end of the second corner module lower fastener 1232B may be bent upward. Thus, when fastened to the main fastener 1130, the second corner module upper fastener 1231B and the second corner module lower fastener 1232B may prevent the upper main fastener 1131 and the lower main fastener 1132 from separating in any one direction.

The corner module 200 is supported by the frame module 100 and connected to a wheel 300 of the vehicle, and serve to perform overall operations such as driving, braking, steering and suspension operations. The corner module 200 may be provided as a plurality of corner modules which are connected to the respective wheels 300. The plurality of corner modules 200 may each independently perform a driving, braking, steering or suspension operation on the corresponding wheel 300.

Figure 9:
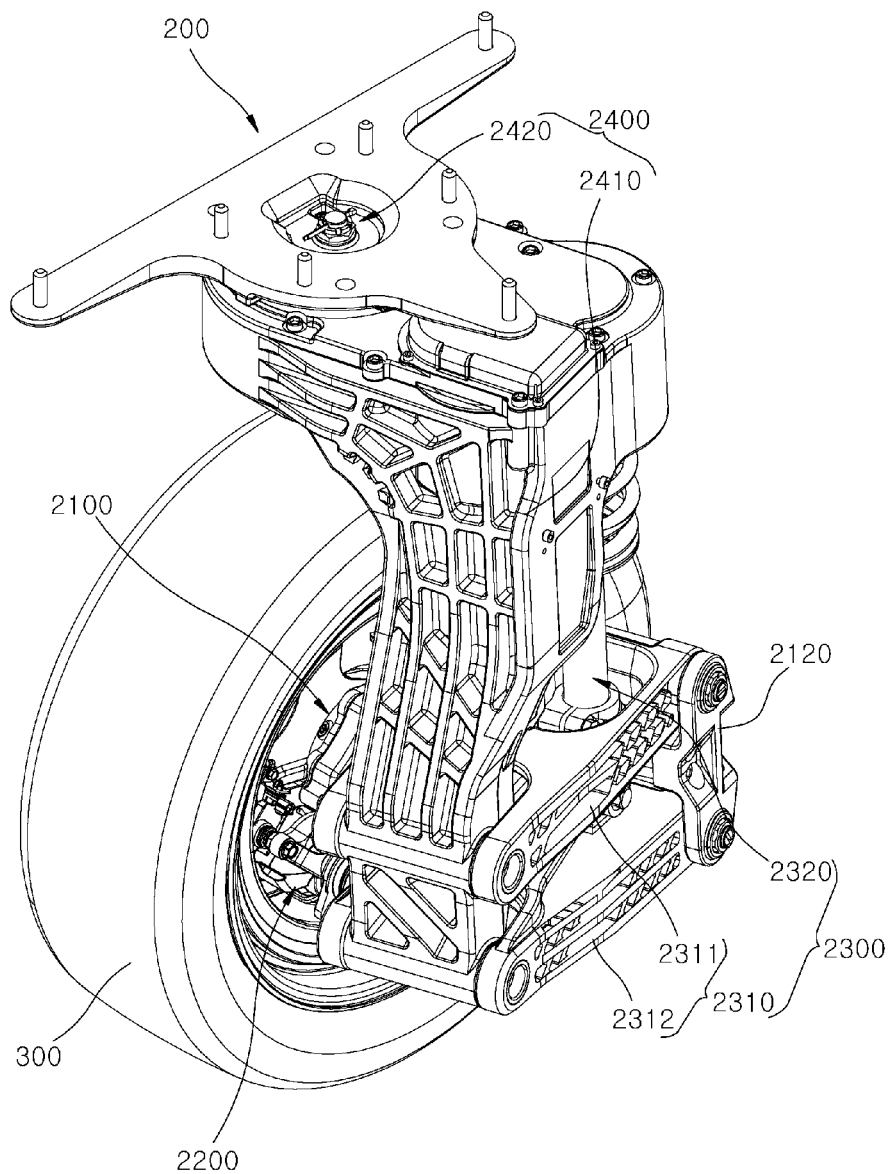
FIG. 9 is a perspective view schematically illustrating a configuration of a corner module in accordance with an embodiment of the present disclosure.
Figure 10:
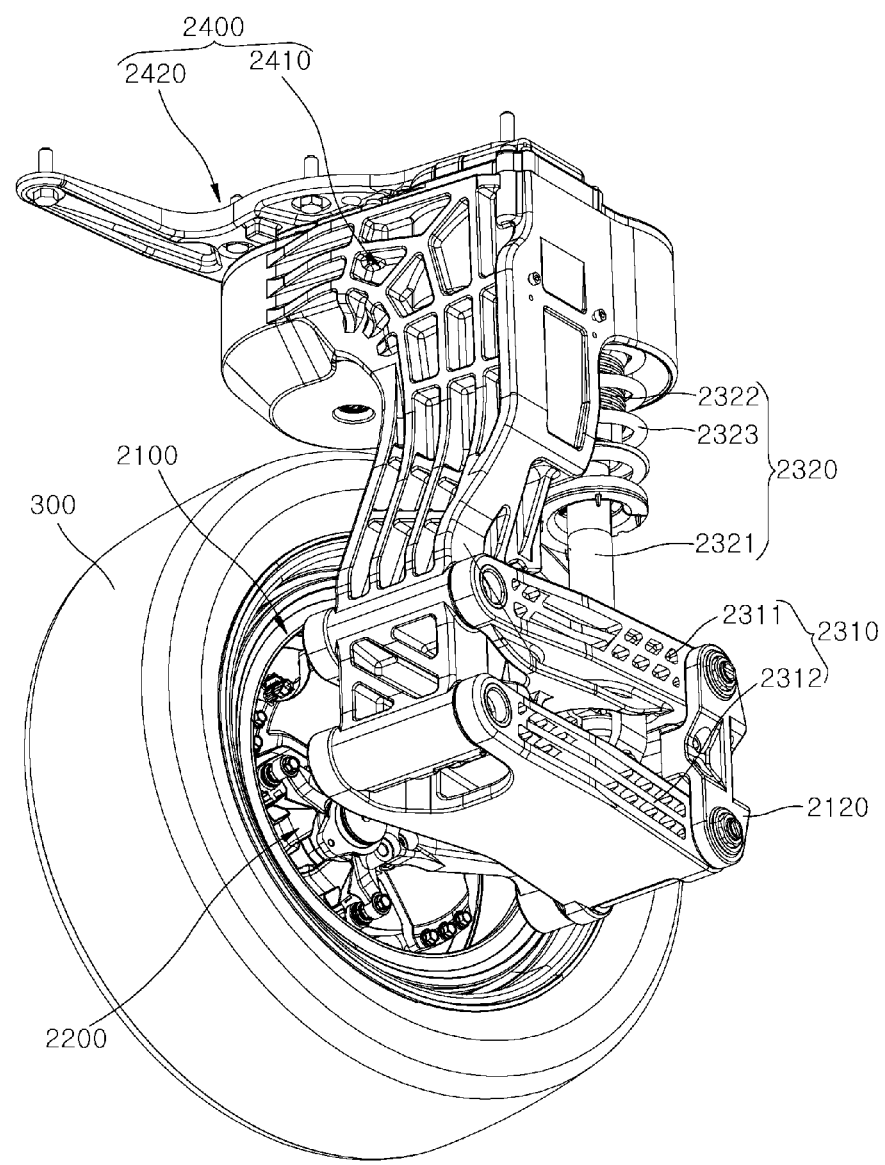
FIG. 10 is a perspective view illustrating the configuration of the corner module in accordance with the embodiment of the present disclosure, when seen from a different point of view from FIG. 9.
Figure 11:
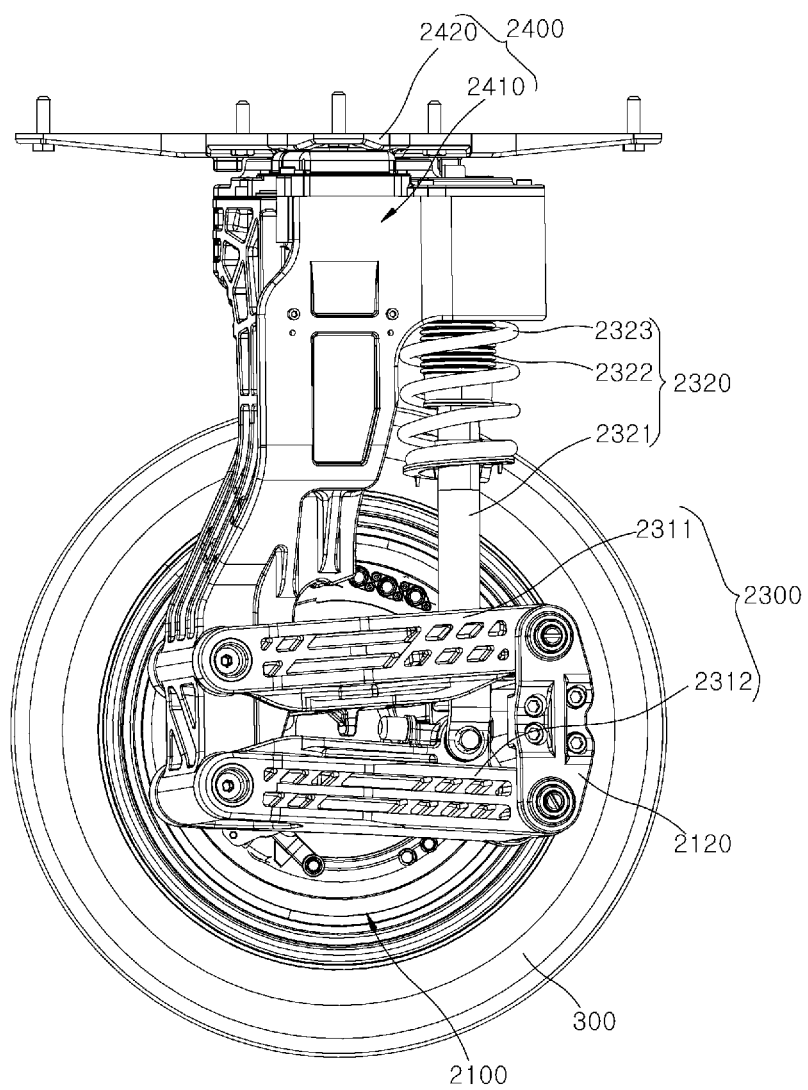
FIG. 11 is a front view schematically illustrating the configuration of the corner module in accordance with the embodiment of the present disclosure.
Figure 12:
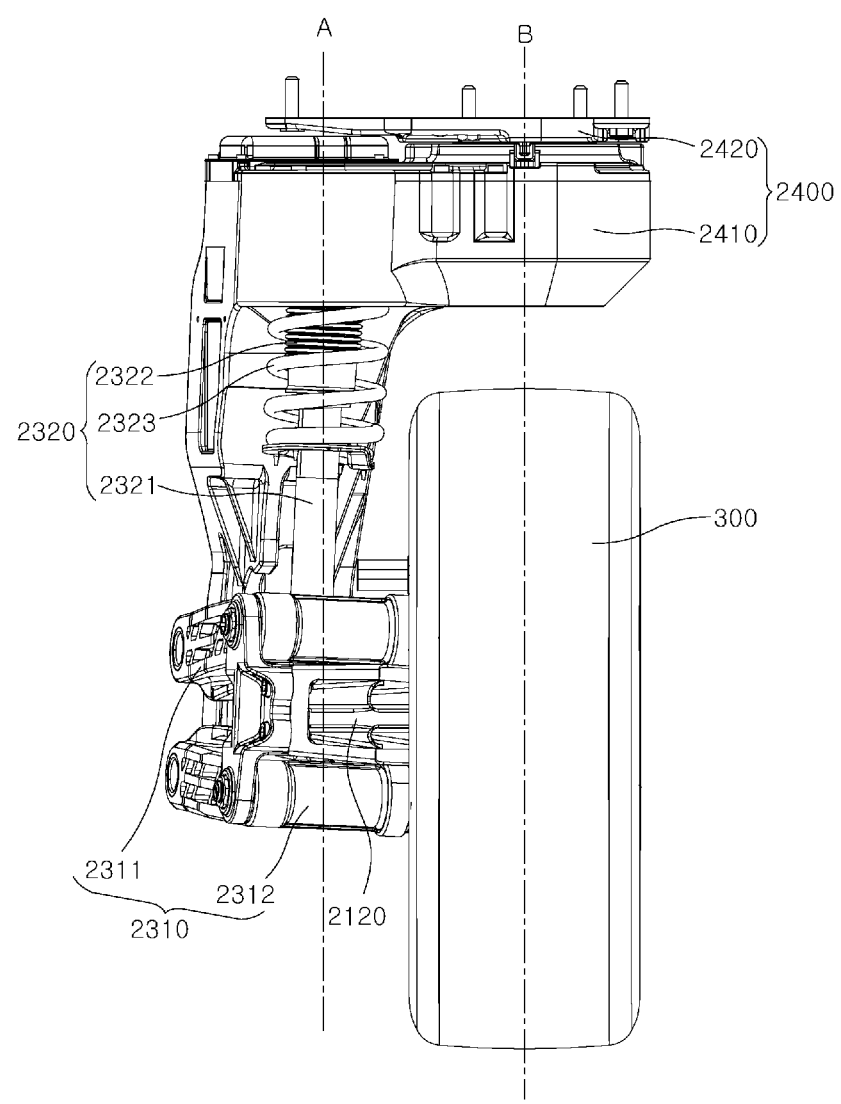
FIG. 12 is a side view schematically illustrating the configuration of the corner module in accordance with the embodiment of the present disclosure.
Figure 13:
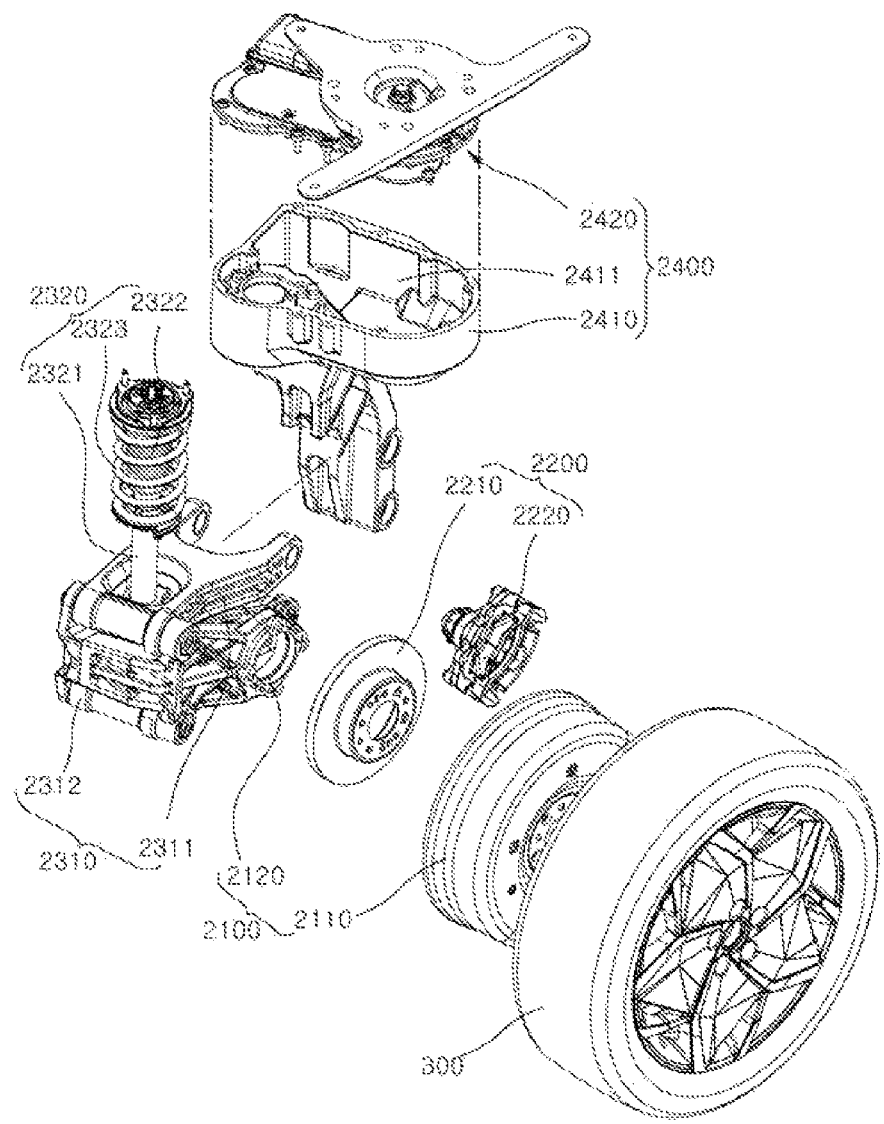
FIG. 13 is an exploded perspective view schematically illustrating the configuration of the corner module in accordance with the embodiment of the present disclosure.

FIG. 9 is a perspective view schematically illustrating a configuration of the corner module in accordance with an embodiment of the present disclosure, FIG. 10 is a perspective view illustrating the configuration of the corner module in accordance with the embodiment of the present disclosure, when seen from a different point of view from FIG. 9, FIG. 11 is a front view schematically illustrating the configuration of the corner module in accordance with the embodiment of the present disclosure, FIG. 12 is a side view schematically illustrating the configuration of the corner module in accordance with an embodiment of the present disclosure, and FIG. 13 is an exploded perspective view schematically illustrating the configuration of the corner module in accordance with the embodiment of the present disclosure.

Referring to FIGS. 9 to 13, the corner module 200 in accordance with the embodiment of the present disclosure includes a driving unit 2100 (may also be referred to as a "driver'), a braking unit 2200, a suspension unit 2300 and a steering unit 2400.

The driving unit 2100 rotates the wheel 300 by providing a driving force to the wheel 300.

The driving unit 2100 in accordance with the embodiment of the present disclosure includes an in-wheel motor 2110 and a knuckle 2120.

The in-wheel motor 2110 is installed inside the wheel 300 and serves to generate a driving force. The in-wheel motor 2110 in accordance with the embodiment of the present disclosure may include a stator and a rotor. The stator is fixed to the inside of the wheel 300, and serves to form a magnetic field by using power received from the battery 400, and the rotor is rotatably installed inside the wheel 300, and serves to rotate the wheel 300 through an electromagnetic interaction with the stator. The stator and the rotor may be disposed so that the center axes thereof are located on the same line as the center axis of the wheel 300 and the stator and the rotor are concentrically stacked inside the wheel 300.

The knuckle 2120 is coupled to the in-wheel motor 2110, and provides a mechanical connection between the driving unit 2100, and the braking unit 2200 and the suspension unit 2300, which will be described below. The knuckle 2120 in accordance with the embodiment of the present disclosure may be coupled to the stator of the in-wheel motor 2110 through bolting or the like, and supported by the stator. The knuckle 2120 may rotatably support the rotor of the in-wheel motor 2110 through a wheel bearing or the like. The knuckle 2120 may be manufactured through a casting process using a metallic material, in order to secure sufficient stiffness. The shape of the knuckle 2120 is not limited to that illustrated in FIG. 13, but may be varied in design as long as the knuckle 2120 can support the in-wheel motor 2110.

The braking unit 2200 serves to apply a braking force by interfering with the rotation of the wheel 300, or remove the braking force.

The braking unit 2200 in accordance with the embodiment of the present disclosure includes a brake disk 2210 and a brake caliper 2220.

The brake disk 2210 is connected to the wheel 300 or the in-wheel motor 2110, and rotated in connection with the rotation of the wheel 300. The brake disk 2210 in accordance with the embodiment of the present disclosure is formed in a disk shape and installed inside the wheel 300. The brake disk 2210 is disposed so that the center axis thereof is located on the same line as the center axis of the wheel 300. The brake disk 2210 may be connected to the wheel 300 or the rotor of the in-wheel motor 2110 through bolting or the like. Thus, the brake disk 2210 may be rotated about the center axis thereof with the wheel 300, when the wheel 300 is rotated. The diameter of the brake disk 2210 may be varied in design depending on the diameter of the wheel 300 and the size of the in-wheel motor 2110.

The brake caliper 2220 serves to apply a braking force by pressing the brake disk 2210 during a braking operation of the vehicle. The brake caliper 2220 in accordance with the embodiment of the present disclosure may include a brake pad, a caliper housing and a piston. The brake pad may be disposed to face the brake disk 2210. The caliper housing may be coupled to the knuckle 2120, and movably support the brake pad. The piston may be installed in the caliper housing so as to move forward and backward, and serve to press the brake pad against the brake disk 2210 or separate the brake pad from the brake disk 2210, according to the moving direction.

The suspension unit 2300 is connected to the driving unit 2100, and serves to absorb shock transferred from the road surface when the vehicle is driven.

The suspension unit 2300 in accordance with the embodiment of the present disclosure includes a suspension arm 2310 and a shock absorber module 2320.

The suspension arm 2310 is provided between the driving unit 2100 and the steering unit 2400 described below, and serves to support the wheel 300. More specifically, the suspension arm 2310 connects the wheel 300 to the vehicle body, and simultaneously absorbs a load, applied from the wheel 300 during driving of the vehicle, through the stiffness thereof, and serves to adjust the motion of the wheel 300.

The suspension arm 2310 in accordance with the embodiment of the present disclosure may include a first arm 2311 and a second arm 2312.

The first arm 2311 and the second arm 2312 each have one end rotatably connected to a steering body 2410 of the steering unit 2400 and the other end rotatably connected to the knuckle 2120 of the driving unit 2100. In this case, the first arm 2311 and the second arm 2312 may be rotatably coupled to the steering body 2410 and the knuckle 2120 through a bush, ball joint, pin or the like. The first arm 2311 and the second arm 2312 are spaced apart from each other in a top-to-bottom direction so as to face each other. The first arm 2311 and the second arm 2312 may have a double wishbone shape. Thus, the first arm 2311 and the second arm 2312 may establish a negative camber set-up of the wheel 300, thereby improving the cornering performance of the vehicle, and establishing a low floor set-up capable of lowering the height of the vehicle. The first arm 2311 and the second arm 2312 may be inclined to form a predetermined angle therebetween. Thus, the length and center of an SVSA (Side View Swing Arm), corresponding to the type and driving condition of the vehicle, may be set through the relative angle between the first and second arms 2311 and 2312.

The shock absorber module 2320 is provided stretchably in a longitudinal direction, and serves to absorb shock or vibration transferred from the road surface to the vehicle body through the wheel 300. The shock absorber module 2320 in accordance with the embodiment of the present disclosure includes a cylinder 2321, a rod 2322 and an elastic body 2323.

The cylinder 2321 is extended in the top-to-bottom direction, and filled with fluid. The cylinder 2321 may have a lower end which is rotatably connected to the top surface of the second arm 2312 through the first arm 2311.

The rod 2322 is extended in the longitudinal direction of the cylinder 2321. The bottom of the rod 2322 is inserted into the upper end of the cylinder 2321, such that the rod 2322 can slide in the longitudinal direction of the cylinder 2321. The top of the rod 2322 is coupled to the steering body 2410 through bolting or the like. The rod 2322 is slid in the longitudinal direction of the cylinder 2321 in connection with the pressure of the fluid filling the cylinder 2321.

The elastic body 2323 is disposed to cover the outer surfaces of the cylinder 2321 and the rod 2322, and has a length that is varied in connection with the sliding movement of the rod 2322. The elastic body 2323 in accordance with the embodiment of the present disclosure may have a coil spring shape, and thus can stretch in the longitudinal direction. The elastic body 2323 may have both ends respectively coupled to a lower sheet 2324 fixed to the cylinder 2321 and an upper sheet 2325 fixed to the rod 2322, and may be supported by the lower sheet and the upper sheet (not shown). The elastic body 2323 may be compressed and extended to accumulate an elastic restoring force, when the rod 2322 is slid, and may offset shock applied from the road surface by using the accumulated elastic restoring force.

The steering unit 2400 is connected to the suspension unit 2300, and rotatably installed at the bottom of the frame module 100. The steering unit 2400 adjusts the steering angle of the wheel 300, while rotated in the clockwise direction or the counterclockwise direction about the frame module 100. The steering unit 2400 may be installed at the bottom of the frame module 100 and prevent a part of the structure of the corner module 200 from protruding upward from the frame module 100, which makes it possible to solve space and shape problems during vehicle body mounting design and packaging and vehicle design.

The steering unit 2400 in accordance with the embodiment of the present disclosure includes the steering body 2410 and a steering driving unit 2420 (may also be referred to as a "steering driver").

The steering body 2410 is disposed to face the bottom surface of the frame module 100, and supports the suspension unit 2300. The steering body 2410 in accordance with the embodiment of the present disclosure has a length that extends in a direction parallel to the height direction of the vehicle, and is disposed between the frame module 100 and the suspension unit 2300. The upper end portion of the steering body 2410 has a larger area than the lower end portion thereof. Thus, the steering body 2410 has an approximately L-shaped cross-section. The lower end of the steering body 2410 is coupled to one ends of the first and second arms 2311 and 2312 through a bush, ball joint, pin or the like, and rotatably supports the first and second arms 2311 and 2312. The bottom surface of the upper end portion of the steering body 2410 is coupled to the upper end portion of the rod 2322 through bolting or the like, and supports the shock absorber module 2320.

The steering body 2410 has a housing part 2411 in which the steering driving unit 2420 described below is housed. The housing part 2411 in accordance with the embodiment of the present disclosure may have a groove shape that is formed concavely from the top surface of the upper end portion of the steering body 2410. The cross-sectional shape of the housing part 2411 may be varied in design depending on the shape of the steering driving unit 2420.

The steering driving unit 2420 is installed in the steering body 2410, and serves to rotatably support the steering body 2410 with respect to the frame module 100. The steering driving unit 2420 is rotated about the frame module 100 during steering of the vehicle, and rotates the steering body 2410 in the clockwise direction or the counterclockwise direction. Thus, the steering driving unit 2420 may adjust the steering angle of the wheel 300 connected to the steering body 2410 through the suspension unit 2300.

The steering driving unit 2420 in accordance with the embodiment of the present disclosure includes a power generation module 2421, a rotating module 2422 and a power transmission module 2423.

Figure 14:
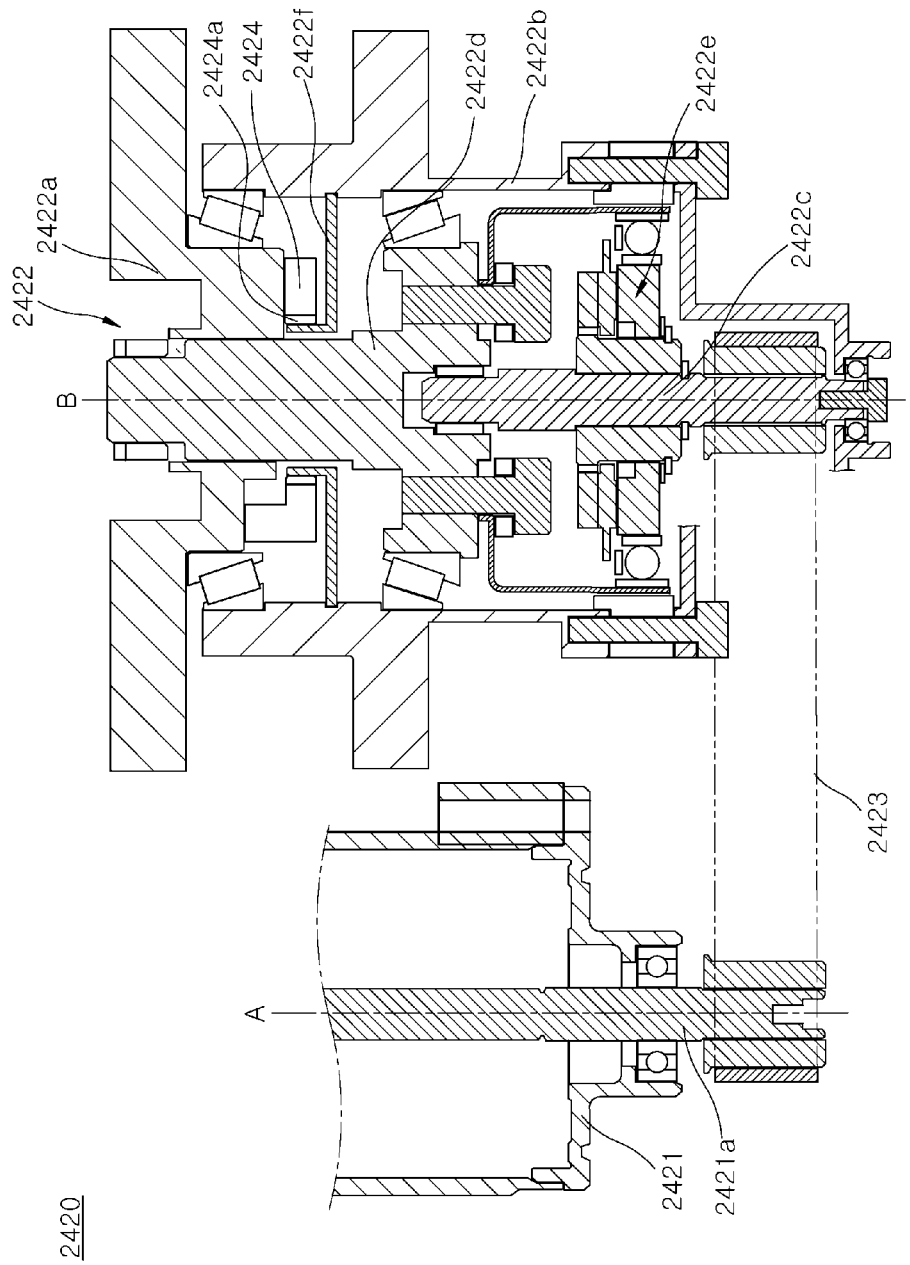
FIG. 14 is a cross-sectional view schematically illustrating a configuration of a steering driving unit in accordance with the embodiment of the present disclosure.

FIG. 14 is a cross-sectional view schematically illustrating a configuration of the steering driving unit in accordance with the embodiment of the present disclosure.

Referring to FIG. 14, the steering driving unit 2420 in accordance with the embodiment of the present disclosure includes the power generation module 2421, the rotating module 2422 and the power transmission module 2423.

The power generation module 2421 serves to receive power and generate a rotational force. The power generation module 2421 in accordance with the embodiment of the present disclosure may be exemplified as various types of electric motors which convert power applied from the outside into a rotational force, and output the rotational force through a driving shaft 2421a. The power generation module 2421 may be connected to the battery 400 installed in the frame module 100, and receive power from the battery 400.

The power generation module 2421 may be seated on one side of the housing part 2411, and detachably fixed to the steering body 2410 through bolting or the like. The driving shaft 2421a of the power generation module 2421 is located coaxially with a center axis A of the power generation module 2421. The center axis A of the power generation module 2421 may be located in parallel to a center axis B of the rotating module 2422 which will be described below. However, the power generation module 2421 is not limited to such a structure, but may be disposed perpendicular to the center axis B of the rotating module 2422 depending on the specific structure of the power transmission module 2423 which will be described below.

The rotating module 2422 is rotated about the frame module 100 in connection with the rotational force generated by the power generation module 2421. As the rotating module 2422 is rotated about the frame module 100, the power generation module 2421 is revolved around the rotating module 2422, which make it possible to adjust the steering angle of the wheel 300. The operation of the power generation module 2421 will be described below in detail.

The rotating module 2422 is seated on the other side of the housing part 2411, and spaced apart from the power generation module 2421. The rotating module 2422 may be detachably fixed to the steering body 2410 through bolting or the like. The rotating module 2422 is connected to the power generation module 2421 through the power transmission module 2423 which will be described below. While housed with the power generation module 2421 and the power transmission module 2423 in the same case or the like, the rotating module 2422 may be installed in the steering body 2410, as illustrated in FIG. 14. Alternatively, the rotating module 2422 may be installed in the steering body 2410 separately from the power generation module 2421 and the power transmission module 2423.

The center axis B of the rotating module 2422 may be disposed on the same plane as the center plane of the wheel 300. The center plane of the wheel 300 may be exemplified as a plane which symmetrically divides the wheel 300 in the widthwise direction of the vehicle, among planes through which the center axis of the wheel 300 vertically passes.

Thus, the rotation center axis of the rotating module 2422 may be matched with the steering shaft of the wheel 300, which makes it possible to induce stable steering of the wheel 300.

The rotating module 2422 in accordance with the embodiment of the present disclosure includes a mounting part 2422a, a rotating module body 2422b, an input shaft 2422c, an output shaft 2422d, a reducer module 2422e and a steering guide 2422f.

The mounting unit 2422a forms the upper exterior of the rotating module 2422, and is fixed to the bottom of the frame module 100. The mounting part 2422a in accordance with the embodiment of the present disclosure may have a plate shape parallel to the frame module 100, or more specifically the first mounting plate 1221A or the second mounting plate 1221B. The top surface of the mounting part 2422a is detachably coupled to the bottom surface of the first or second mounting plate 1221A or 1221B through bolting or the like. The mounting part 2422a is fixed to the bottom of the frame module 100, and supports the entire corner module 200 with respect to the frame module 100.

The rotating module body 2422b forms the lower exterior of the rotating module 2422, and is installed so as to rotate relative to the mounting part 2422a. The rotating module body 2422b in accordance with the embodiment of the present disclosure has a hollow cylindrical shape, and is installed under the mounting part 2422a. The rotating module body 2422b has an upper end that is rotatably connected to a lower end of the mounting part 2422a through a bearing or the like. The rotating module body 2422b has a lower end that is seated on the other side of the housing part 2411 and supported by the housing part 2411. The rotating module body 2422b may be assembled to the case in which the power generation module 2421 and the power transmission module 2423 are housed with the rotating module body 2422b, or directly assembled and fixed to the steering body 2410.

The input shaft 2422c is rotatably installed in the rotating module body 2422b, and rotated by the rotational force received from the power transmission module 2423. The input shaft 2422c in accordance with the embodiment of the present disclosure may have a shaft shape whose center axis is located coaxially with the center axis B of the rotating module 2422. The input shaft 2422c has a lower end that protrudes from the bottom of the rotating module body 2422c and is connected to the power transmission module 2423.

The output shaft 2422d is rotatably supported by the mounting part 2422a. The output shaft 2422d is rotated in connection with the rotation of the input shaft 2422c, and rotates the steering body 2410 about the mounting pat 2422a. The output shaft 2422d in accordance with the embodiment of the present disclosure may have a shaft shape whose center axis is located coaxially with the center axis B of the rotating module 2422. The output shaft 2422d has a lower end that is connected to the upper end of the input shaft 2422c through a bearing so as to rotate relative to the input shaft 2422c. The output shaft 2422d has an upper end which is inserted into the bottom surface of the mounting part 2422a so as to rotate about the mounting part 2422a. The output shaft 2422d is connected to the reducer module 2422e to be described below, and rotated by the rotational force received from the reducer module 2422e when the input shaft 2422c is rotated.

The reducer module 2422e is provided between the input shaft 2422c and the output shaft 2422d, and transmits the rotational force of the input shaft 2422c to the output shaft 2422d. More specifically, the reducer module 2422e amplifies the magnitude of the rotational force transmitted to the output shaft 2422d by reducing the rotation velocity of the input shaft 2422c at a preset reduction gear ratio, and rotates the output shaft 2422d with the output rotational force. The reducer module 2422e in accordance with the embodiment of the present disclosure may be exemplified as a strain wave gearing which includes a wave generator, a flex spline and a circular spline (not shown).

The steering guide 2422f is extended from the rotating module body 2422b, and connected to a measurement module 2424 which will be described below. The steering guide 2422f in accordance with the embodiment of the present disclosure may have a hollow disk shape whose inner circumferential end portion is bent upward, and may be disposed between the rotating module body 2422b and the output shaft 2422d. The outer circumferential surface of the steering guide 2422f is fixed to the inner circumferential surface of the rotating module body 2422b, such that the steering guide 2422f is rotated about the center axis along with the rotating module body 2422b when the rotating module body 2422b is rotated. The steering guide 2422f has an inner circumferential end portion coupled to an inner diameter part 2424a of the measurement module 2424 which will be described below. The steering guide 2422f rotates the inner diameter part 2424a in connection with the rotation of the rotating module body 2422b.

The power transmission module 2423 is provided between the power generation module 2421 and the rotating module 2422, and transmits the rotational force, generated by the power generation module 2421, to the rotating module 2422. The power transmission module 2423 in accordance with the embodiment of the present disclosure may have a belt or chain shape to form a looped curve. Both sides of the power transmission module 2423 are connected to ends of the driving shaft 2421a of the power transmission module 2421 and the input shaft 2422c of the rotating module 2422, respectively. In this case, as the center axis A of the power generation module 2421 is disposed in parallel to the center axis B of the rotating module 2422, the power transmission module 2423 may be prevented from being twisted. The power transmission module 2423 is moved in a caterpillar manner when the driving shaft 2421a is rotated, and transmits a rotational force to the input shaft 2422c. However, the power transmission module 2423 is not limited to such a structure, and may be implemented as various types of power transmission units, such as a worm wheel, which can transmit a rotational force, generated by the power generation module 2421, to the rotating module 2422.

The measurement module 2424 measures the rotation angle of the rotating module 2422 as the wheel 300 is steered. The measurement module 2424 in accordance with the embodiment of the present disclosure is disposed in the rotating module body 2422b, and fixed to the bottom of the mounting part 2422a. The measurement module 2424 has the inner diameter part 2424a which is formed on the inner circumferential surface thereof, and can be rotated about the center axis of the measurement module 2424. The inner diameter part 2424a is connected to the steering guide 2422f, and rotated with the steering guide 2422f when the output shaft 2422d is rotated. The measurement module 2424 measures the rotation angle of the rotating module 2422 by detecting the angle at which the inner diameter part 2424a is rotated from the initial position of the output shaft 2422d, when the vehicle is steered. The detailed shape of the measurement module 2424 is not limited to any one shape, but may be exemplified as various types of steering angle sensors capable of sensing the rotation angle of the output shaft 2422d. The measurement module 2424 transfers data on the measured rotation angle of the rotating module 2422 to a control unit (i.e. a control unit 20 to be described below) such as an ECU (Electronic Control Unit) of the vehicle, such that the control unit performs rolling control or cornering control on the vehicle.

Hereafter, the operation process of the corner module 200 in accordance with the embodiment of the present disclosure will be described in detail.

Figure 15:
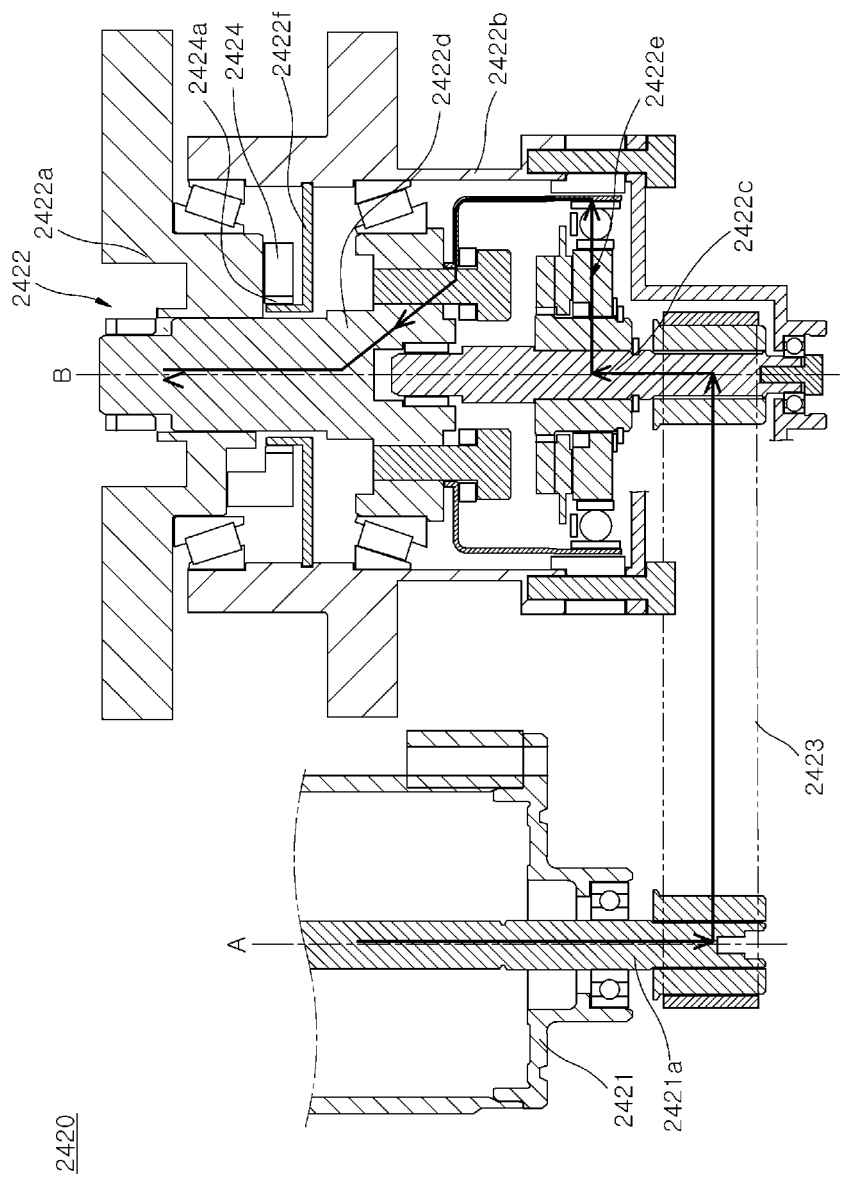
FIGS. 15, 16A and 16B are operation diagrams schematically illustrating an operation process of the corner module in accordance with an embodiment of the present disclosure.
Figure 16A:
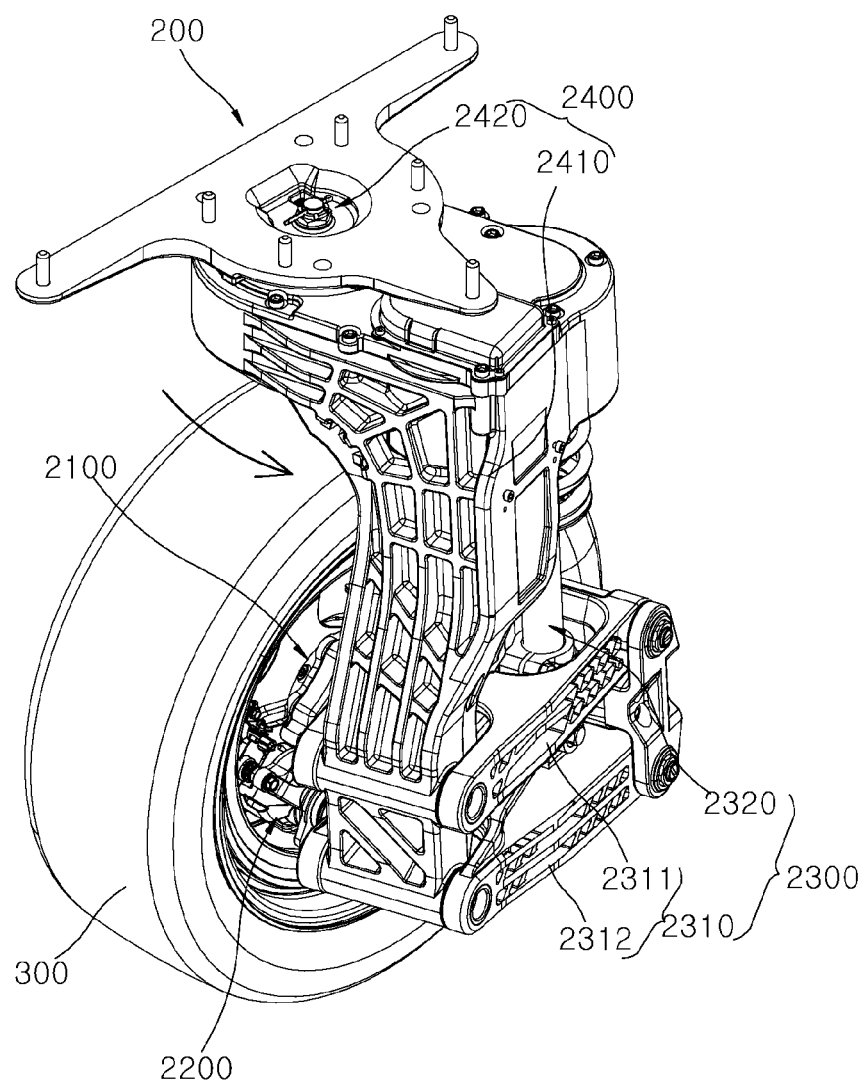
Figure 16B:
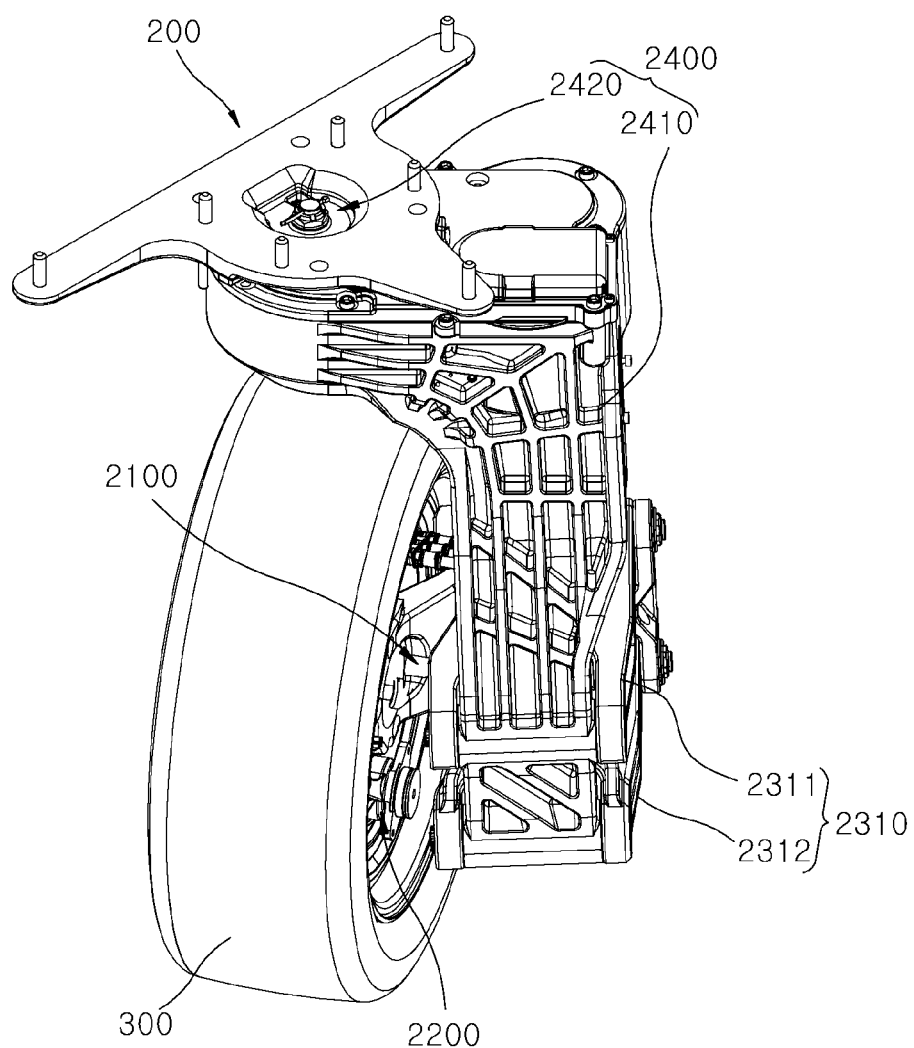

FIGS. 15, 16A and 16B are operation diagrams schematically illustrating an operation process of the corner module in accordance with an embodiment of the present disclosure.

When the vehicle needs to be cornered while the vehicle is driven, the driving shaft 2421a is rotated by the operation of the power generation module 2421, and generates a rotational force.

The power transmission module 2423 is moved in a caterpillar manner by the rotation of the driving shaft 2421a, and transmits the rotational force of the power generation module 2421 to the rotating module 2422.

The rotational force transferred to the rotating module 2422 is sequentially passed through the input shaft 2422c and the reducer module 2422e, and transferred to the output shaft 2422d.

More specifically, an oval cam of the wave generator of the reducer module 2422e is rotated by the rotational force received from the input shaft 2422c.

Then, as the flex spline is elastically deformed and rotated, the position of the outer circumferential gear of the flex spline, which is partially engaged with the inner circumferential gear of the circular spline, is sequentially changed.

When the oval cam is rotated once, the flex spline is moved in the reverse direction to the rotation direction of the oval cam by the difference between the number of teeth included in the outer circumferential gear and the number of teeth included in the inner circumferential gear.

Thus, the output shaft 2422d coupled to the flex spline is rotated in the opposite direction to the rotation direction of the input shaft 2422c at an angular velocity which is reduced to a lower velocity than the angular velocity of the input shaft 2422c.

The output shaft 2422d is rotated about the mounting part 2422a fixed to the first or second mounting plate 1221A or 1221B, or more specifically the center axis B of the rotating module 2422.

As the output shaft 2422d is rotated about the center axis B of the rotating module 2422, the steering body 2410 and the rotating module body 2422b which are connected to the output shaft 2422d are also rotated about the center axis B of the rotating module 2422.

Thus, the power generation module 2421 which is spaced by a predetermined distance apart from the center axis B of the rotating module 2422 revolves around the center axis B of the rotating module 2422.

The rotational force generated by the rotation of the steering body 2410 is sequentially passed through the suspension unit 2300 and the driving unit 2100, and then transferred to the wheel 300.

As the center axis B of the rotating module 2422 is disposed on the same plane as the center plane of the wheel 300, the wheel 300 is rotated about the center axis B of the rotating module 2422 by the received rotational force, and the steering angle is adjusted to corner the vehicle.

The top hat 2 is mounted at the top of the corner module apparatus 1 for a vehicle, and has a passenger space formed therein.

Referring to FIGS. 1 and 2, the top hat 2 in accordance with the embodiment of the present disclosure may have a hollow box shape whose bottom is open. Inside the top hat 2, various products and devices which fit the purpose of a passenger may be installed. Examples of the products and devices may include seats, a manipulation panel, a table and the like. The top hat 2 is disposed so that the open bottom thereof faces the top side of the frame module 100, i.e. the top surfaces of the main platform 1100, the first corner module platform 1200A and the second corner module platform 1200B. The lower end portion of the top hat 2 may be coupled to the top surfaces of the main wheel housing 1120, the first corner module wheel housing 1220A and the second corner module wheel housing 1220B through bolting, such that the top hat 2 is detachably fixed to the frame module 100. The area and length of the top hat 2 may be varied in design depending on the area and length of the frame module 100.

The door part 3 is installed on the top hat 2 so as to be opened/closed. When the door part 3 is opened, a passenger is allowed to get into the top hat 2 through the door part 3.

The door part 3 in accordance with the embodiment of the present disclosure includes a first door 3a and a second door 3b.

The first door 3a is installed on one side of the top hat 2 so as to be opened/closed, and disposed at the top of the main platform 1100. Referring to FIGS. 1 and 2, the first door 3a in accordance with the embodiment of the present disclosure is installed at a side surface of the top hat 2 in the widthwise direction thereof so as to be opened/closed. The first door 3a may be installed on the top hat 2 so as to be opened/closed in various manners such as a hinged door and sliding door. The first door 3a may be provided as a pair of first doors which are respectively installed on both sides of the top hat 2 in the widthwise direction thereof so as to be opened/closed. Both ends of the first door 3a are disposed between the pair of main wheel housings 1120 which are spaced apart from each other in the longitudinal direction of the main plate 1110. The first door 3a has a lower end facing the top surface of the battery 400 seated on the top surface of the main plate 1110. As the battery 400 has a smaller height than the main platform 1100, the lower end of the first door 3a may be disposed close to the ground, which makes it possible to induce a passenger to smoothly get into the vehicle.

The second door 3b is installed on the other side of the top hat 2 so as to be opened/closed, and disposed at the top of at least one of the first and second corner module platforms 1200A and 1200B. Hereafter, the case in which the second door 3b is disposed at the tops of both of the first and second corner module platforms 1200A and 1200B will be taken as an example for description. However, the second door 3b is not limited to such a structure, but may be disposed on the top of any one of the first and second corner module platforms 1200A and 1200B.

Referring to FIGS. 1 and 2, the second door 3b in accordance with the embodiment of the present disclosure is provided as a pair of second doors which are installed at side surfaces of the top hat 2 in the front-to-rear direction thereof so as to be opened/closed. Thus, the second door 3b may be disposed in a direction perpendicular to the first door 3a. The second door 3b may be installed on the top hat 2 so as to be opened/closed in various manners such as a hinged door and sliding door. Both ends of the pair of second doors 3b are disposed between the pair of first corner module wheel housings 1220A and between the pair of second corner module wheel housings 1220B, respectively. The pair of second doors 3b have lower ends disposed to face the top surfaces of the inverters 500 seated on the top surfaces of the first and second corner module plates 1210A and 1210B, respectively. As the inverter 500 has a smaller height than the first and second corner module platforms 1200A and 1200B, the lower end of the second door 3b may be disposed close to the ground, which makes it possible to induce a passenger to smoothly get into the vehicle.

Hereafter, a configuration of a vehicle including a corner module apparatus in accordance with another embodiment of the present disclosure will be described.

For convenience of description, the overlapping descriptions with the vehicle including the corner module apparatus in accordance with the embodiment of the present disclosure will be omitted herein.

Figure 17:
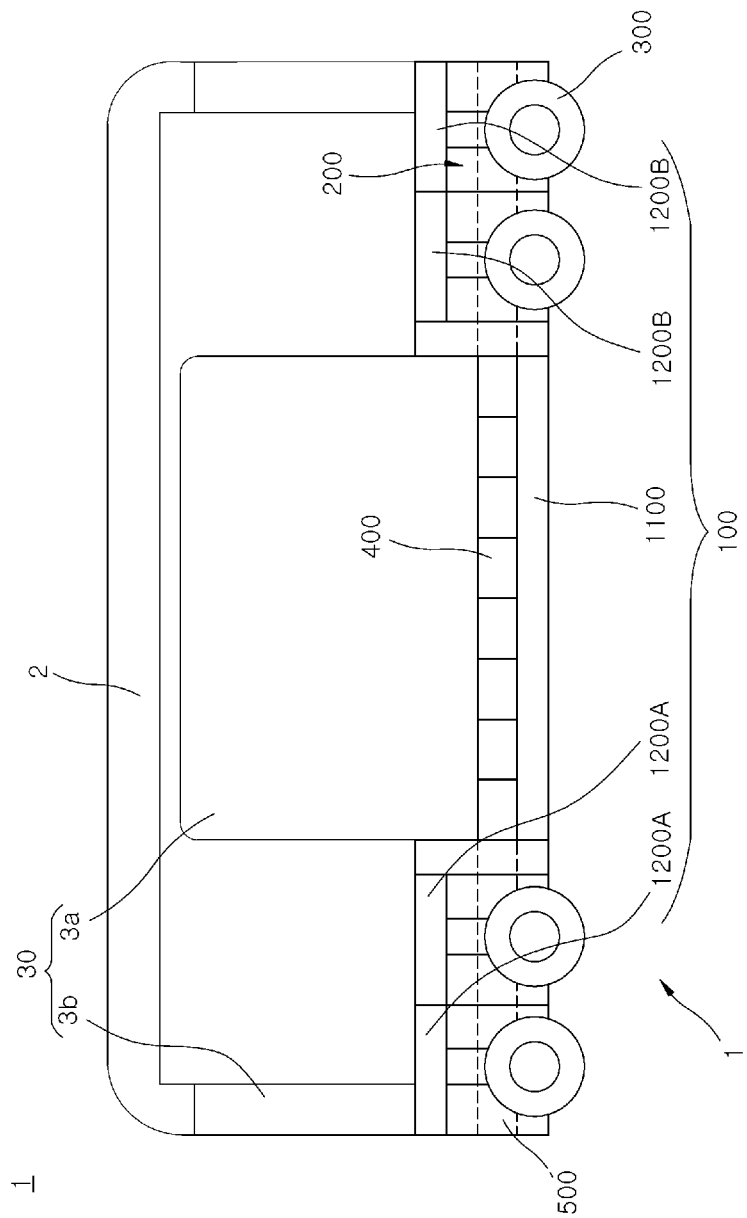
FIG. 17 is a diagram schematically illustrating a configuration of a vehicle including a corner module apparatus for a vehicle in accordance with another embodiment of the present disclosure.

FIG. 17 is a front view schematically illustrating a configuration of a vehicle including a corner module apparatus in accordance with another embodiment of the present disclosure.

Referring to FIG. 17, the frame module 100 in accordance with another embodiment of the present disclosure includes a plurality of first corner module platforms 1200A and a plurality of second corner module platforms 1200B.

The plurality of first corner module platforms 1200A and the plurality of second corner module platforms 1200B are extended from one side and the other side of the main platform 1100, respectively, in the longitudinal direction of the vehicle.

More specifically, the neighboring first corner module platforms 1200A are connected in series to each other from one side of the main platform 1100 in the longitudinal direction of a vehicle body, and the neighboring second corner module platforms 1200B are connected in series to each other from the other side of the main platform 1100 in the longitudinal direction of the vehicle body. In this case, the number of the first corner module platforms 1200A and the number of the second corner module platforms 1200B may be equal to or different from each other. Thus, the frame module 100 in accordance with the another embodiment of the present disclosure may freely increase the installation number of the corner modules 200 installed on both sides of the main platform 1100 according to the purpose of the vehicle.

Figure 18:
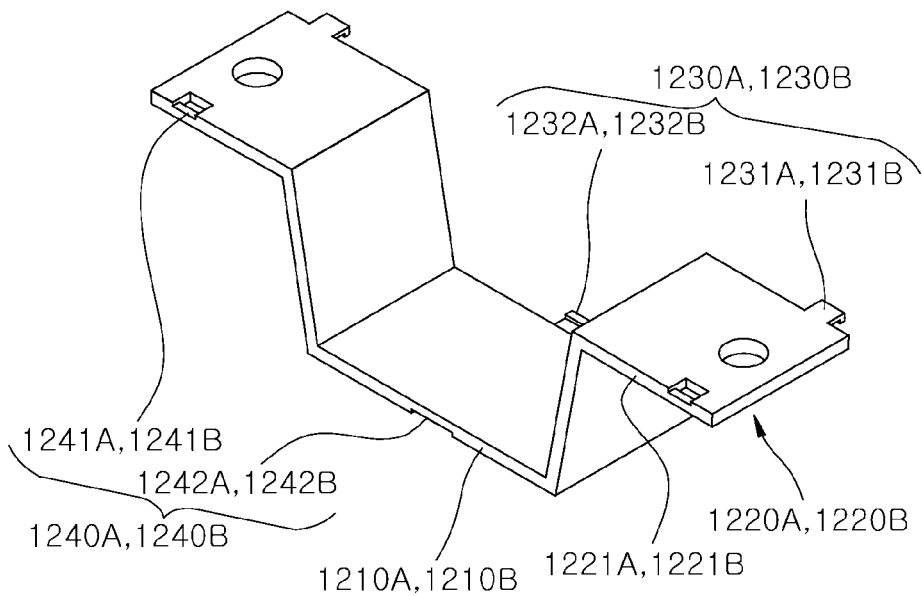
FIG. 18 is a diagram schematically illustrating configurations of a first corner module platform and a second corner module platform in accordance with another embodiment of the present disclosure.

FIG. 18 is a diagram schematically illustrating configurations of the first corner module platform and the second corner module platform in accordance with another embodiment of the present disclosure.

Referring to FIG. 18, the first corner module platform 1200A and the second corner module platform 1200B in accordance with the another embodiment of the present disclosure further include a first corner module extension fastener 1240A and a second corner module extension fastener 1240B, respectively.

The first corner module extension fastener 1240A is formed in the first corner module plate 1210A and the first corner module wheel housing 1220A. The first corner module extension fastener 1240A is disposed on the opposite side of the first corner module fastener 1230A in the first corner module platform 1200A. That is, the first corner module fastener 1230A and the first corner module extension fastener 1240A are disposed at both ends of the first corner module platform 1200A, respectively.

The first corner module extension fastener 1240A formed in any one of the first corner module platforms 1200A is detachably coupled to the first corner module fastener 1230A formed on the neighboring first corner module platform 1200A. More specifically, as the neighboring first corner module platforms 1200A are brought into contact with each other in a direction parallel to the longitudinal direction of the vehicle, the first corner module extension fastener 1240A is hooked and coupled to the first corner module fastener 1230A. Thus, the plurality of first corner module platforms 1200A extended in series may be sequentially connected to each other in the longitudinal direction of the vehicle.

Figure 19:
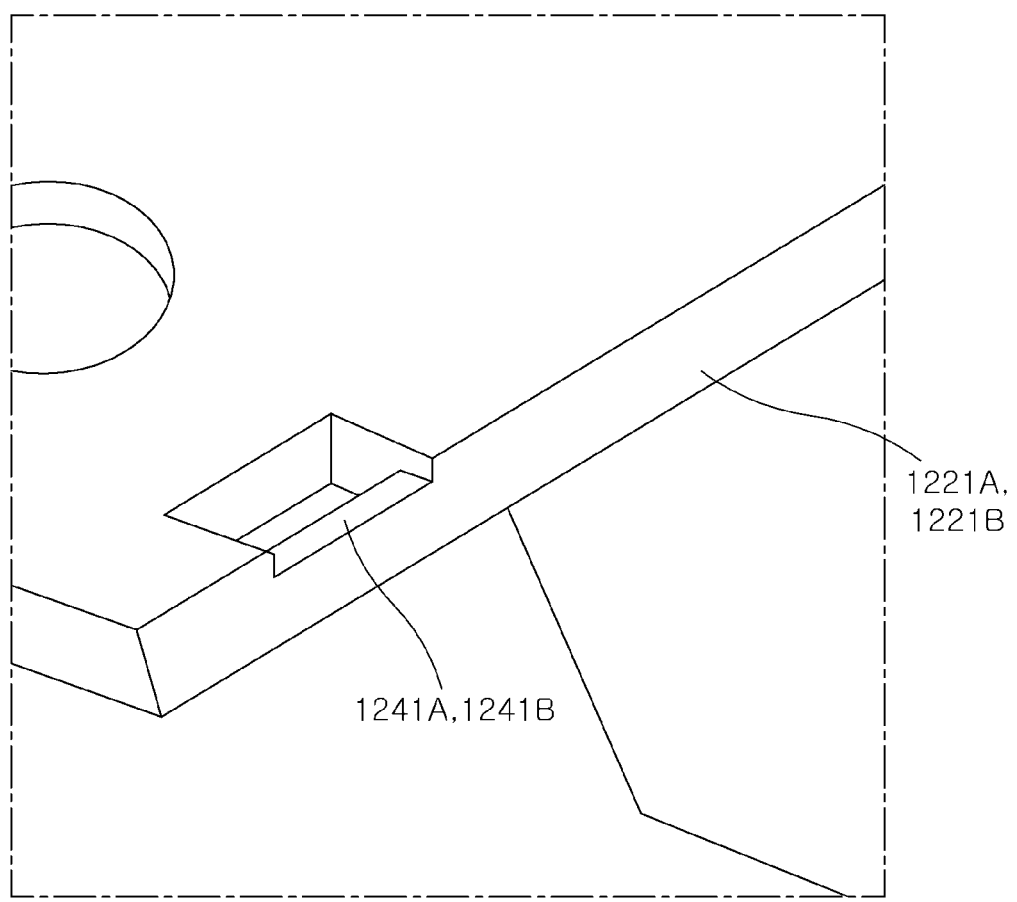
FIGS. 19 and 20 are expanded views schematically illustrating the configurations of a first corner module extension fastener and a second corner module extension fastener in accordance with another embodiment of the present disclosure.
Figure 20:
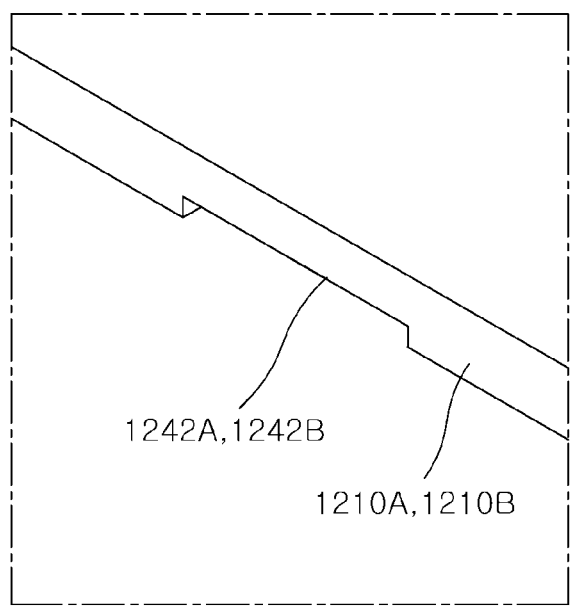

FIGS. 19 and 20 are expanded views schematically illustrating the configurations of the first corner module extension fastener and the second corner module extension fastener in accordance with the embodiment of the present disclosure.

Referring to FIGS. 19 to 20, the first corner module extension fastener 1240A in accordance with the embodiment of the present disclosure includes a first corner module upper extension fastener 1241A and a first corner module lower extension fastener 1242A.

The first corner module upper extension fastener 1241A in accordance with the embodiment of the present disclosure may have a groove shape which is formed concavely from the first corner module wheel housing 1220A, or more specifically the outer surface of the first mounting plate 1221A. The first corner module upper extension fastener 1241A is vertically extended downward from the top surface of the first corner module wheel housing 1220A. The first corner module upper extension fastener 1241A is disposed at the other end of front and rear ends of the first corner module wheel housing 1220A, i.e. on the opposite side of the first corner module upper fastener 1231A. The first corner module upper extension fastener 1241A may have a stair-shaped cross-section so as to be hooked and coupled to the first corner module upper fastener 1231A formed on the neighboring first corner module platform 1200A. The first corner module upper extension fastener 1241A may be provided as a plurality of first corner module upper extension fasteners which are formed in the respective first corner module wheel housings 1220A.

The first corner module lower extension fastener 1242A in accordance with the embodiment of the present disclosure may have a groove shape that is formed concavely from the outer surface of the first corner module plate 1210A.

The first corner module lower extension fastener 1242A is extended in the opposite direction of the first corner module upper extension fastener 1241A. More specifically, the first corner module lower extension fastener 1242A is vertically extended upward from the bottom surface of the first corner module plate 1210A. Thus, when fastened to the first corner module fastener 1230A, the first corner module upper extension fastener 1241A and the first corner module lower extension fastener 1242A may prevent the first corner module fastener 1230A from separating in any one direction.

The first corner module lower extension fastener 1242A is disposed at the other end of the front and rear ends of the first corner module plate 1210A, i.e. on the opposite side of the first corner module lower fastener 1232A. The first corner module lower extension fastener 1242A may have a stair-shaped cross-section so as to be hooked and coupled to the first corner module lower fastener 1232A formed on the neighboring first corner module platform 1200A.

The second corner module extension fastener 1240B is formed in the second corner module plate 1210B and the second corner module wheel housing 1220B. The second corner module extension fastener 1240B is disposed on the opposite side of the second corner module fastener 1230B in the second corner module platform 1200B. That is, the second corner module fastener 1230B and the second corner module extension fastener 1240B are disposed at both ends of the second corner module platform 1200B, respectively.

The second corner module extension fastener 1240B formed in any one of the second corner module platforms 1200B is detachably coupled to the second corner module fastener 1230B formed on the neighboring second corner module platform 1200B. More specifically, as the neighboring second corner module platforms 1200B are brought into contact with each other in a direction parallel to the longitudinal direction of the vehicle, the second corner module extension fastener 1240B is hooked and coupled to the second corner module fastener 1230B. Thus, the plurality of second corner module platforms 1200B extended in series may be sequentially connected to each other in the longitudinal direction of the vehicle.

The second corner module extension fastener 1240B in accordance with the embodiment of the present disclosure includes a second corner module upper extension fastener 1241B and a second corner module lower extension fastener 1242B.

The second corner module upper extension fastener 1241B in accordance with the embodiment of the present disclosure may have a groove shape which is formed concavely from the second corner module wheel housing 1220B, or more specifically the outer surface of the second mounting plate 1221B. The second corner module upper extension fastener 1241B is vertically extended downward from the top surface of the second corner module wheel housing 1220B. The second corner module upper extension fastener 1241B is disposed at the other end of front and rear ends of the second corner module wheel housing 1220B, i.e. on the opposite side of the second corner module upper fastener 1231B. The second corner module upper extension fastener 1241B may have a stair-shaped cross-section so as to be hooked and coupled to the second corner module upper fastener 1231B formed on the neighboring second corner module platform 1200B. The second corner module upper extension fastener 1241B may be provided as a plurality of second corner module upper extension fasteners which are formed in the respective second corner module wheel housings 1220B.

The second corner module lower extension fastener 1242B in accordance with the embodiment of the present disclosure may have a groove shape that is formed concavely from the outer surface of the second corner module plate 1210B.

The second corner module lower extension fastener 1242B is extended in the opposite direction of the second corner module upper extension fastener 1241B. More specifically, the second corner module lower extension fastener 1242B is vertically extended upward from the bottom surface of the second corner module plate 1210B. Thus, when fastened to the second corner module fastener 1230B, the second corner module upper extension fastener 1241B and the second corner module lower extension fastener 1242B may prevent the second corner module fastener 1230B from separating in any one direction.

The second corner module lower extension fastener 1242B is disposed at the other end of the front and rear ends of the second corner module plate 1210B, i.e. on the opposite side of the second corner module lower fastener 1232B. The second corner module lower extension fastener 1242B may have a stair-shaped cross-section so as to be hooked and coupled to the second corner module lower fastener 1232B formed on the neighboring second corner module platform 1200B.

The second door 3b in accordance with the another embodiment of the present disclosure is provided as a pair of second doors which are installed at side surfaces of the top hat 2 in the front-to-rear direction thereof so as to be opened/closed. The pair of second doors 3b may be disposed at the tops of the first corner module platform 1200A and the second corner module platform 1200B, which are disposed at the outermost positions in the longitudinal direction of the vehicle body, among the plurality of first corner module platforms 1200A and the plurality of second corner module platforms 1200B.

Hereafter, a configuration of a vehicle including a corner module apparatus for a vehicle in accordance with still another embodiment of the present disclosure will be described.

For convenience of description, the overlapping descriptions with the vehicle including the corner module apparatus for a vehicle in accordance with the embodiment or the another embodiment of the present disclosure will be omitted herein.

Figure 21:
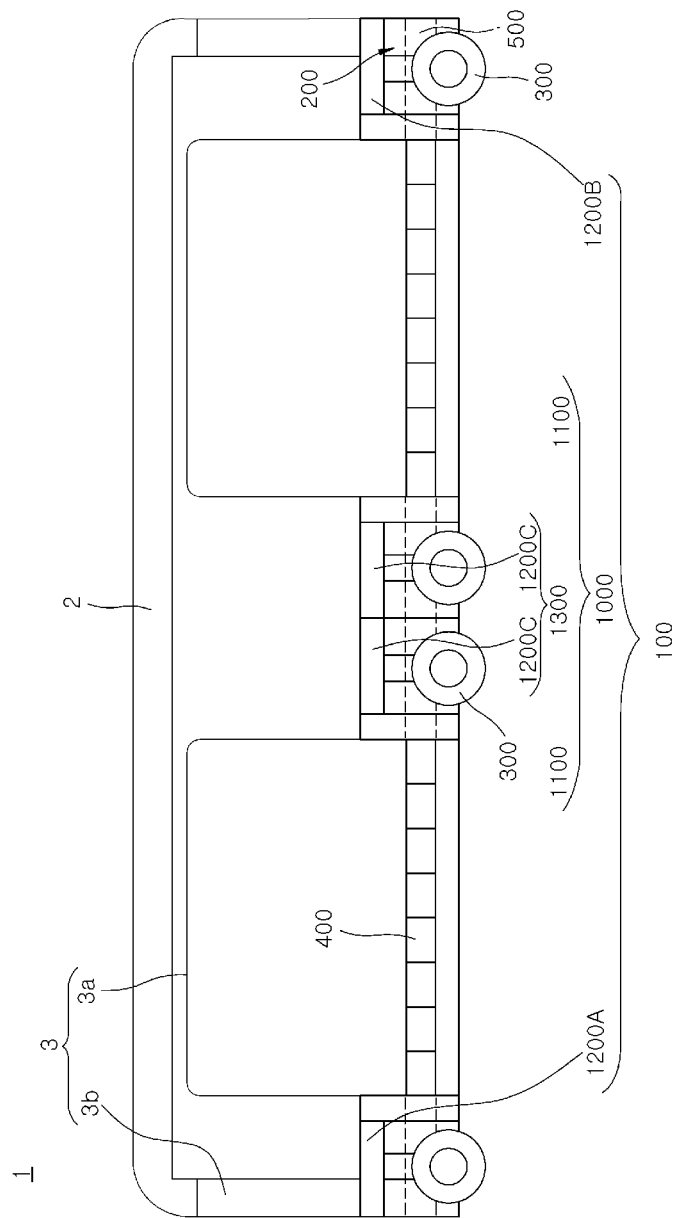
FIG. 21 is a diagram schematically illustrating a configuration of a vehicle including a corner module apparatus for a vehicle in accordance with still another embodiment of the present disclosure.

FIG. 21 is a front view schematically illustrating a configuration of a vehicle including a corner module apparatus for a vehicle in accordance with still another embodiment of the present disclosure.

Referring to FIG. 21, the vehicle including the corner module apparatus in accordance with the still another embodiment of the present disclosure includes a main platform assembly 1000, the first corner module platform 1200A and the second corner module platform 1200B.

The main platform assembly 1000 includes two or more main platforms 1100 and a middle module platform 1300 disposed between the main platforms.

The neighboring main platforms 1100 are spaced by a predetermined distance apart from each other in the longitudinal direction of the vehicle. In this case, the first corner module platform 1200A is detachably coupled to one side (left side in FIG. 21) of the main platform 1100 disposed at the outermost position on one side (left side in FIG. 21), among the plurality of main platforms 1100, and the second corner module platform 1200B is detachably coupled to the other side (right side in FIG. 21) of the main platform 1100 disposed at the outermost position on the other side (right side in FIG. 21), among the plurality of main platforms 1100. Thus, the frame module 100 in accordance with the still another embodiment of the present disclosure may distribute the weight of the battery 400 through the plurality of main platforms 1100, and thus may also be applied to a vehicle with a relatively long vehicle body, such as a tram, bus or trailer.

The middle module platform 1300 includes a third corner module platform 1200C which is disposed between the neighboring main platforms 1100 and supports the corner module 200.

The third corner module platform 1200C may be provided as one or more third corner module platforms between the neighboring main platforms 1100. When the third corner module platform 1200C is provided as a plurality of third corner module platforms, the plurality of third corner module platforms 1200C may be connected in series in the longitudinal direction of the vehicle body. The third corner module platform 1200C disposed at the outermost position among the plurality of third corner module platforms 1200C is detachably coupled to ends of the neighboring main platforms 1100, which are not coupled to the first corner module platform 1200A and the second corner module platform 1200B.

The third corner module platform 1200C is coupled to the corner module 200, which will be described below, at the bottom thereof, and supports the corner module 200. The third corner module platform 1200C has the corner module 200 and the inverter 500 mounted therein, the inverter 500 serving to convert DC power supplied from the battery 400 into AC power, and transfer the AC power to the corner module 200.

The third corner module platform 1200C in accordance with the embodiment of the present disclosure includes a third corner module plate, a third corner module wheel housing and a third corner module fastener.

The third corner module plate, the third corner module wheel housing, the third corner module fastener and a third corner module extension fastener may have the same shapes as the first corner module plate 1210A, the first corner module wheel housing 1220A, the first corner module fastener 1230A and the first corner module extension fastener 1240A, which are illustrated in FIG. 10.

The third corner module extension fastener formed on the third corner module platform 1200C disposed at any one end, among the plurality of third corner module platforms 1200C which are disposed between the neighboring main platforms 1100 so as to smoothly couple the main platforms 1100, may have a hook shape that protrudes from the third corner module plate and the third corner module wheel housing.

The top surfaces of the mounting parts 2422a provided on the plurality of corner modules 200 in accordance with the still another embodiment of the present disclosure may be each detachably coupled to the bottom surface of the first mounting plate 1221A, the second mounting plate 1221B or the third mounting plate depending on the positions at which the mounting parts are supported, through bolting or the like.

The top hat 2 in accordance with the still another embodiment of the present disclosure is disposed so that the open bottom thereof faces the top side of the frame module 100, i.e. the top surfaces of the main platform assembly 1000, the first corner module platform 1200A and the second corner module platform 1200B. The lower end of the top hat 2 may be coupled to the top surfaces of the main wheel housing 1120, the first corner module wheel housing 1220A, the second corner module wheel housing 1220B and the third corner module wheel housing through bolting, and detachably fixed to the frame module 100.

The first door 3a in accordance with the still another embodiment of the present disclosure may be provided as a plurality of first doors which are spaced by a predetermined distance apart from each other in the longitudinal direction of the top hat 2, and separately disposed at the tops of the respective main platforms 1100 provided in the main platform assembly 1000.

II. Application of Corner Module Apparatus for Vehicle

Figure 22:
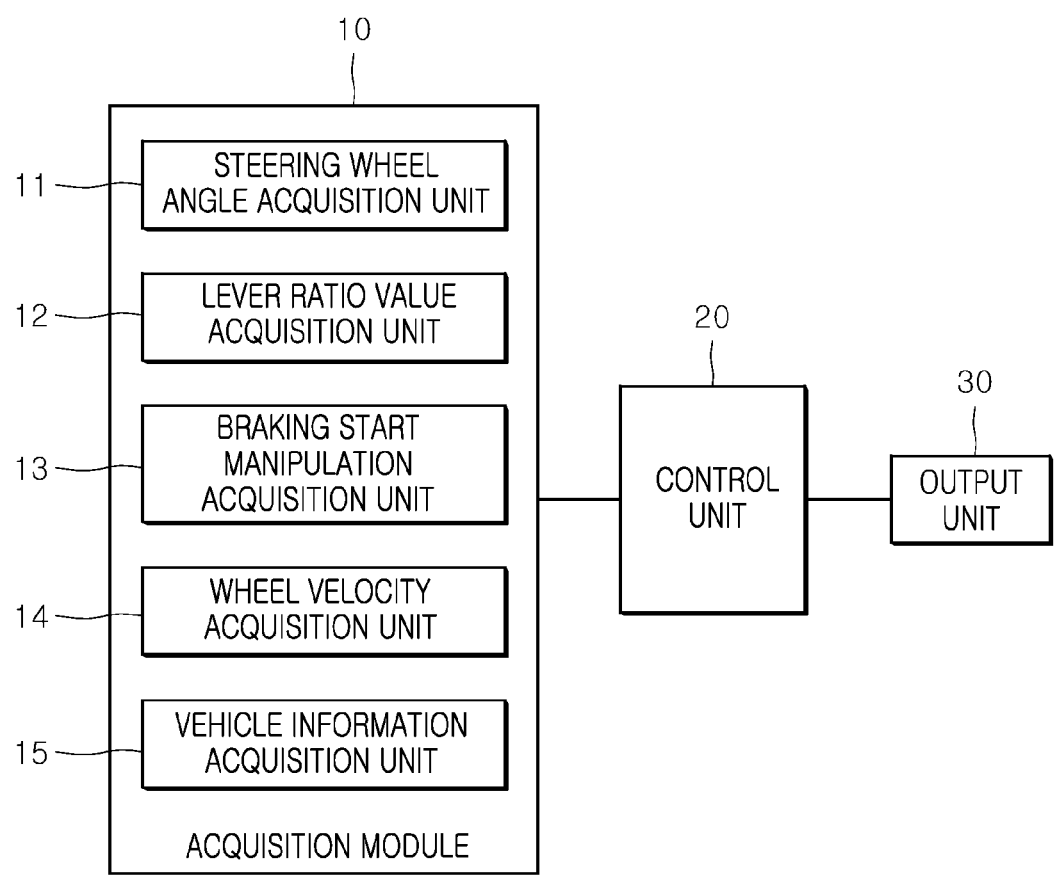
FIG. 22 is a block configuration diagram for describing the functions of the corner module apparatus for a vehicle in accordance with an embodiment of the present disclosure.

FIG. 22 is a block configuration diagram for describing the function of a corner module apparatus for a vehicle in accordance with an embodiment of the present disclosure. Referring to FIG. 22, the corner module apparatus for a vehicle in accordance with the embodiment of the present disclosure includes an acquisition module 10, the control unit 20 and an output unit 30.

The acquisition module 10 functions as a module for acquiring overall information required for the control unit 20 to implement first to fifth applications which will be described below. As illustrated in FIG. 22, the acquisition module 10 includes a steering wheel angle acquisition unit 11, a lever ratio value acquisition unit 12, a braking start manipulation acquisition unit 13, a wheel velocity acquisition unit 14 and a vehicle information acquisition unit 15. The steering wheel angle acquisition unit 11 and the lever ratio value acquisition unit 12 are related to the first application, the braking start manipulation acquisition unit 13 is related to the second application, the wheel velocity acquisition unit 14 is related to the third and fourth applications, and the vehicle information acquisition unit 15 is related to the fifth application.

The steering wheel angle acquisition unit 11 may be acquire a steering wheel angle, and the steering wheel angle may correspond to a steering angle formed when a driver manipulates a steering wheel, or a steering angle command from an ADAS system. Therefore, the steering wheel angle acquisition unit 11 may be implemented as a steering angle sensor mounted in the vehicle or a separate input module configured to acquire the steering angle command outputted from the ADAS system.

Figure 23:
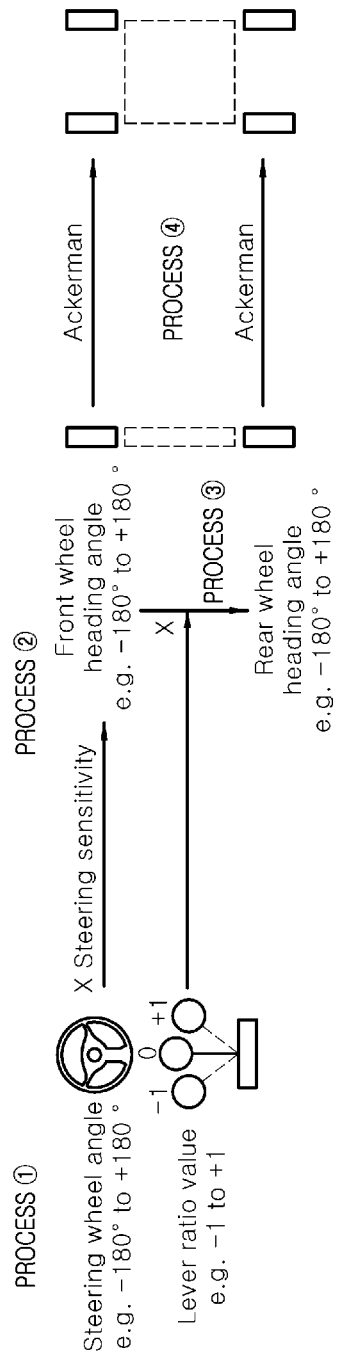
FIG. 23 is a diagram illustrating a series of processes of calculating first to fourth target angles in a first application (individual steering architecture) of the corner module apparatus for a vehicle in accordance with the embodiment of the present disclosure.

The lever ratio value acquisition unit 12 may acquire a lever ratio value. In the first application which will be described below, the lever ratio value may be defined as a parameter indicating whether the front and rear wheels of a bicycle model defined for the vehicle are in phase or out of phase and the steering angle ratio between the front and rear wheels, and have a value of −1 to 1. The sign of the lever ratio value indicates whether the front and rear wheels of the bicycle model are in phase or out of phase. For example, a positive value indicates that the front and rear wheels of the bicycle model are in phase, and a negative value indicates that the front and rear wheels of the bicycle model are out of phase. The magnitude of the lever ratio value indicates the ratio of the steering angles of the front and rear wheels of the bicycle model. For example, when the lever ratio value is 0.5, it indicates that the ratio of the front wheel steering angle to the rear wheel steering angle is 2:1. The lever ratio value may be changed by a driver's manipulation. For this operation, the lever ratio value acquisition unit 12 may be implemented as a lever structure which is provided inside the vehicle as illustrated in FIG. 23, or a touch screen structure provided on an instrument panel of the vehicle. Thus, the value of the lever ratio value may be changed through a lever manipulation or a touch operation on the touch screen by a driver.

The braking start manipulation acquisition unit 13 may acquire a braking start manipulation of the vehicle from a driver. In the second application which will be described below, braking may correspond to a concept including a braking operation while the vehicle is moving on a slope way S (e.g. emergency braking) and a braking operation for maintaining a parking or stopping state of the vehicle on the slope way S (e.g. parking brake). As will be described below, however, the braking operation is performed through a method of independently controlling the steering of four wheels of the vehicle in the second application. Thus, when the braking operation is performed while the vehicle is moving on the slope way S, the operation in accordance with the present embodiment may be applied in the case that the vehicle is moving in a preset low-velocity region for the posture stability of the vehicle. The braking start manipulation acquisition unit 13 may be implemented as a switch which is separately provided in the vehicle, and acquire a driver's manipulation for the switch as the above-described braking start manipulation.

The wheel velocity acquisition unit 14 may acquire the wheel velocities of the respective four wheels of the vehicle.

The wheel velocity acquisition unit 14 may be implemented as a motor sensor configured to sense the number of revolutions of the in-wheel motor mounted on each of the wheels, and the wheel velocities of a left front wheel, a right front wheel, a left rear wheel and a right rear wheel of the vehicle may be acquired by the wheel velocity acquisition unit 14.

The vehicle information acquisition unit 15 may acquire the driving state information and the driving environment information of the vehicle. The driving state information may include the vehicle speed and heading angle of the vehicle, and the driving environment information may include surrounding image information (e.g. forward image) of the vehicle. In order to acquire the driving state information and the driving environment information, the vehicle information acquisition unit 15 may use various sensors (e.g. vehicle sensor, gyro sensor, camera sensor and the like) mounted in the vehicle. The driving state information and the driving environment information of the vehicle, acquired by the vehicle information acquisition unit 15, may be used for a process of calculating distance information to a target point, a target curvature and a target steering angle in the fifth application which will be described below.

The control unit 20 is a main part which independently controls the driving and steering of the four wheels through individual driving torques for the respective wheels of the vehicle. The control unit 20 may be implemented as an ECU (Electronic Control Unit), CPU (Central Processing Unit), processor or SoC (System on Chip), may drive an operating system or application to control a plurality of hardware or software components connected to the control unit 20, and may perform various data processing operations. The control unit 20 may be configured to execute one or more commands stored in a memory, and store execution result data in the memory.

The output unit 30 may correspond to a display or speaker installed at a cluster of the vehicle or a specific position inside the vehicle.

Based on the above-described contents, the first to fifth applications of the corner module apparatus for a vehicle and a detailed operation method of the corner module apparatus will be described focusing on the operation of the control unit 20.

1. First Application: Individual Steering Architecture

In the first application, the control unit 20 may calculate first to fourth target angles of the left front wheel, the right front wheel, the left rear wheel and the right rear wheel of the vehicle, respectively, on the basis of the steering wheel angle acquired by the steering wheel angle acquisition unit 11 and the lever ratio value acquired by the lever ratio value acquisition unit 12, and then independently control the steering of the four wheels of the vehicle by using the calculated first to fourth target angles.

FIG. 23 briefly illustrates a series of processes in which the control unit 20 calculates the first to fourth target angles. Referring to FIG. 23, in process ①, the control unit 20 may receive the steering wheel angle acquired by the steering wheel angle acquisition unit 11 and the lever ratio value acquired by the lever ratio value acquisition unit 12. In process ②, the control unit 20 may calculate a front wheel heading angle of the bicycle model from the steering wheel angle. In this case, the control unit 20 may calculate the front wheel heading angle by multiplying the steering wheel angle by a preset steering sensitivity, and the steering sensitivity may correspond to the TGR (Total Gear Ratio) of a steering gear ratio change device applied to the vehicle, for example. In process ③, when the front wheel heading angle is calculated, the control unit 20 may calculate a rear wheel heading angle of the bicycle model on the basis of the front wheel heading angle and the lever ratio value acquired by the lever ratio value acquisition unit 12. In process ④, the control unit 20 may extend the bicycle model to a 4WD vehicle model, and calculate the first to fourth target angles of the left front wheel, the right front wheel, the left front wheel and the right rear wheel of the vehicle, respectively.

The process ④ corresponding to a process of directly calculating the first to fourth target angles, among the above-described processes, may be performed through a different method depending on the lever ratio value acquired by the lever ratio value acquisition unit 12. Specifically, a steering control mode of the control unit 20 for the steering of four wheels may be divided into a front wheel steering mode, a four-wheel in-phase steering mode and a four-wheel counter-phase steering mode. The control unit 20 may calculate the lever ratio value and the first to fourth target angles decided by the lever ratio value through a different method for each steering control mode. Hereafter, the process of calculating the first to fourth target angles according to the lever ratio value and the steering control mode will be described in detail.

Figure 24:
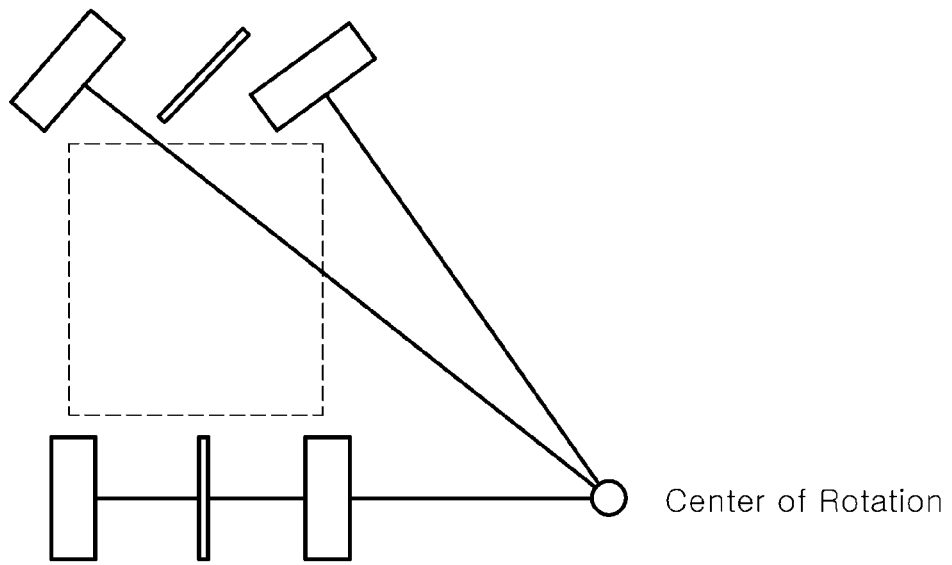
FIG. 24 is a diagram illustrating first to fourth target angles in a front wheel steering mode in the first application (individual steering architecture) of the corner module apparatus for a vehicle in accordance with the embodiment of the present disclosure.

First, the front wheel steering mode corresponds to the steering control mode when the lever ratio value is 0. That is, since the lever ratio value is 0, the rear wheel steering control is not performed, and only the general front wheel steering control is performed. In this case, the control unit 20 may calculate the first and second target angles by applying the Ackerman geometry model to the front wheel heading angle, and calculate the third and fourth target angles as a neutral angle (i.e. 0°) indicating the longitudinal direction of the vehicle because the lever ratio value is 0. FIG. 24 illustrates an example in which the first and second target angles are calculated as predetermined values according to the center of rotation based on the Ackerman geometry model, when the front wheel heading angle is 45°.

Next, the four-wheel in-phase steering mode corresponds to the steering control mode when the lever ratio value is more than 0 and less than 1. That is, since the lever ratio value has a positive value, the front wheels and the rear wheels are independently controlled while the front wheels and the rear wheels are in phase. In the four-wheel in-phase steering mode, the first to fourth target angles are calculated through different methods, when the lever ratio value is 'more than 0 and less than 1' and when the lever ratio value is '1', respectively.

Figure 25:
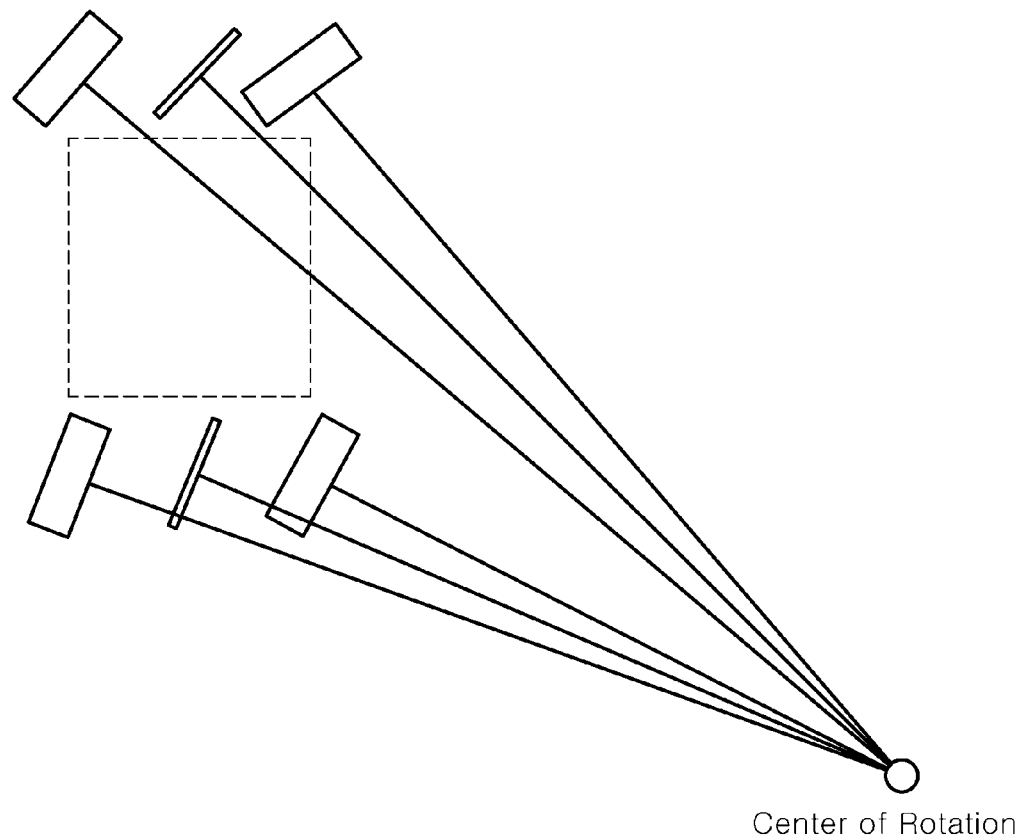
FIGS. 25 and 26 are diagrams illustrating first to fourth target angles in a four-wheel in-phase steering mode in the first application (individual steering architecture) of the corner module apparatus for a vehicle in accordance with the embodiment of the present disclosure.

When the lever ratio is more than 0 and less than 1, the control unit 20 may calculate the first and second target angles by applying the Ackerman geometry model to the front wheel heading angle. Then, the control unit 20 may calculate the rear wheel heading angle of the bicycle model by applying the lever ratio value to the front wheel heading angle or multiplying the lever ratio value by the front wheel heading angle, and calculate the third and fourth target angles by applying the Ackerman geometry model to the calculated rear wheel heading angle. FIG. 25 illustrates an example in which the first to fourth target angles are calculated as predetermined values according to the center of rotation based on the Ackerman geometry model, when the front wheel heading angle is 45° and the lever ratio value is 0.5.

Figure 26:
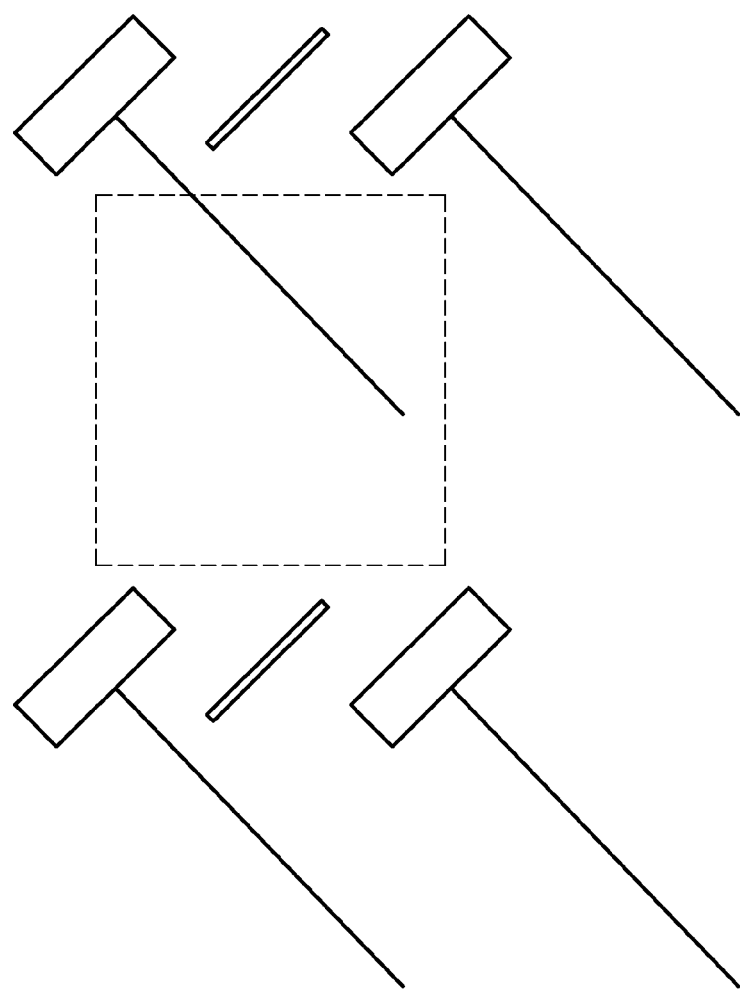

When the lever ratio value is 1, the control unit 20 may calculate the first to fourth target values as the front wheel heading angle. That is, when the lever ratio value is 1, it indicates that the center of rotation based on the Ackerman geometry model does not exist, but the steering angles are formed as the same angle while the front wheels and the rear wheels are in phase. Thus, the control unit 20 may calculate the first to fourth target angles as the front wheel heading angle. FIG. 26 illustrates an example in which the first to fourth target angles are calculated as the front wheel heading angle, when the front wheel heading angle is 45° and the lever ratio value is 1.

Figure 27:
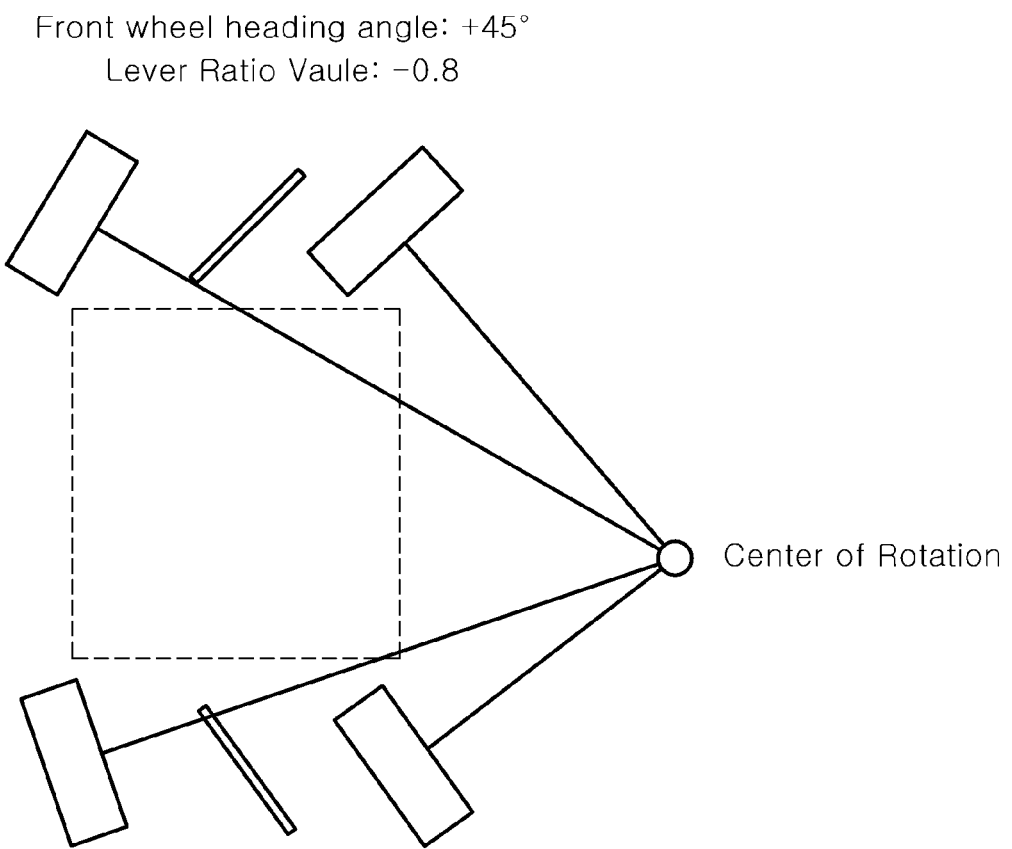
FIGS. 27 and 28 are diagrams illustrating first to fourth target angles in a four-wheel counter-phase steering mode in the first application (individual steering architecture) of the corner module apparatus for a vehicle in accordance with the embodiment of the present disclosure.
Figure 28:
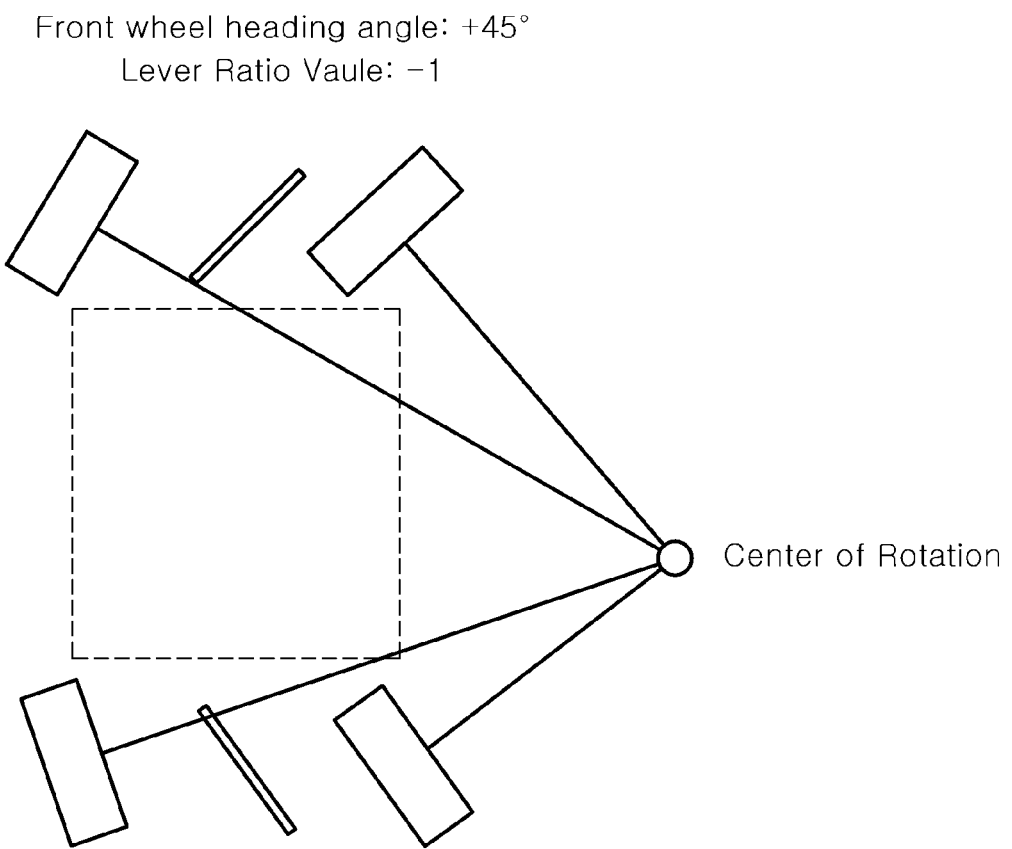

Next, the four-wheel counter-phase steering mode corresponds to the steering control mode when the lever ratio value is −1 or more and less than 0. That is, since the lever ratio value has a negative value, the front wheels and the rear wheels are independently controlled while the front wheels and the rear wheels are out of phase. In the four-wheel counter-phase mode, the center of rotation based on the Ackerman geometry model exists at all times. Thus, the control unit 20 may calculate the first and second target angles by applying the Ackerman geometry model to the front wheel heading angle, and calculate the third and fourth target angles by applying the Ackerman geometry model to the rear wheel heading angle of the bicycle model, which is calculated by applying the lever ratio value to the front wheel heading angle. FIG. 27 illustrates an example in which the first to fourth target values are calculated as predetermined values according to the center of rotation based on the Ackerman geometry model, when the front wheel heading angle is 45° and the lever ratio value is −0.8, and FIG. 28 illustrates an example in which the first to fourth target values are calculated as predetermined values according to the center of rotation based on the Ackerman geometry model, when the front wheel heading angle is 45° and the lever ratio value is −1.

Table 1 below shows a method of calculating the first to fourth target angles according to the lever ratio value and the steering control mode.

TABLE 1

| Steering control mode | Lever ratio value | Target angle calculation method |
| --- | --- | --- |
| Front wheel steering mode | 0 | First and second target angles: Ackerman geometry model<br>Third and fourth target angles: Neural angle |
| Four-wheel in-phase steering mode | 0 < R < 1 | First to fourth target angles Ackerman geometry model |
|  | R = 1 | First to fourth target angles: Front wheel heading angle |
| Four-wheel counter-phase steering mode | −1 ≤ R ≤ 0 | First to fourth target angles Ackerman geometry model |

As described above, the lever ratio value may be changed through a driver's manipulation. Thus, when a sudden transition of the steering control mode is caused by the change in lever ratio value while the vehicle is driven, the driving stability of the vehicle may be degraded. For example, a vehicle tire slip or a turnover of the vehicle may occur. In order to prevent the above-described problem, when the transition of the steering control mode is caused by the change in lever ratio value, the control unit 20 may control the change speed of the steering angles of the four wheels to a preset control speed, thereby performing the transition of the steering control mode during a predetermined transition time. The control speed may be preset to a sufficiently low value in the control unit 20, on the basis of a designer's experimental result, within a range in which a sudden transition of the steering control mode is not caused and the driving stability of the vehicle is secured, and the above-described transition time may also be preset as a value corresponding to the control speed in the control unit 20. For specific example, when a driver changes the lever ratio value to −0.5 such that the steering control mode transitions to the four-wheel counter-phase steering mode, while the vehicle is driven in the four-wheel in-phase steering mode, the control unit 20 may change the current rear wheel steering angle to the target angle (i.e. the third and fourth target angles in the four-wheel counter-phase steering mode). In this case, the control unit 20 may slowly change the rear wheel steering angle to the third and fourth target angles according to the control speed, in order to secure the driving stability of the vehicle.

Figure 29:
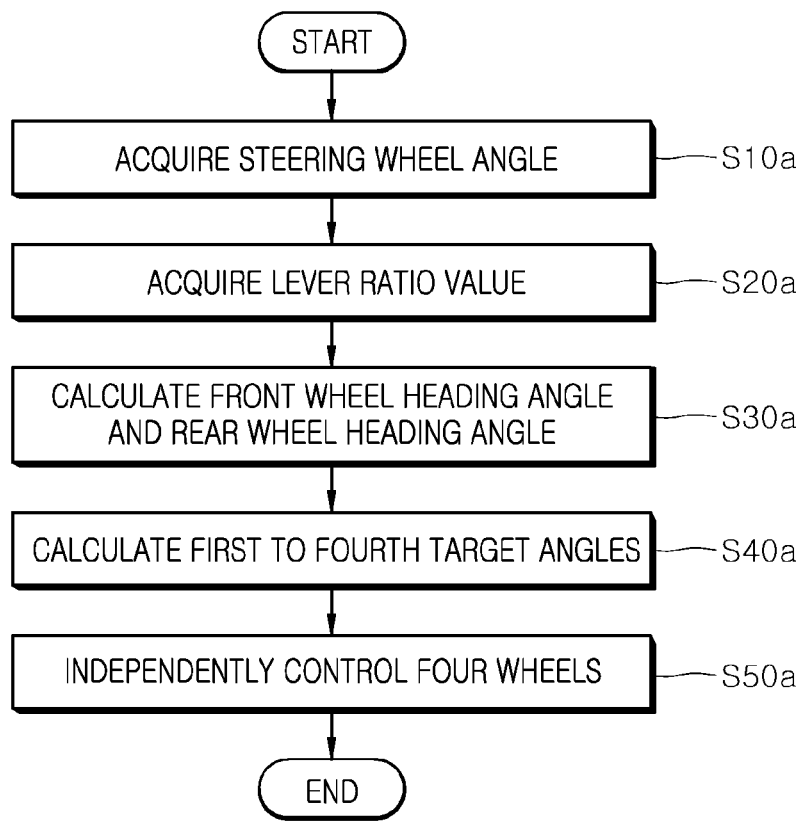
FIG. 29 is a flowchart for describing an operation method of the corner module apparatus for a vehicle in accordance with the embodiment of the present disclosure, based on the first application (individual steering architecture).

FIG. 29 is a flowchart for describing an operation method of the corner module apparatus for a vehicle in accordance with the embodiment of the present disclosure, based on the first application. Referring to FIG. 29, the operation method of the corner module apparatus for a vehicle in accordance with the embodiment of the present disclosure will be described. Hereafter, the detailed descriptions of contents overlapping the above-described contents will be omitted herein, and the following descriptions will be focused on a time series configuration.

First, the steering wheel angle acquisition unit 11 acquires a steering wheel angle in step S10a, and the lever ratio value acquisition unit 12 acquires a lever ratio value indicating a steering angle ratio and information on whether the front and rear wheels of a bicycle model defined for the vehicle are in phase or out of phase, in step S20a. The lever ratio value has a value of −1 to 1, the sign of the lever ratio value indicates whether the front and rear wheels of the bicycle model are in phase or out of phase, and the magnitude of the lever ratio value indicates the steering angle ratio between the front and rear wheels of the bicycle model.

Then, the control unit 20 calculates the front wheel heading angle of the bicycle model from the steering wheel angle acquired in step S10a, and calculates the rear wheel heading angle of the bicycle model on the basis of the calculated front wheel heading angle and the lever ratio value acquired in step S20a. In step S30a, the control unit 20 calculates the front wheel heading angle by multiplying the steering wheel angle by a preset steering sensitivity.

Then, the control unit 20 extends the bicycle model to a 4WD vehicle model, and calculates the first to fourth target angles of the left front wheel, the right front wheel, the left rear wheel and the right rear wheel of the vehicle, respectively, in step S40a. The calculation method of the first to fourth target angles in step S40a is differently decided according to the lever ratio value acquired in step S20a. Specifically, the first to fourth target values are calculated through a different method for the lever ratio value and the steering control mode decided through the lever ratio value. The steering control mode includes the front wheel steering mode corresponding to the case in which the lever ratio value is 0, the four-wheel in-phase steering mode corresponding to the case in which the lever ratio value is more than 0 and less than 1, and the four-wheel counter-phase steering mode corresponding to the case in which the lever ratio value is −1 or more and less than 0.

When the steering control mode of the vehicle is the front wheel steering mode, the control unit 20 calculates the first and second target values by applying the Ackerman geometry model to the front wheel heading angle, and calculates the third and fourth target values as the neutral angle indicating the longitudinal direction of the vehicle, in step S40a.

When the steering control mode of the vehicle is the four-wheel in-phase steering mode or the four-wheel counter-phase steering mode while the lever ratio value is more than 0 and less than 1, the control unit 20 (i) calculates the first and second target angles by applying the Ackerman geometry model to the front wheel heading angle, (ii) calculates the rear wheel heading angle of the bicycle model by applying the lever ratio value to the front wheel heading angle, and (iii) calculates the third and fourth target angles by applying the Ackerman geometry model to the calculated rear wheel heading angle, in step S40a.

When the steering control mode of the vehicle is the four-wheel in-phase steering mode while the lever ratio value is 1, the control unit 20 calculates the first to fourth target angles as the front wheel heading angle in step S40a.

When the first to fourth target angles are calculated through step S40a, the control unit 20 independently controls the steering of the four wheels of the vehicle by using the first to fourth target angles, in step S50a. If a transition of the steering control mode is caused by a change in the lever ratio value, the control unit 20 may control the change speed of the steering angles of the four wheels to the preset control speed in step S50a, such that the transition of the steering control mode is performed during the preset transition time.

According to the first application, the steering of the four wheels of the vehicle may be independently controlled, which is advantageous for the expandability and degree of freedom thereof compared to the existing front wheel steering method or the rear wheel steering method (RWS). Further, the transition of the steering control mode may be continuously implemented, which makes it possible to perform safe four-wheel independent control even in not only the parking and stopping states of the vehicle but also the driving of the vehicle.

2. Second Application: Braking Mechanism Through Individual Steering

In the second application, when a braking start manipulation is acquired by the braking start manipulation acquisition unit 13, the control unit 20 may independently control the steering of four wheels of the vehicle, thereby braking the vehicle.

In the case of the structure for independently controlling four wheels, the brakes of the respective corner modules may be removed, and the method for performing braking through the in-wheel motor may be applied. In this case, since the in-wheel motor cannot be controlled while the vehicle is powered off, braking control cannot be performed. Therefore, there is a need for new braking logic. The present embodiment suggests a method for braking a vehicle through a process of controlling the alignments of four wheels by independently controlling the steering of the four wheels, in consideration of the design expandability of a four-wheel independent driving apparatus and the need for braking logic, and the method will be hereafter described in detail. In order to promote understandings of the embodiment, an example in which a braking operation (i.e. parking brake) for maintaining a parking or stopping state of the vehicle on a slope way S is performed will be taken for description.

Figure 30:
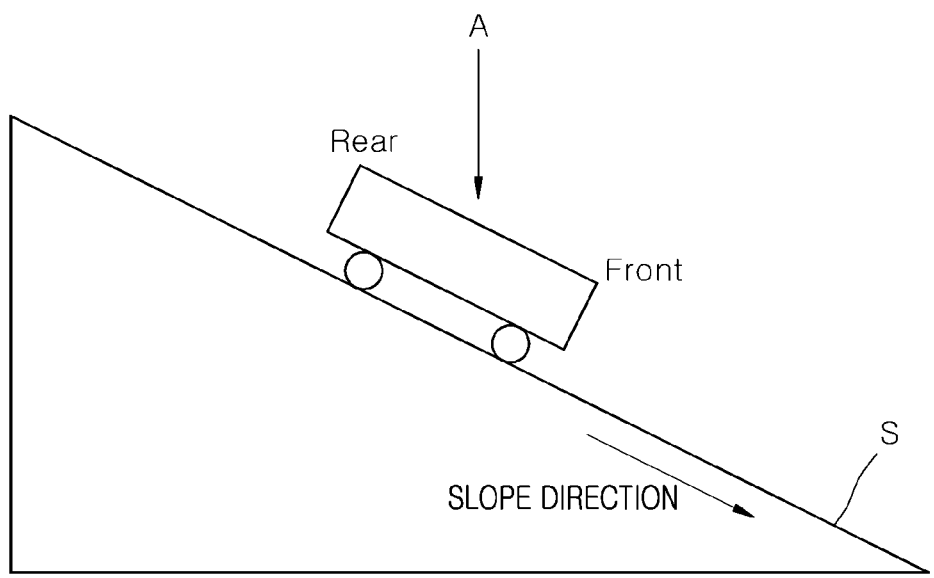
FIGS. 30 to 33 are diagrams illustrating the positional relationship between a slope way and a vehicle in a second application (braking mechanism through individual steering) of the corner module apparatus for a vehicle in accordance with the embodiment of the present disclosure.
Figure 31:
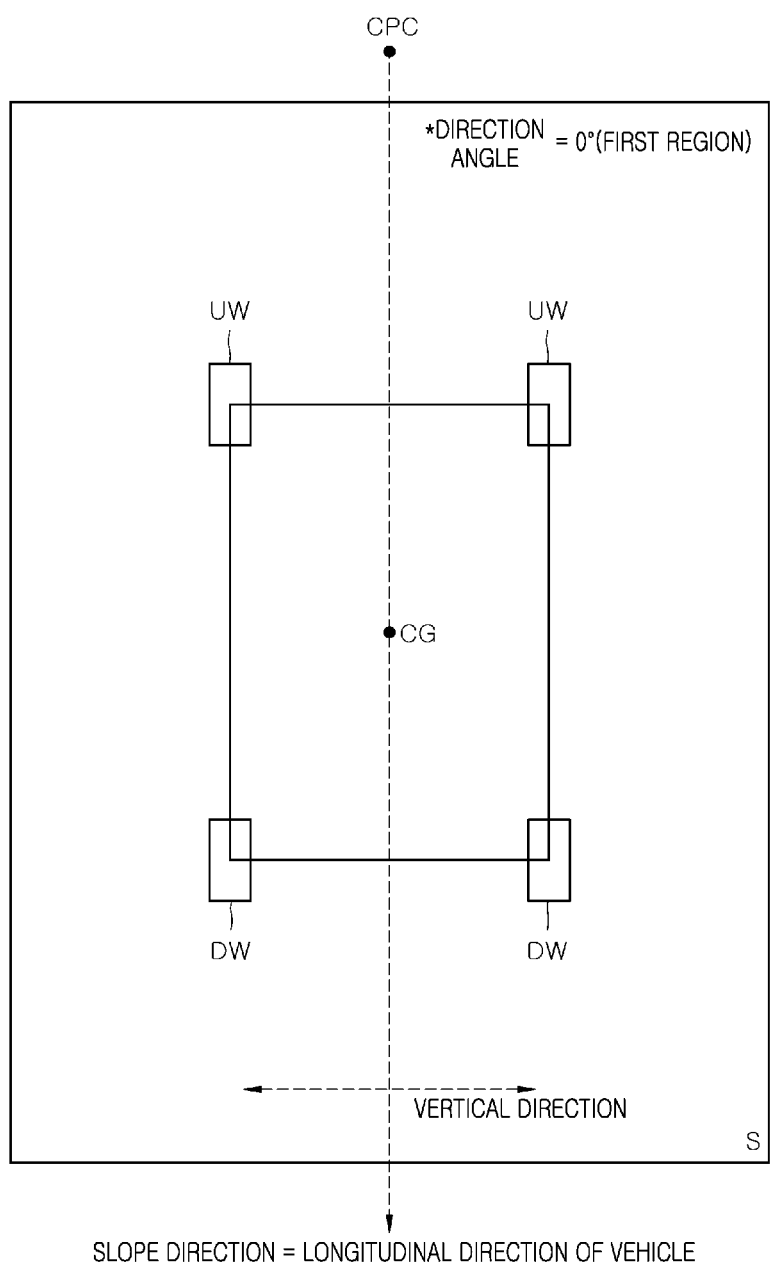
Figure 32:
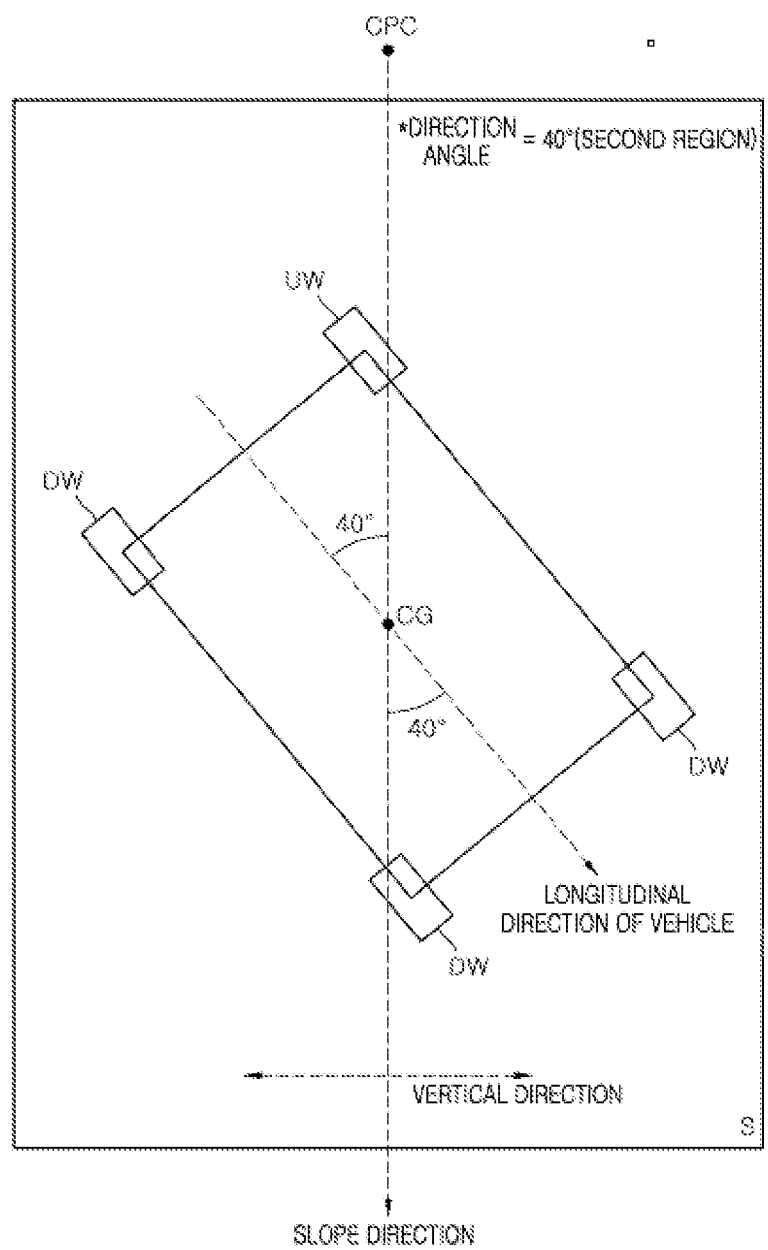
Figure 33:
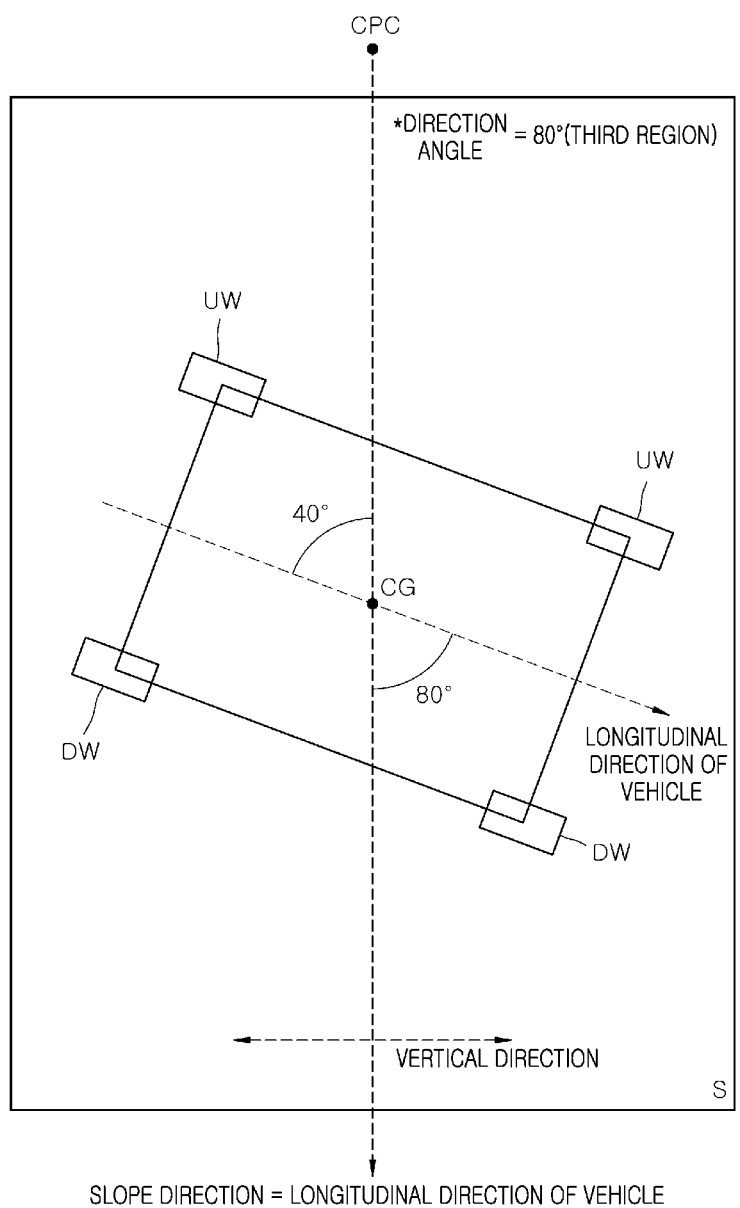

In the present embodiment, when a braking start manipulation is acquired by the braking start manipulation acquisition unit 13 while the vehicle is located on the slope way S, the control unit 20 may brake the vehicle by independently controlling the steering of four wheels of the vehicle according to an angle (acute angle) between the slope direction of the slope way S and the longitudinal direction of the vehicle. In the present embodiment, the angle is defined as a direction angle. FIG. 30 illustrates an example in which the vehicle is located on the slope way S, and FIGS. 31 to 33 illustrate the posture of the vehicle when the vehicle and the slope way S are seen from a direction 'A' of FIG. 30. FIG. 31 illustrates the case in which the direction angle is 0°, FIG. 32 illustrates the case in which the direction angle is 40, and FIG. 33 illustrates the case in which the direction angle is 80.

At this time, the control unit 20 may align the four wheels by applying different rules to lower wheels DW located at a lower position of the slope way S and upper wheels UW located at a higher position of the slope way S, respectively, among the four wheels of the vehicle. In the example of FIG. 31 in which the direction angle is 0°, a relatively large load is applied to the lower wheels DW located at a lower position of the slope way S with respect to the slope direction of the slope way S, and a relatively small load is applied to the upper wheels UW located at a higher position of the slope way S with respect to the slope direction of the slope way S. Therefore, when the lower wheels DW to which a relatively large load is applied are aligned in a direction for restricting the vehicle from moving in the slope direction of the slope way S and the upper wheels UW to which a relatively small load is applied are aligned in a direction for suppressing the vehicle from moving in a direction perpendicular to the slope direction, the vehicle may be effectively prevented from moving in the vertical and horizontal directions of the vehicle on the slope way S, while the parking and stopping state of the vehicle is effectively maintained.

Therefore, when the steering control rule for the lower wheels DW and the steering control rule for the upper wheels UW are represented by a first rule and a second rule, respectively, the first rule may be defined as a rule for restricting the vehicle from moving in the slope direction of the slope way S, and the second rule may be defined as a rule for restricting the vehicle from moving in the direction perpendicular to the slope direction on the slope sway S. The first and second rules may be predefined in the control unit 20.

Figure 34:
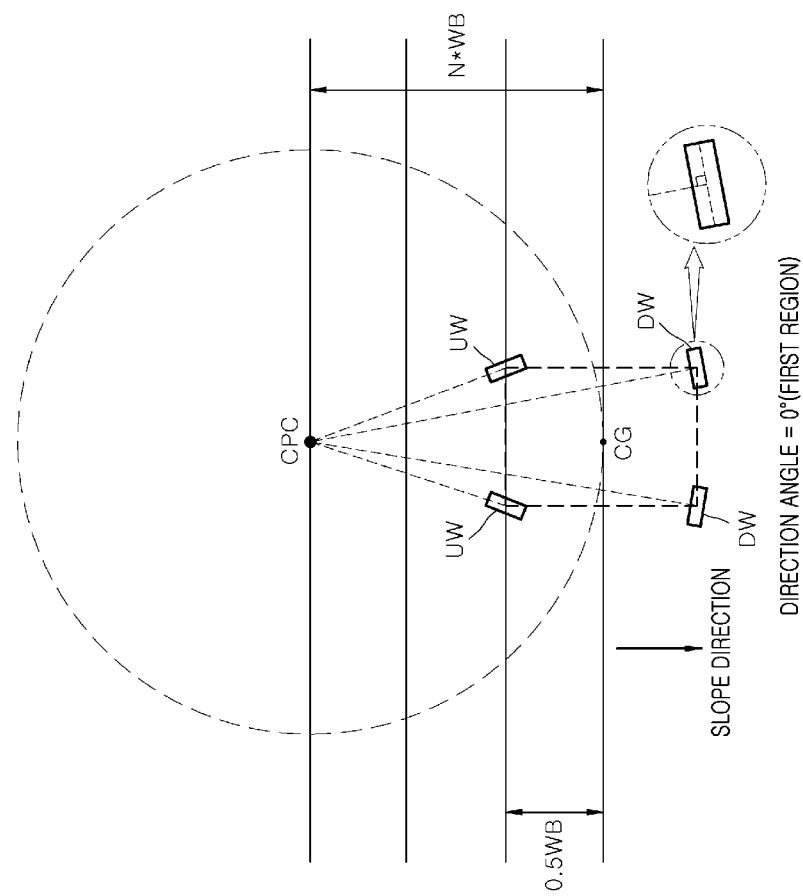
FIGS. 34 to 36 are diagrams illustrating the alignment of wheels based on a direction angle in the second application (braking mechanism through individual steering) of the corner module apparatus for a vehicle in accordance with the embodiment of the present disclosure.

The process of aligning the lower wheels DW and the upper wheels UW according to the first and second rules will be described in detail with reference to FIG. 34 illustrating the example in which the direction angle is 0°. When the direction angle is 0°, the lower wheels DW are defined as two wheels located at a lower position on the slope way S among the four wheels, and the upper wheels UW are defined as the other two wheels located at a higher position on the slope way S. The lower wheels DW and the upper wheels UW are defined in a different manner depending on the direction angle, which will be described below in detail.

Figure 35:
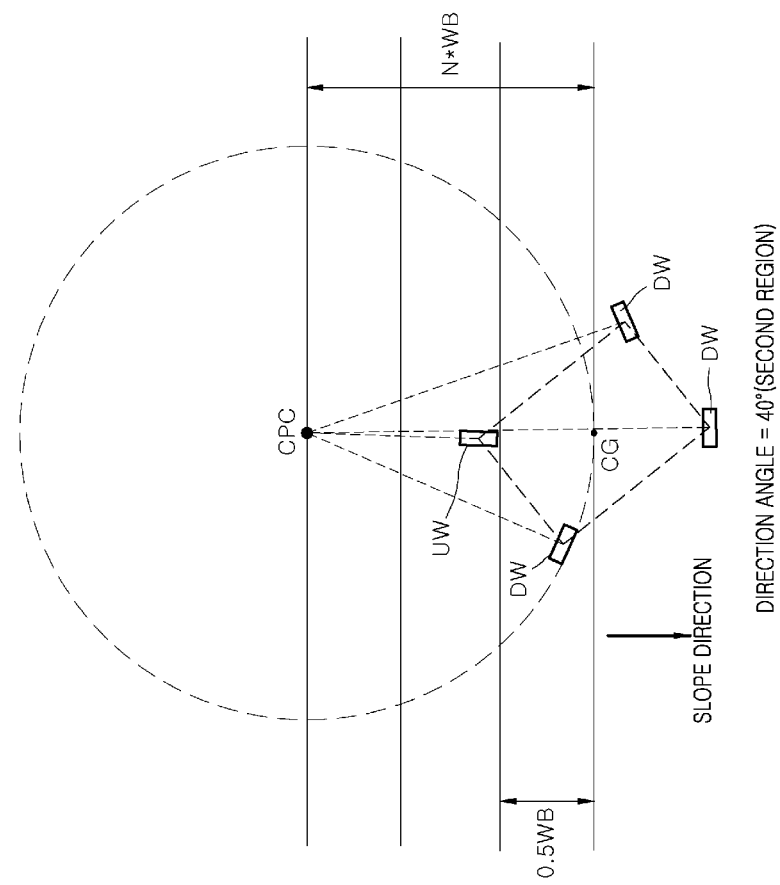
Figure 36:
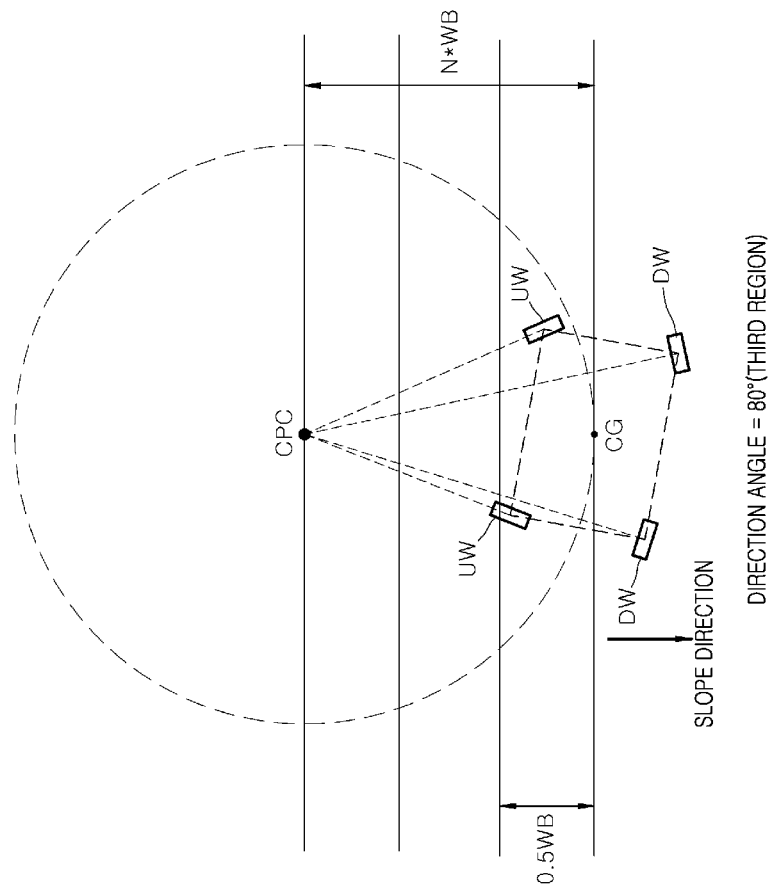

In the present embodiment, a reference point which is defined as a point spaced by a preset distance apart from a gravity center GC of the vehicle in the reverse direction to the slope direction is employed as a reference for aligning the lower wheels DW and the upper wheels UW. When a circle passing through the gravity center GC of the vehicle on the basis of the reference point is defined as a parking circle, the reference point may be named a CPC (Center of Parking Circle), and the wheels may be aligned on the basis of the CPC, such that the vehicle may be converged on a stable state with respect to the slope way S. The preset distance may be expressed as N*WB, where WB represents the distance between the front wheel axle and the rear wheel axle, and N represents a value which is set according to the inclination of the vehicle (for example, the control unit 20 may set N to a larger value as the inclination increases. In FIGS. 34 to 36, N is 1.5). An algorithm for defining the reference point CPC may be preset in the control unit 20.

When the reference point CPC is defined as described above, the first rule may be defined as a rule for aligning the lower wheels DW such that straight lines connecting the reference point CPC to the center points of the lower wheels DW are perpendicular to the major axes of the lower wheels DW, respectively, and the second rule may be defined as a rule for aligning the upper wheels UW such that the major axes of the upper wheels UW and straight lines connecting the reference point CPC to the center points of the upper wheels UW are located on the same lines, respectively.

Thus, as illustrated in FIG. 34, the control unit 20 may align the lower wheels DW through the first rule such that the straight lines connecting the reference point CPC to the center points of the lower wheels DW are perpendicular to the major axes of the lower wheels DW, respectively, and align the upper wheels UW through the second rule such that the major axes of the upper wheels UW and the straight lines connecting the reference point CPC to the center points of the upper wheels UW are located on the same lines, respectively.

In the above example, it has been described that, among the four wheels, the lower wheels DW correspond to two wheels located at a lower position on the slope way S, and the upper wheels UW correspond to the other two wheels at a higher position on the slope way S. As described above, in the present embodiment, the lower wheels DW and the upper wheels UW may be defined differently depending on the direction angle. Before the present embodiment is described in more detail, first to third regions are defined as follows.

First region is defined as a region where the direction angle is 0° or more and less than a first reference angle.
Second region is defined as a region where the direction angle is the first reference angle or more and less than a second reference angle.
Third region is defined as a region where the direction angle ranges from the second reference angle to 90°.

The first and second reference angles may be preset in the control unit 20, on the basis of the specification of the vehicle and experimental results of the designer. For example, the first reference angle may be set to 20°, and the second reference angle may be set to 70°.

Thus, when the direction angle is present in the first or third region, the lower wheels DW may be defined as two wheels located at a lower position on the slope way S, among the four wheels, and the upper wheels UW may be defined as the other two wheels located at a higher position on the slope way S, among the four wheels. Furthermore, when the direction angle is present in the second region, the lower wheels DW may be defined as three wheels located at lower positions on the slope way S, among the four wheels, and the upper wheel UW may be defined as the other one wheel located at a higher position on the slope way S, among the four wheels. Since the case in which the direction angle exists in the first region has been described with reference to FIG. 34, the case in which the direction angle exists in the second and third regions will be described.

FIGS. 32 and 35 each illustrate an example in which the direction angle is 40°, and exists in the second region. The control unit 20 may align the lower wheels DW through the first rule, such that straight lines connecting the reference point CPC to the center points of the respective lower wheels DW (i.e. three lower wheels DW) are perpendicular to the major axes of the respective lower wheels DW, respectively. Furthermore, the control unit 20 may align the upper wheel UW through the second rule, such that the major axis of the upper wheel UW and a straight line connecting the reference point CPC to the center point of the upper wheel UW (i.e. the other one upper wheel UW) are located on the same line.

FIGS. 33 and 36 each illustrate an example in which the direction angle is 80°, and exists in the third region. The control unit 20 may align the lower wheels DW through the first rule, such that straight lines connecting the reference point CPC to the center points of the respective lower wheels DW (i.e. two lower wheels DW) are perpendicular to the major axes of the respective lower wheels DW, respectively. Furthermore, the control unit 20 may align the upper wheels UW through the second rule, such that the major axes of the upper wheels UW and straight lines connecting the reference point CPC to the center points of the respective upper wheels UW (i.e. the other two upper wheels UW) are located on the same lines, respectively.

The above-described braking process through the steering control and alignment for the wheels may suppress the vehicle from moving in the vertical and horizontal directions of the vehicle on the slope way S, and effectively maintain the parking and stopping state of the vehicle.

Figure 37:
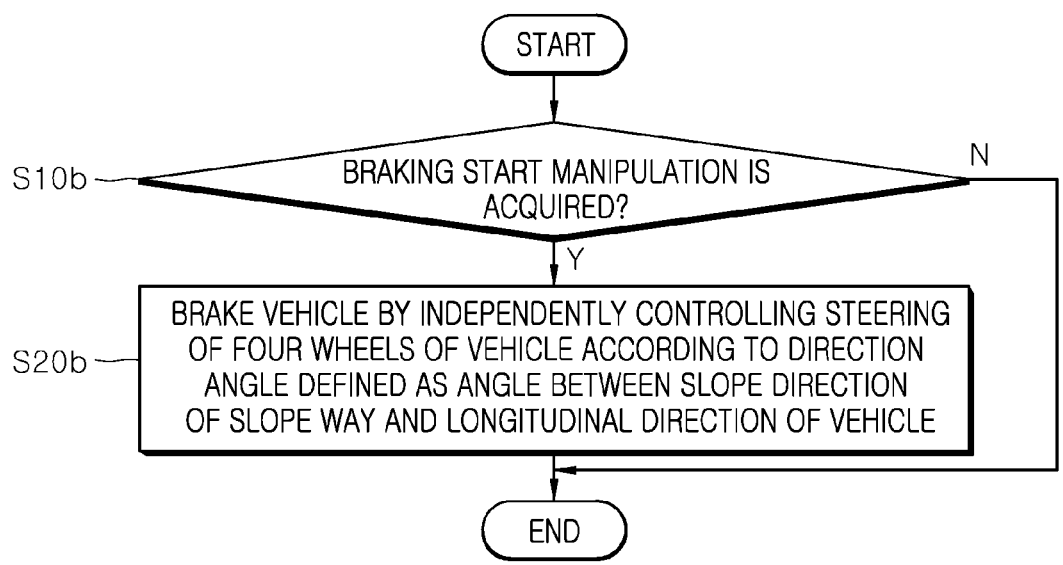
FIG. 37 is a flowchart for describing an operation method of the corner module apparatus for a vehicle in accordance with the embodiment of the present disclosure, based on the second application (braking mechanism through individual steering).

FIG. 37 is a flowchart for describing an operation method in the second application of the corner module apparatus for a vehicle in accordance with the embodiment of the present disclosure. Referring to FIG. 37, the operation method of the corner module apparatus for a vehicle in accordance with the embodiment of the present disclosure will be described. Hereafter, the detailed descriptions of contents overlapping the above-described contents will be omitted herein, and the following descriptions will be focused on a time series configuration.

First, the control unit 20 determines whether a braking start manipulation for a vehicle by a driver was acquired, through the braking start manipulation acquisition unit 13, in step S10b.

Then, when the braking start manipulation was acquired while the vehicle is located on the slope way S, the control unit 20 brakes the vehicle by independently controlling the steering of the four wheels of the vehicle according to the direction angle defined as an angle between the slope direction of the slope way S and the longitudinal direction of the vehicle, in step S20b.

In step S20b, the control unit 20 aligns the four wheels by applying the first and second rules to lower wheels DW located at a lower position of the slope way S and upper wheels UW located at a higher position of the slope way S, respectively, among the four wheels of the vehicle. At this time, the lower wheels DW and the upper wheels UW may be defined on the basis of the direction angle. Thus, when the direction angle exists in the first or third region, the lower wheels DW may be defined as two wheels located at a lower position on the slope way S, among the four wheels of the vehicle, and the upper wheels UW may be defined as the other two wheels located at a higher position on the slope way S, among the four wheels of the vehicle. Furthermore, when the direction angle exists in the second region, the lower wheels DW may be defined as three wheels located at lower positions on the slope way S, among the four wheels of the vehicle, and the upper wheel UW may be defined as the other one wheel located at a higher position on the slope way S, among the four wheels of the vehicle.

The first rule may be defined as a rule for restricting the vehicle from moving in the slope direction, and the second rule may be defined as a rule for restricting the vehicle from moving in a direction perpendicular to the slope direction on the slope way S. The first and second rules may be preset in the control unit 20. Specifically, when a point spaced by a preset distance apart from the gravity center GC of the vehicle in the reverse direction to the slope direction is defined as the reference point CPC, the first rule is defined as a rule for aligning the lower wheels DW such that straight lines connecting the reference point CPC to the center points of the lower wheels DW are perpendicular to the major axes of the lower wheels DW, respectively, and the second rule is defined as a rule for aligning the upper wheels UW such that the major axes of the upper wheels UW and straight lines connecting the reference point CPC to the center points of the upper wheels UW are located on the same lines, respectively. Thus, in step S20, the control unit 20 aligns the lower wheels DW through the first rule, such that straight lines connecting the reference point CPC to the center points of the lower wheels DW are perpendicular to the major axes of the lower wheels DW, respectively, and aligns the upper wheels UW through the second rule, such that the major axes of the upper wheels UW and straight lines connecting the reference point CPC to the center points of the upper wheels UW are located on the same lines, respectively.

According to the second application, it is possible to control the alignments of the four wheels by independently controlling the steering of the four wheels, thereby safely braking the vehicle regardless of whether the vehicle is powered on/off.

3. Third Application: Posture Control Mechanism for Improving Straight Driving Performance In the case of an existing vehicle with an internal combustion engine structure, a driving force is transferred through engine-drive shaft-differential-axle shaft. In the case of the four-wheel independent driving method premised in the present embodiment, the respective wheels are individually and independently driven with no axle shaft. Thus, a speed difference may occur between the respective wheels. The speed difference between the respective wheels is a risk factor which may cause a spin or turnover of the vehicle while the vehicle goes straight. Thus, the third application suggests a method capable of improving the straight driving performance of the vehicle, in a driving control aspect of wheels, not a mechanical or additional steering control aspect of a vehicle For this method, the control unit 20 may detect an abnormal wheel which causes the degradation in straight driving performance of the vehicle, on the basis of four wheel velocities acquired by the wheel velocity acquisition unit 14, calculate a compensation parameter for compensating for deviations between the respective wheel velocities, on the basis of the wheel velocity of the detected abnormal wheel, decide target driving torque for driving the abnormal wheel on the basis of the calculated compensation parameter, and then control the driving of the abnormal wheel through the decided target driving torque. Hereafter, the operation method in accordance with the present embodiment will be described in detail for each operation of the control unit 20.

First, in order to detect the abnormal wheel, the control unit 20 may calculate a first average value of the four wheel velocities, and determine whether differences between the calculated first average value and the respective wheel velocities are equal to or greater than a preset threshold value. When the wheel velocities of the left front wheel, the right front wheel, the left rear wheel and the right rear wheel of the vehicle are represented by $V_{fl}$, $V_{fr}$, $V_{rl}$ and $V_{rr}$, respectively, the first average value $V_{avg}$ may be expressed as $(V_{fl}+V_{fr}+V_{rl}+V_{rr})/4$, and an abnormal wheel detection method may be expressed as a condition expression of "$V_{avg}-V_i \geq$threshold value, where i=fl, fr, rl, rr". For example, when a wheel satisfying the above conditional expression corresponds to the left front wheel fl, the left front wheel may be specified as the abnormal wheel. When a plurality of wheels satisfy the conditional expression, the wheel having the lowest wheel velocity among the plurality of wheels may be specified as the abnormal wheel. Thus, a wheel which has a lower wheel velocity by a predetermined value or more than the other wheels when the vehicle goes straight and thus degrades the straight driving performance of the vehicle is specified as the abnormal wheel. In the conditional expression, the threshold value may be defined as a different value depending on the first average value. For example, the threshold value may be defined as a larger value as the first average value increases. Thus, in a high-velocity region, an abnormal wheel may be decided according to the more reinforced standards for the driving stability of the vehicle.

When an abnormal wheel is detected, the control unit 20 may calculate a compensation parameter for compensating deviations between the respective wheel velocities on the basis of the wheel velocity of the detected abnormal wheel. The compensation of the deviations between the respective wheel velocities indicates reducing the deviations in wheel velocity between the abnormal wheel and the other wheels by increasing the driving torque of the abnormal wheel or increasing the wheel velocity of the abnormal wheel.

At this time, the control unit 20 may calculate a second average value of the wheel velocities of the three wheels excluding the abnormal wheel, and calculate the compensation parameter by using, as factors, a difference between the second average value and the wheel velocity of the abnormal wheel and a variable gain based on the second average value. In an example where the left front wheel is detected as the abnormal wheel, the second average value $V_{target}$ may be expressed as $(V_{fr}+V_{rl}+V_{rr})/3$, and the compensation parameter may be expressed as $\alpha^* V_{target}^*(V_{target}-V_{fl})$. In the expression of the compensation parameter, the second term $V_{target}$ functions as a target wheel velocity which is the following target, and the third term $V_{target}-V_{fl}$ functions as a term for considering the deviation between the wheel velocity of the abnormal wheel and the target wheel velocity in the compensation parameter calculation process. The first term $\alpha$ represents a variable gain, and functions as a scaling factor for scaling the magnitude of the compensation parameter.

Figure 38:
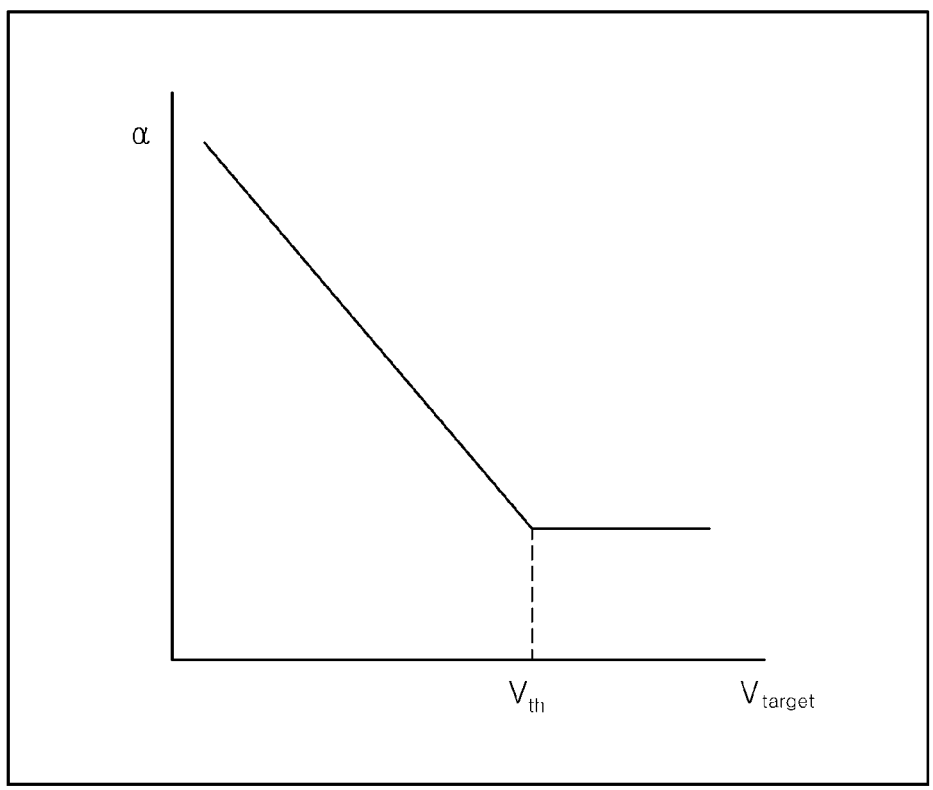
FIG. 38 is a diagram illustrating a method for deciding a variable gain in a third application (posture control mechanism for improving straight driving performance) of the corner module apparatus for a vehicle in accordance with the embodiment of the present disclosure.

As illustrated in FIG. 38, when the second average value Vtarget is located in a predetermined middle-low velocity region (e.g. a region where the second average value Vtarget is equal to or lower than a predetermined threshold velocity Vth), the variable gain may be decided as a value that decreases as the second average value increases. On the other hand, when the second average value Vtarget is located in a predefined high-velocity region (e.g. a region where the second average value Vtarget exceeds the predetermined threshold velocity Vth), the variable gain may be decided as a predefined fixed value. That is, when the compensation parameter functioning as a value for compensating for the driving torque of the abnormal wheel is calculated as a smaller value as the second average value Vtarget functioning as the target wheel velocity increases, the compensation parameter does not rapidly change the current driving control state of the vehicle, and is suitable for securing the driving stability of the vehicle. If the second average value Vtarget exceeds the threshold value, the compensator parameter may be calculated as the lowest value (i.e. the above-described fixed value), which is suitable for maintaining the driving stability of the vehicle. Therefore, as illustrated in FIG. 38, the control unit 20 may calculate the compensation parameter which has a different value depending on the second average value.

When the compensation parameter is calculated, the control unit 20 may decide the target driving torque for driving the abnormal wheel on the basis of the calculated compensation parameter. In this case, the control unit 20 may decide the target driving torque by applying the compensation parameter to the current driving torque (i.e. existing driving torque) for driving the abnormal wheel (that is, target driving torque=current driving torque*compensation parameter). Then, the control unit 20 may control the driving of the abnormal wheel through the target driving torque decided through the above-described method. As the driving torque for driving the abnormal wheel is increased more than the existing driving torque, the straight driving performance of the vehicle may be improved.

The control unit 20 may recalculate the first average value of the four wheel velocities while controlling the driving of the abnormal wheel through the target driving torque. When the difference between the recalculated first average value and the wheel velocity of the abnormal wheel is equal to or greater than the threshold value, the control unit 20 may output an alarm through the output unit 30. That is, the control unit 20 may determine whether the straight driving performance of the vehicle has been improved, by determining whether the difference between the recalculated first average value and the wheel velocity of the abnormal wheel is less than the threshold value. When it is determined that the deviation between the recalculated first average value and the wheel velocity of the abnormal wheel is equal to or more than the threshold value even though the control unit 20 calculated the target driving torque through the above-described process and controlled the driving of the abnormal wheel, it indicates that a risk element such as a spin or turnover of the vehicle exists, because the deviation in wheel velocity between the respective wheels is still equal to or more than the threshold value. Therefore, the control unit 20 may output an alarm through the output unit 30 such that a driver can recognize the corresponding situation.

Figure 39:
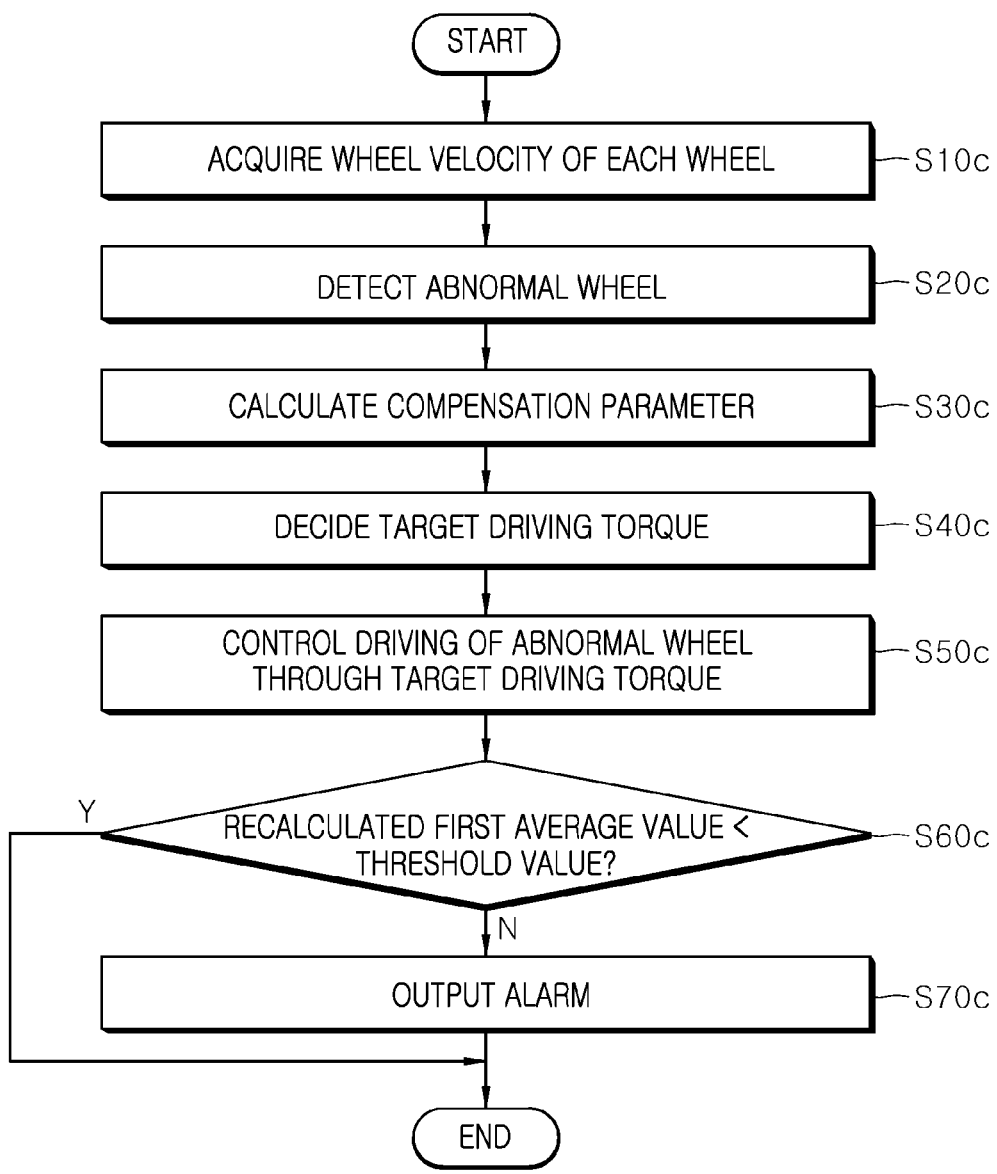
FIG. 39 is a flowchart for describing an operation method of the corner module apparatus for a vehicle in accordance with the embodiment of the present disclosure, based on the third application (posture control mechanism for improving straight driving performance).

FIG. 39 is a flowchart for describing an operation method of the corner module apparatus for a vehicle in accordance with the embodiment of the present disclosure, based on the third application. Referring to FIG. 39, the operation method of the corner module apparatus for a vehicle in accordance with the embodiment of the present disclosure will be described. Hereafter, the detailed descriptions of contents overlapping the above-described contents will be omitted herein, and the following descriptions will be focused on a time series configuration.

First, the control unit 20 acquires four wheel velocities of the vehicle through the wheel velocity acquisition unit 14 in step S10c.

Then, in step S20c, the control unit 20 detects an abnormal wheel that causes the degradation in straight driving performance of the vehicle, on the basis of the four wheel velocities acquired in step S10c. In step S20c, the control unit 20 may calculate the first average value of the four wheel velocities, and determine whether a difference between the calculated first average value and the respective wheel velocities is equal to or greater than the preset threshold value, in order to detect the abnormal wheel.

Then, the control unit 20 calculates the compensation parameter for compensating for the deviation between the respective wheel velocities on the basis of the wheel velocity of the abnormal wheel, detected in step S20c, in step S30c. In step S30c, the control unit 20 calculates the second average value of the wheel velocities of the three wheels except the abnormal wheel, and calculates the compensation parameter by using, as factors, a difference between the calculated second average value and the wheel velocity of the abnormal wheel, a variable gain based on the second average value, and the second average value. The variable gain is decided as a value that decreases as the second average value increases, when the second average value is located in a predefined middle-low velocity region, and decided as a predefined fixed value when the second average value is located in a predetermined high velocity region.

Then, the control unit 20 decides target driving torque for driving the abnormal wheel, on the basis of the compensation parameter calculated in step S30c, in step S40c. Specifically, the control unit 20 decides the target driving torque by applying the compensation parameter to the current driving torque for driving the abnormal wheel.

Then, the control unit 20 controls the driving of the abnormal wheel through the target driving torque decided in step S40c, in step S50c. The other wheels except the abnormal wheel are controlled according to the existing driving torque.

The control unit 20 recalculates the first average value of the four wheel velocities, and compares a difference between the recalculated first average value and the wheel velocity of the abnormal wheel to the threshold value in step S60c. When it is determined in step S60c that the difference between the recalculated first average value and the wheel velocity of the abnormal wheel is equal to or more than the threshold value, the control unit 20 outputs an alarm through the output unit 30 in step S70c.

According to the third application, it is possible to compensate for the deviation between the respective wheel velocities only through the driving torque control for the wheels without a mechanical or additional steering control of the vehicle, thereby improving the straight driving performance of the vehicle.

4. Fourth Application: Posture Control Mechanism for Removing Slip

The existing forward wheel drive vehicle has a limitation in that the battery consumption of the vehicle is increased because the posture control of the vehicle is performed through electronic control systems such as ABS (Anti-lock Brake System), ESP (Electronic Stability Program) and ECS (Electronic Controlled Suspension). In the present embodiment, since the four-wheel independent driving method is applied to independently control the driving of the respective wheels, the posture control of a vehicle can be performed through a method of controlling the driving and steering of the respective wheels, compared to a conventional vehicle posture control system. Hereafter, a specific configuration for performing the posture control of a vehicle by controlling the driving and steering of the respective wheels will be described focusing on the operation of the control unit 20.

In the fourth application, the control unit 20 determines whether a predefined slip condition is satisfied, on the basis of the wheel velocities of the respective wheels, acquired by the wheel velocity acquisition unit 14. When it is determined that the slip condition is satisfied, the control unit 20 may perform the vehicle posture control through a driving torque control process of controlling the driving torques of the respective wheels.

The slip condition indicates that a slip occurred in a wheel, and corresponds to a condition for determining whether posture control is required for the driving stability of the vehicle. In this case, the control unit 20 may calculate the slip rates of the respective wheels on the basis of the wheel velocities of the respective wheels, decide the maximum slip rate having a maximum value among the calculated slip rates of the respective wheels, and determine that the slip condition is satisfied when the decided maximum slip rate is equal to or more than a preset threshold value. As well known, the slip rate of each wheel may be calculated as the ratio of 'difference between vehicle velocity and wheel velocity' to 'vehicle velocity.'

When determining that the slip condition is satisfied, the control unit 20 may perform the vehicle posture control through the above-described driving torque control. In this case, the control unit 20 may control the driving of the wheels through the target driving torque having a lower value than the current driving torques of the respective wheels. The target driving torque may be decided as a value which is lower than the minimum value among the current driving torques of the respective wheels, which are currently applied to drive the wheels. That is, the control unit 20 may perform the control of reducing the driving torques of the wheels, in order to remove the current slips of the wheels, and the driving of the wheels may be controlled through the same target driving torque. At this time, as the maximum slip rate increases, the driving torque of the wheel needs to be reduced to a lower value in order to remove the slip. Thus, the target driving torque may be decided as a smaller value as the maximum slip rate increases. For example, the target driving torque and the maximum slip rate may be defined in the control unit 20 so as to have a negative linear relation.

After performing the driving torque control, the control unit 20 may determine whether the slip was removed through the driving torque control, by re-determining whether the slip condition is satisfied. When determining that the satisfaction of the slip condition is maintained or the slip is not removed, the control unit 20 may subsequently perform the steering control process for controlling the steering of the wheels, thereby performing the vehicle posture control.

The control unit 20 may perform the steering control by steering two wheels, located on the opposite side of the wheel having the maximum slip rate in the horizontal direction, by the target steering angle. For example, when the wheel having the maximum slip rate corresponds to the right front wheel, the control unit 20 may perform the steering control by steering the left front wheel and the left rear wheel by the target steering angle. In the above example, the steering control on the left front wheel and the left rear wheel may be performed to induce the braking effect of the vehicle, thereby removing the slip of the right front wheel. Therefore, the steering direction thereof may be any one of the left and the right. At this time, as the maximum slip rate increases, the steering angles of the two wheels located on the opposite side in the horizontal direction need to be increased, in order to remove the slip. Thus, the target steering angle may be decided as a larger value as the maximum slip rate increases. For example, the target steering angle and the maximum slip rate may be defined in the control unit 20 so as to have a positive linear relation. In order to prevent an unstable behavior of the vehicle, which may occur due to the rapid steering control on the two wheels on the opposite side in the horizontal direction, the control time required until the steering angles of the two wheels on the opposite side in the horizontal direction reach the target steering angle may be selected as a sufficient time based on an experimental result of the designer, and set in the control unit 20.

Figure 40:
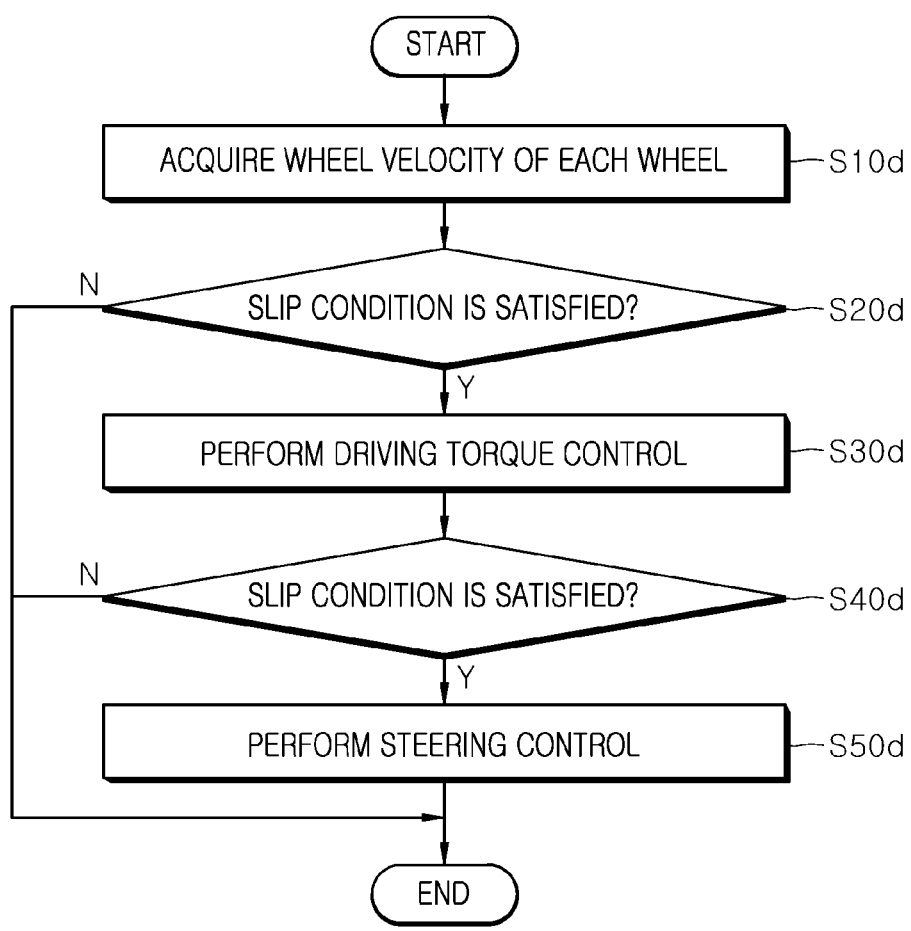
FIG. 40 is a flowchart for describing an operation method of the corner module apparatus for a vehicle in accordance with the embodiment of the present disclosure, based on a fourth application (posture control mechanism for removing slip).

FIG. 40 is a flowchart for describing an operation method the corner module apparatus for a vehicle in accordance with the embodiment of the present disclosure, based on the fourth application. Referring to FIG. 40, the operation method of the corner module apparatus for a vehicle in accordance with the embodiment of the present disclosure will be described. Hereafter, the detailed descriptions of contents overlapping the above-described contents will be omitted herein, and the following descriptions will be focused on a time series configuration.

First, the control unit 20 acquires wheel velocities of four wheels through the wheel velocity acquisition unit 14 in step S10d.

In step S20d, the control unit 20 determines whether the predefined slip condition is satisfied, on the basis of the wheel velocities of the respective wheels, acquired in step S10d. In step S20d, the control unit 20 calculates the slip rates of the respective wheels on the basis of the wheel velocities of the respective wheels, decides the maximum slip rate having a maximum value among the calculated slip rates of the respective wheels, and determines that the slip condition is satisfied, when the decided maximum slip rate is equal to or more than the preset threshold value.

When it is determined in step S20d that the slip condition is satisfied, the control unit 20 performs the vehicle posture control through the driving torque control process of driving the driving torques of the respective wheels, in step S30d. In step S30d, the control unit 20 may control the driving of the wheels through the target driving torque having a lower value than the current driving torques of the respective wheels. At this time, the target driving torque may be decided as a smaller value as the maximum slip rate increases.

After step S30d, the control unit 20 re-determines whether the slip condition is satisfied, in step S40d.

When it is determined in step S40d that the satisfied slip condition is maintained, the control unit 20 performs the vehicle posture control through a steering control process of controlling the steering of the wheels, in step S50d. In step S50d, the control unit 20 may steer the two wheels, located on the opposite side of the wheel having the maximum slip rate in the horizontal direction, by the target steering angle. At this time, the target steering angle may be decided as a larger value as the maximum slip rate increases.

Steps S40d and S50d may be repeatedly performed within a predetermined repetition number, until it is determined in step S40d that the slip condition is not satisfied or the slip is removed.

According to the fourth application, it is possible to remove the dependency on the existing vehicle posture control system, and perform the vehicle posture control only through the method of controlling the driving and steering of the wheels. Thus, it is possible to reduce the battery consumption required for the vehicle posture control, thereby improving the available battery capacity.

5. Fifth Application: Target Trajectory Generation and Following Control Mechanism In the four-wheel independent driving method, the wheels of the vehicle need to be independently controlled because the wheels are not mechanically connected to each other. In particular, in order to secure the driving stability of the vehicle during cornering, a quantitative control mechanism for steering control on each of the wheel needs to be provided. Thus, the fifth application suggests a method of independently controlling the steering of four wheels by differently calculating the target steering angles of the respective wheels, when a vehicle to which the four-wheel independent driving method is applied travels along a curved road having a predetermined curvature, or specifically when no slips occur in the respective wheels while the vehicle travels along a curved road at low velocity which is less than a preset velocity.

In the fifth application, the control unit 20 may calculate information on the distance to a target point to which the vehicle is to move, on the basis of driving state information and driving environment information which are acquired by the vehicle information acquisition unit 15, calculate a target curvature, defined as the curvature of a target trajectory to the target point, on the basis of the calculated distance information, calculate the target steering angles of the four wheels, respectively, on the basis of the calculated target curvature, and then independently control the steering of the four wheels according to the calculated target steering angles. Hereafter, the configuration in accordance with the present embodiment will be described in detail for each operation of the control unit 20.

First, the control unit 20 may calculate the information on the distance to the target point by using the vehicle velocity of the vehicle, an offset distance of the vehicle from the center (④ of FIG. 41) of the road, calculated from surrounding image information, and the curvature radius of the road based on the center of the road. The offset distance and the curvature radius of the road may be calculated through the analysis on the lane and the road, included in the surrounding image information. The distance information may include a straight distance from the current location (C of FIG. 41) of the vehicle to the target point (A of FIG. 41), a vertical distance and a horizontal distance.

Specifically, the control unit 20 may calculate the straight distance to the target point by applying the velocity of the vehicle to a predefined distance calculation algorithm. The distance calculation algorithm is an algorithm to calculate a straight distance that has a larger value as the vehicle velocity increases, and may be predefined in the control unit 20. For example, the distance calculation algorithm may be defined as a one-dimensional equation of (L=A*Vx+B) where L represents a straight distance, Vx represents a vehicle velocity, and A and B represent constant values which are designed on the basis of experimental results of the designer.

Figure 41:
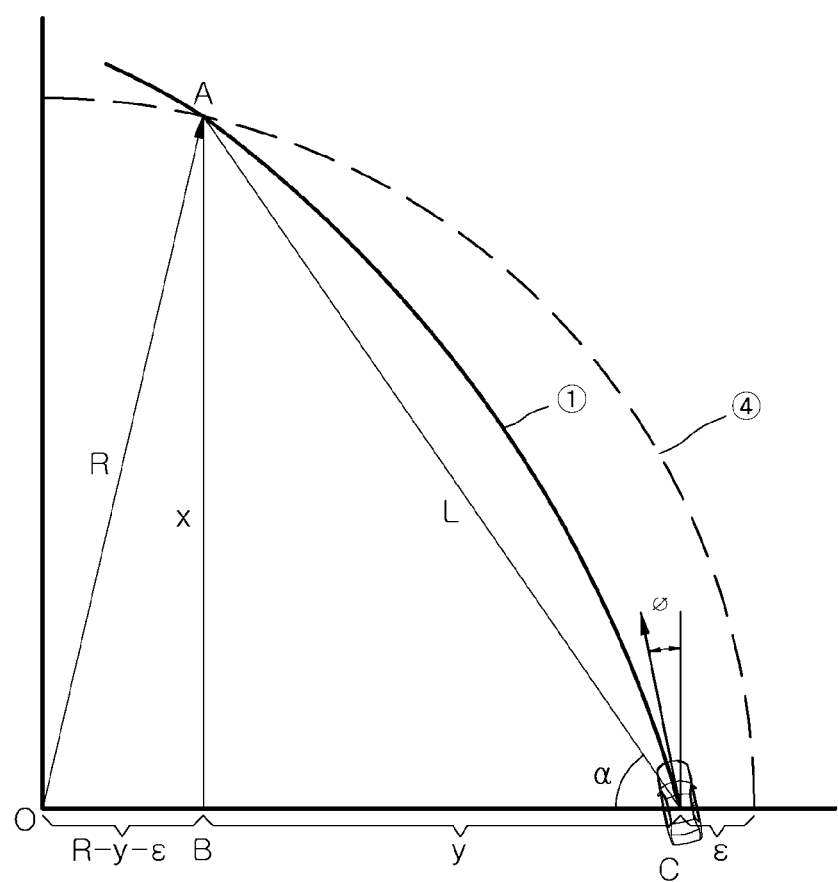
FIG. 41 is a diagram illustrating a process of calculating distance information and a center target curvature in a fifth application (target trajectory generation and following control mechanism) of the corner module apparatus for a vehicle in accordance with the embodiment of the present disclosure.

When the straight distance to the target point is calculated, the control unit 20 may calculate the vertical distance and the horizontal distance to the target point by using the offset distance, the heading angle of the vehicle, the curvature radius of the road, and the straight distance to the target point. Referring to FIG. 41, Equation 1 below may be induced.

$$R^2 = (R - y - \varepsilon)^2 + x^2 \quad (x^2 = L^2 - y^2) \quad \text{[Equation 1]}$$
$$\Rightarrow R^2 = R^2 + y^2 + \varepsilon^2 - 2Ry + 2y\varepsilon - 2\varepsilon R + L^2 - y^2$$
$$\Rightarrow 2y(R - \varepsilon) = \varepsilon^2 - 2\varepsilon R + L^2$$
$$\Rightarrow y = \frac{L^2 + \varepsilon^2 - 2\varepsilon R}{2(R - \varepsilon)} = \frac{\rho_k(L^2 + \varepsilon^2) - 2\varepsilon}{2(1 - \rho_k\varepsilon)}$$
$$\Rightarrow y = \frac{L^2 - \varepsilon^2 - 2\varepsilon(R - \varepsilon)}{2(R - \varepsilon)} = \frac{\rho_k(L^2 - \varepsilon^2)}{2(1 - \rho_k\varepsilon)} - \varepsilon$$

When Equation 1 is summarized with respect to x and y, Equation 2 below is established.

$$x = \sqrt{L^2 - y^2} \quad \text{[Equation 2]}$$
$$y = \frac{\rho_k(L^2 + \varepsilon^2) - 2\varepsilon}{2(1 - \rho_k\varepsilon)} = \frac{\rho_k(L^2 - \varepsilon^2)}{2(1 - \rho_k\varepsilon)} - \varepsilon$$

In Equations 1 and 2, L, x and y represent the straight distance, the vertical distance and the horizontal distance to the target point, respectively, R represents the curvature radius of the road, $\rho_k$ represents the curvature (1/R) of the road, and $\varepsilon$ represents the offset distance.

When the distance information to the target point is calculated as described above, the control unit 20 may calculate a target curvature defined as the curvature of the target trajectory to the target point, on the basis of the calculated distance information. In the present embodiment, the target curvature may be sorted into a center target curvature defined as the curvature of a target trajectory based on the center of the vehicle (i.e. the moving target trajectory of the center of the vehicle, indicated by ① in FIGS. 41 and 42), a left wheel target curvature defined as the curvature of a target trajectory based on the left wheel of the vehicle (i.e. the moving target trajectory of the left wheel of the vehicle, indicated by ② of FIG. 42), and a right wheel target curvature defined as the curvature of a target trajectory based on the right wheel of the vehicle (i.e. the moving target trajectory of the right wheel of the vehicle, indicated by ③ of FIG. 42). The control unit 20 may preferentially calculate the center target curvature, and then extend the center target curvature to the left wheel target curvature and the right wheel target curvature by using the tread information of the vehicle.

Figure 42:
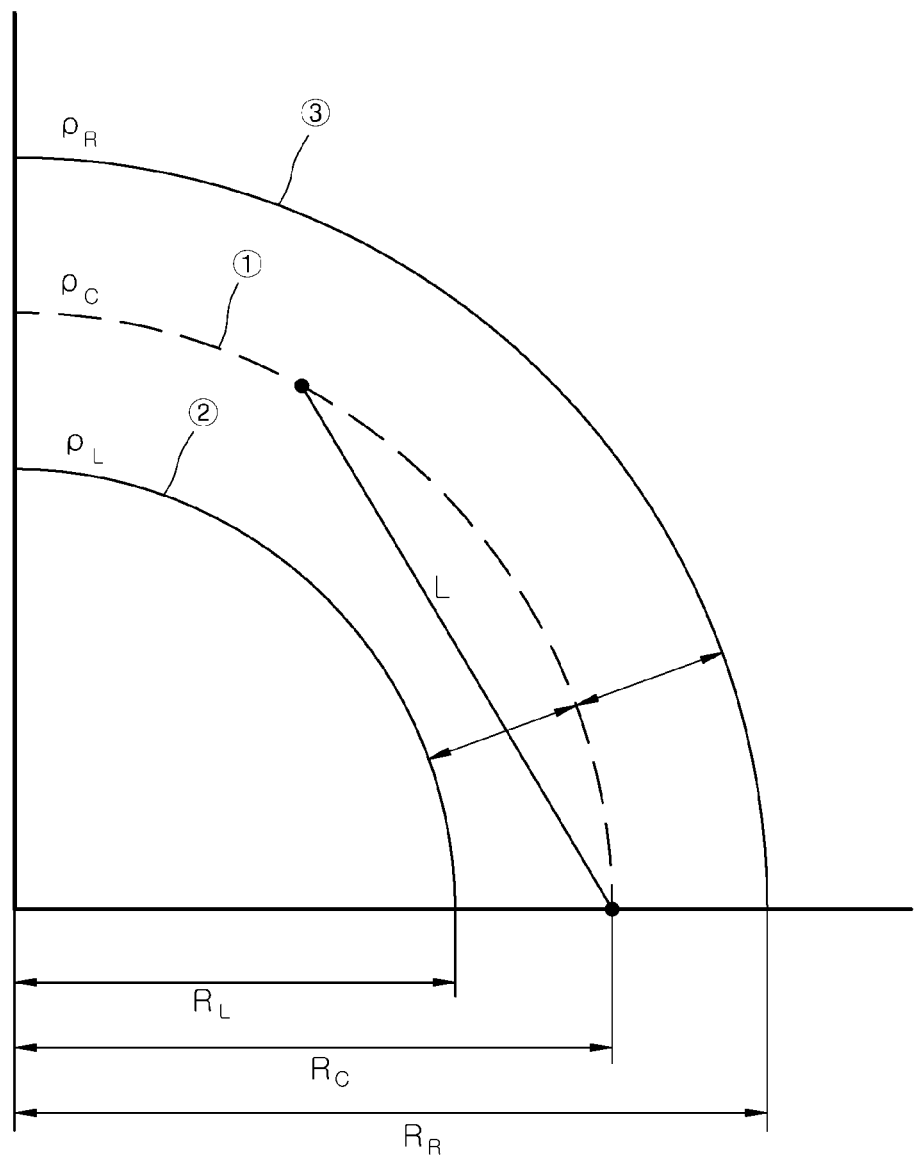
FIG. 42 is a diagram illustrating a process of calculating a left wheel target curvature and a right wheel target curvature in the fifth application (target trajectory generation and following control mechanism) of the corner module apparatus for a vehicle in accordance with the embodiment of the present disclosure.

Referring to FIGS. 41 and 42, the center target curvature may be calculated by Equation 3 below.

$$R_c \cos(\phi + \alpha) = \frac{R_c}{L}(y\cos\phi - x\sin\phi) = \frac{L}{2} \quad \text{[Equation 3]}$$
$$\rho_c = \frac{1}{R_c} = \frac{2}{L^2}(y\cos\phi - x\sin\phi)$$

In Equation 3, $R_c$ represents the curvature radius of the moving target trajectory of the center of the vehicle, $\varphi$ represents the heading angle of the vehicle, $\alpha$ represents the angle between the vehicle and the target point, L represents the straight distance to the target point, and $\rho_c$ represents the center target curvature (1/$R_c$).

When the center target curvature is calculated, the control unit 20 may calculate the left wheel target curvature and the right wheel target curvature from the center target curvature by using the tread information of the vehicle. Referring to FIG. 42 illustrating an example in which the vehicle is cornering to the left, the left wheel target curvature and the right wheel target curvature may be calculated by Equations 4 and 5 below, respectively.

$$R_L = R_C - w_L \quad \text{[Equation 4]}$$
$$P_L = \frac{1}{R_L} = \frac{1}{R_C - w_L} = \frac{\rho_c}{1 - \rho_c w_L}$$
$$R_R = R_C + w_R \quad \text{[Equation 5]}$$

-continued $$\rho_R = \frac{1}{R_R} = \frac{1}{R_C + w_R} = \frac{\rho_c}{1 + \rho_c w_R}$$

In Equation 4, $R_L$ represents the curvature radius of the moving target trajectory of the left wheel of the vehicle, $R_C$ represents the curvature radius of the moving target trajectory of the center of the vehicle, $w_L$ represents a half of the tread value of the vehicle (w/2, w represents tread), and $\rho_L$ represents the left wheel target curvature. In Equation 5, $R_R$ represents the curvature radius of the moving target trajectory of the right wheel of the vehicle, RC represents the curvature radius of the moving target trajectory of the center of the vehicle, $w_R$ represents a half of the tread value of the vehicle (w/2), and $\rho_R$ represents the right wheel target curvature.

Through FIG. 42 and Equations 4 and 5, the case in which the vehicle is cornering to the left has been described. When the vehicle is cornering to the right, the left wheel target curvature and the right wheel target curvature are calculated by Equation 6 below because the inner wheels and the outer wheels are set in the opposite way.

$$\rho_L = \frac{\rho_c}{1 + \rho_c w_L} \quad \text{[Equation 6]}$$

$$\rho_R = \frac{\rho_c}{1 - \rho_c w_R}$$

When the left wheel target curvature and the right wheel target curvature are calculated, the control unit 20 may calculate the target steering angles of the respective four wheels on the basis of the calculated target curvatures.

Specifically, the target yaw rates of the left wheel and the right wheel may be expressed as in Equation 7 below, on the basis of the calculated left wheel target curvature and the calculated right wheel target curvature.

$$YR_{des,L} = \rho_L v_x$$

$$YR_{des,R} = \rho_R v_x \quad \text{[Equation 7]}$$

In Equation 7, $YR_{des,L}$ represents the target yaw rate of the left wheel, $\rho_L$ represents the left wheel target curvature, $YR_{des,R}$ represents the target yaw rate of the right wheel, $\rho_R$ represents the right wheel target curvature, and $v_x$ represents vehicle velocity.

Figure 43:
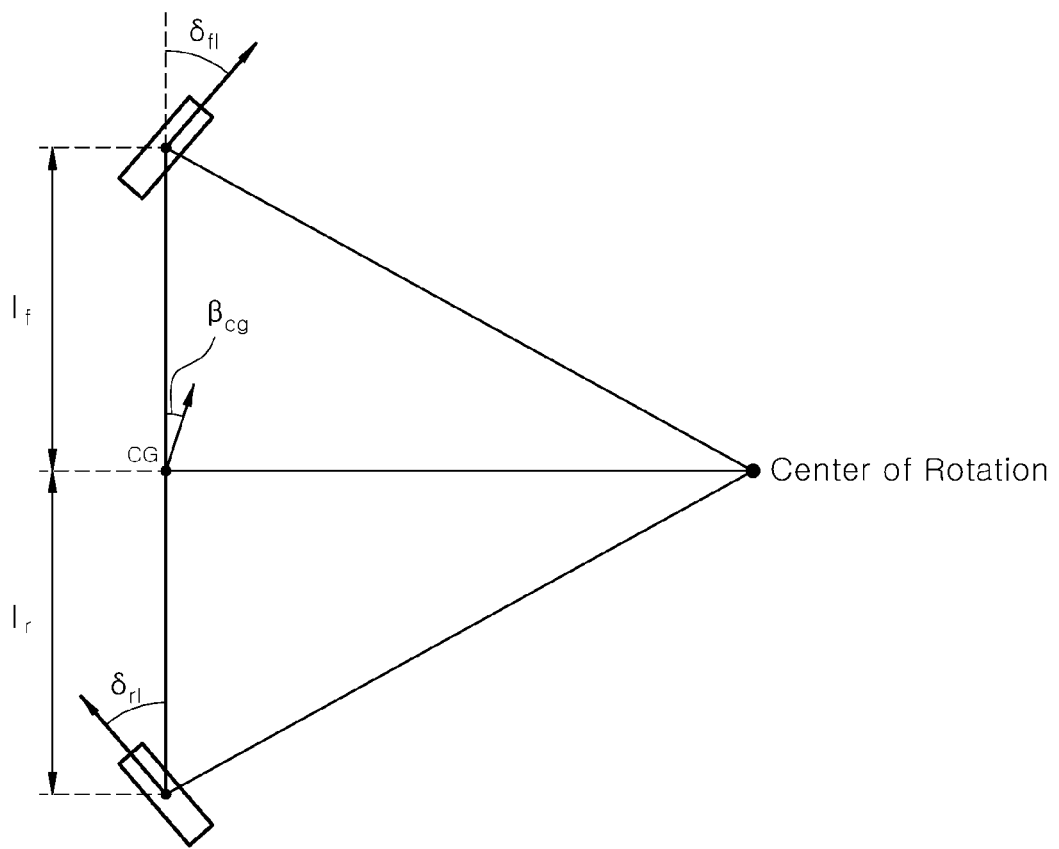
FIG. 43 is a diagram illustrating a process of calculating a target steering angle in the fifth application (target trajectory generation and following control mechanism) of the corner module apparatus for a vehicle in accordance with the embodiment of the present disclosure.

FIG. 43 illustrates an example of a vehicle dynamics model having a degree of freedom. For convenience of description, FIG. 43 illustrates only the front and rear left wheels. According to the vehicle dynamics model of FIG. 43, the slip angles of the respective wheels may be expressed by Equation 8 below.

$$\alpha_{fl} = \delta_{fl} - \frac{\beta_{cg} v_x + l_f YR_{des,L}}{v_x} \quad \text{[Equation 8]}$$

$$\alpha_{fr} = \delta_{fr} - \frac{\beta_{cg} v_x + l_f YR_{des,R}}{v_x}$$

$$\alpha_{rl} = \delta_{rl} - \frac{\beta_{cg} v_x - l_r YR_{des,L}}{v_x}$$

$$\alpha_{rr} = \delta_{rr} - \frac{\beta_{cg} v_x - l_r YR_{des,R}}{v_x}$$

In Equation 8, $\alpha_{fl}$, $\alpha_{fr}$, $\alpha_{rl}$ and $\alpha_{rr}$ represent the slip angle of the left front wheel, the slip angle of the right front wheel, the slip angle of the left rear wheel, and the slip angle of the right rear wheel, respectively, $\beta_{cg}$ represents the slip angle of the center of the vehicle, $v_x$ represents the vehicle velocity, $l_f$ represents the distance between the front wheel axle and the center cg of the vehicle, $l_r$ represents the distance between the rear wheel axle and the center cg of the vehicle, $YR_{des,L}$ and $YR_{des,R}$ represent the target yaw rates of the left and right wheels, respectively, and $\delta_{fl}$, $\delta_{fr}$, $\delta_{rl}$ and $\delta_{rr}$ represent the target steering angle of the left front wheel, the target steering angle of the right front wheel, the target steering angle of the left rear wheel, and the target steering angle of the right rear wheel, respectively, which are calculation targets.

As described above, the present embodiment is premised on the case in which the vehicle corners at low velocity and no slips occur in the respective wheels. Thus, in Equation 8, $\alpha_{fl}$, $\alpha_{fr}$, $\alpha_{rl}$, $\alpha_{rr}$ and $\beta_{cg}$ may be approximated to 0, and the target steering angle of the left front wheel, the target steering angle of the right front wheel, the target steering angle of the left rear wheel, and the target steering angle of the right rear wheel may be calculated by Equation 9 below.

$$\delta_{fl} = \frac{l_f YR_{des,L}}{v_x} = l_f \rho_L \quad \text{[Equation 9]}$$

$$\delta_{fr} = \frac{l_f YR_{des,R}}{v_x} = l_f \rho_R$$

$$\delta_{rl} = -\frac{l_r YR_{des,L}}{v_x} = -l_r \rho_L$$

$$\delta_{rr} = -\frac{l_r YR_{des,R}}{v_x} = -l_r \rho_R$$

The above-described case indicates the process of calculating the target steering angles in a state in which the front wheel and the rear wheel are out of phase. The target steering angles in a state in which the front wheel and the rear wheel are in phase may be calculated through the following process.

First, the vehicle dynamics model in a state in which the front wheel and the rear wheel are in phase may be expressed by Equation 10 below.

$$\frac{d}{dt}\begin{bmatrix}\beta \\ \Psi\end{bmatrix} = \begin{bmatrix}a_{11} & a_{12} \\ a_{21} & a_{22}\end{bmatrix}\begin{bmatrix}\beta \\ \Psi\end{bmatrix} + \begin{bmatrix}b_{11} & b_{12} \\ b_{21} & b_{22}\end{bmatrix}\begin{bmatrix}\delta_f \\ \delta_r\end{bmatrix} \quad \text{[Equation 10]}$$

where $$a_{11} = -\frac{C_f + C_r}{mv_x} \quad a_{12} = -1 - \frac{C_f l_f - C_r l_r}{mv_x^2}$$

$$a_{21} = -\frac{C_f l_f - C_r l_r}{I} \quad a_{22} = -\frac{C_f l_f^2 - C_r l_r^2}{I}$$

$$b_{11} = \frac{C_f}{mv_x} \quad b_{12} = \frac{C_r}{mv_x}$$

$$b_{21} = \frac{C_f l_f}{I} \quad b_{22} = \frac{C_r l_r}{I}$$

In Equation 10, $\beta$ and $\Psi$ represent the slip angle and direction angle of the center of the vehicle, respectively, and factors defining a matrix parameter are shown in Table 2 below.

TABLE 2

| | |
|---|---|
| $v_x$ | Vehicle speed |
| m | Vehicle mass |
| I | Yaw moment of Inertia |
| $l_f$ | Distance from front axle to center of gravity |
| $l_r$ | Distance from rear axle to center of gravity |
| $C_f$ | Front cornering coefficient |
| $C_r$ | Rear cornering coefficient |

Since Equation 10 is premised on the case in which the slip angle of the vehicle is 0, the left side of Equation 10 and β become 0, thereby inducing Equation 11.

$$\begin{bmatrix} \beta \\ \Psi \end{bmatrix} = \begin{bmatrix} a_{11} & a_{12} \\ a_{21} & a_{22} \end{bmatrix}^{-1} \begin{bmatrix} b_{11} & b_{12} \\ b_{21} & b_{22} \end{bmatrix} \begin{bmatrix} \delta_f \\ \delta_r \end{bmatrix} = \begin{bmatrix} \dfrac{-a_{22}b_{11} + a_{12}b_{21}}{a_{11}a_{22} - a_{12}a_{21}} & \dfrac{-a_{22}b_{12} + a_{12}b_{22}}{a_{11}a_{22} - a_{12}a_{21}} \\ \dfrac{a_{21}b_{11} - a_{11}b_{21}}{a_{11}a_{22} - a_{12}a_{21}} & \dfrac{a_{21}b_{12} - a_{11}b_{22}}{a_{11}a_{22} - a_{12}a_{21}} \end{bmatrix} \begin{bmatrix} \delta_f \\ \delta_r \end{bmatrix}$$

[Equation 11]

Under the condition of β=0, the relationship between $\delta_f$ and $\delta_r$ is derived as in Equation 12 below.

$$\delta_r = \frac{-l_r + [ml_f/C_r(l_f + l_r)]v_x^2}{l_f + [ml_r/C_f(l_f + l_r)]v_x^2} \delta_f$$

[Equation 12]

The target steering angle of the left front wheel and the target steering angle of the right front wheel are calculated by Equation 9 above, and the target steering angle of the left rear wheel and the target steering angle of the right rear wheel are calculated according to the relationship with Equation 12. Thus, the target steering angle of the left front wheel, the target steering angle of the right front wheel, the target steering angle of the left rear wheel, and the target steering angle of the right rear wheel in the in-phase state may be calculated by Equation 13 below.

$$\delta_{fl} = \frac{l_f YR_{des,L}}{v_x} = l_f \rho_L$$

$$\delta_{fr} = \frac{l_f YR_{des,R}}{v_x} = l_f \rho_R$$

$$\delta_{rl} = \frac{-l_r + [ml_f/C_r(l_f + l_r)]v_x^2}{l_f + [ml_r/C_f(l_f + l_r)]v_x^2} \cdot (l_f \rho_L)$$

$$\delta_{rr} = \frac{-l_r + [ml_f/C_r(l_f + l_r)]v_x^2}{l_f + [ml_r/C_f(l_f + l_r)]v_x^2} \cdot (l_f \rho_R)$$

[Equation 13]

As a result, the control unit 20 may calculate the target steering angle of the left front wheel by using the distance between the front wheel axle and the center of the vehicle and the left wheel target curvature, calculate the target steering angle of the right front wheel by using the distance between the front wheel axle and the center of the vehicle and the right wheel target curvature, calculate the target steering angle of the left rear wheel by using the distance between the rear wheel axle and the center of the vehicle and the left wheel target curvature, and calculate the target steering angle of the right rear wheel by using the distance between the rear wheel axle and the center of the vehicle and the right wheel target curvature, on the basis of the predefined vehicle dynamics model.

Figure 44:
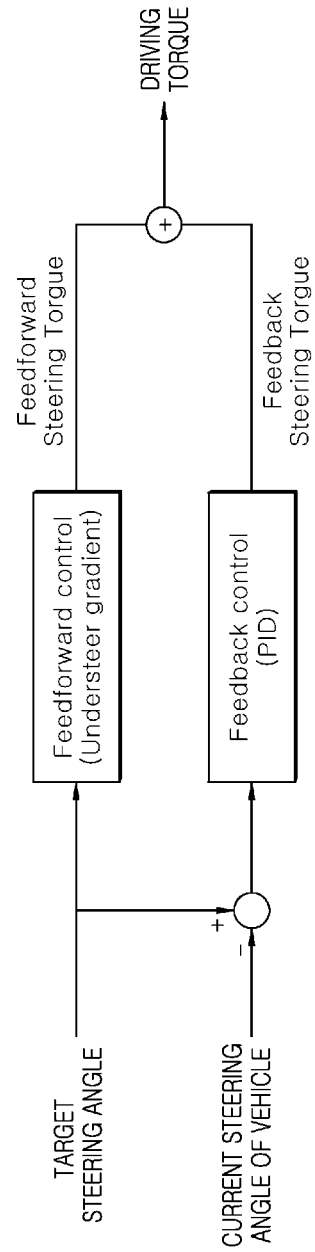
FIG. 44 is a block configuration diagram illustrating a method for independently controlling steering of wheels in the fifth application (target trajectory generation and following control mechanism) of the corner module apparatus for a vehicle in accordance with the embodiment of the present disclosure.

When the target steering angles of the respective wheels are calculated, the control unit 20 may independently control the steering of the four wheels according to the calculated target steering angles. In this case, as illustrated in FIG. 44, the control unit 20 may calculate the driving torques for driving the four wheels through feedforward control (understeer gradient) and feedback control (PID control) on the target steering angle and the current steering angle of the vehicle, and control the driving of the four wheels, thereby independently controlling the steering of the four wheels.

Figure 45:
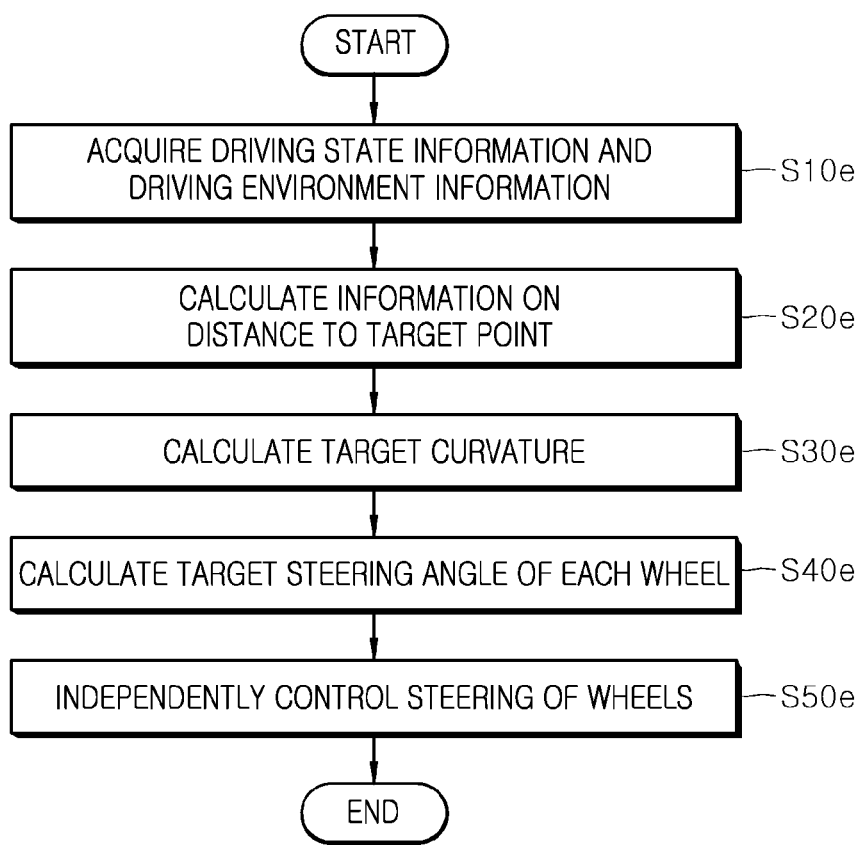
FIG. 45 is a flowchart for describing an operation method of the corner module apparatus for a vehicle in accordance with the embodiment of the present disclosure, based on the fifth application (target trajectory generation and following control mechanism).

FIG. 45 is a flowchart for describing an operation method of the corner module apparatus for a vehicle in accordance with the embodiment of the present disclosure, based on the fifth application. Referring to FIG. 45, the operation method of the corner module apparatus for a vehicle in accordance with the embodiment of the present disclosure will be described. Hereafter, the detailed descriptions of contents overlapping the above-described contents will be omitted herein, and the following descriptions will be focused on a time series configuration.

First, the control unit 20 acquires the driving state information and the driving environment information of the vehicle from the vehicle information acquisition unit 15 in step S10e. The driving state information may include the vehicle velocity and the heading angle of the vehicle, and the driving environment information may include surrounding image information (e.g. forward image) of the vehicle.

Then, the control unit 20 calculates information on the distance to the target point to which the vehicle is to move, on the basis of the driving state information and the driving environment information of the vehicle, in step S20e. In step S20e, the control unit 20 calculates the straight distance, the vertical distance and the horizontal distance from the vehicle to the target point as the distance information to the target point, by using the velocity of the vehicle, an offset distance of the vehicle from the center of the road, calculated from the surrounding image information, and the curvature radius of the road based on the center of the road.

Then, the control unit 20 calculates a target curvature defined as the curvature of a target trajectory to the target point, on the basis of the distance information calculated in step S20e, in step S30e. The target curvature may be sorted into a center target curvature defined as the curvature of a target trajectory based on the center of the vehicle (i.e. the moving target trajectory of the center of the vehicle), a left wheel target curvature defined as the curvature of a target trajectory based on the left wheel of the vehicle (i.e. the moving target trajectory of the left wheel of the vehicle), and a right wheel target curvature defined as the curvature of a target trajectory based on the right wheel of the vehicle (i.e. the moving target trajectory of the right wheel of the vehicle). Thus, in step S30e, the control unit 20 calculates the center target curvature by using the straight distance, the vertical distance and the horizontal distance from the vehicle to the target point and the heading angle of the vehicle, and then calculates the left wheel target curvature and the right wheel target curvature from the center target curvature by using the tread information of the vehicle.

Then, the control unit 20 calculates the target steering angles of the four wheels of the vehicle on the basis of the target curvature calculated in step S30e, in step S40e. In step S40e, the control unit 20 calculates the target steering angle of the left front wheel by using the distance between the front wheel axle and the center of the vehicle and the left wheel target curvature, calculates the target steering angle of the right front wheel by using the distance between the front wheel axle and the center of the vehicle and the right wheel target curvature, calculates the target steering angle of the left rear wheel by using the distance between the rear wheel axle and the center of the vehicle and the left wheel target curvature, and calculates the target steering angle of the right rear wheel by using the distance between the rear wheel axle and the center of the vehicle and the right wheel target curvature, on the basis of the predefined vehicle dynamics model. In this case, the control unit 20 calculates the target steering angles of the respective four wheels under the condition that the slip angles of the respective wheels of the vehicle are 0.

Then, the control unit 20 independently controls the steering of the four wheels according to the target steering angles calculated in step S40e, in step S50e. In step S50e, the control unit 20 calculates the driving torques for driving the four wheels through the feedforward control and feedback control on the target steering angles and the current steering angle of the vehicle, and controls the driving of the four wheels, thereby independently controlling the steering of the four wheels.

According to the fifth application, it is possible to suggest the quantitative control mechanism which differently calculates the target steering angles of the respective wheels when the vehicle to which the four-wheel independent driving method is applied travels along a curved road, and independently controls the steering of the four wheels, thereby improving the cornering performance and the cornering stability of the vehicle.

The term "unit" used in this specification may include a unit implemented in hardware, software or firmware. For example, the term may be used interchangeably with the term such as logic, a logical block, a part or a circuit. The "unit" may become the minimum unit or a portion of a part configured as one component or configured to perform one or more functions. For example, in accordance with an embodiment, the "unit" may be implemented in the form of ASIC (Application-Specific Integrated Circuit). Furthermore, the embodiments described in this specification may be implemented with a method or process, a device, a software program, a data stream or a signal, for example. Although a feature is discussed only in a single context (for example, discussed only in a method), the discussed feature can be implemented in another type (for example, apparatus or program). An apparatus may be implemented in suitable hardware, software or firmware. The method can be implemented in a device such as a processor which generally refers to a processing device including a computer, a microprocessor, an integrated circuit or a programmable logic device, for example. The processor also includes a communication device, such as a computer, cellular phone, PDA (Personal Digital Assistant) and another device, which facilitates information communication between end users.

As disclosed above, a corner module apparatus for a vehicle, which can freely adjust the number and arrangement of wheels according to the purpose of a vehicle.

As disclosed above, various embodiments are directed to a corner module apparatus for a vehicle, which can independently control the operations of wheels.

As disclosed above, the corner module apparatus can adjust the number and arrangement of the first and second platforms according to the type and purpose of a vehicle, thereby improving the degree of freedom in design, and enabling mass production of various types of PBV vehicles.

As disclosed above, the control module apparatus can independently adjust the operations of the respective wheels such that the vehicle can stably travel according to the driving condition, and secure a wide range of steering angle.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

Therefore, the scope of the disclosure is defined not by the detailed description, but by the claims and their equivalents, and all variations within the scope of the claims and their equivalents are to be construed as being included in the disclosure.

What is claimed is:

1. A corner module apparatus for a vehicle, comprising:
    a driver configured to provide a driving force to a wheel of a vehicle;
    a suspension connected to the driver, and being configured to absorb shock transferred from a road surface; and
    a steering unit connected to the suspension, the steering unit rotatably installed under a frame module installed at a bottom of a vehicle body, and being configured to adjust a steering angle of the wheel,
    wherein the steering unit comprises:
        a steering body disposed to face a bottom surface of the frame module, and being configured to support the suspension unit; and
        a steering driver installed in the steering body, and being configured to rotatably support the steering body with respect to the frame module,
    wherein the steering driver comprises:
        a power generation module configured to receive power and generate a rotational force,
        a rotating module spaced apart from the power generation module, and being configured to rotate around the frame module based on the rotational force generated by the power generation module; and
        a power transmission module provided between the power generation module and the rotating module, and being configured to transmit the rotational force, generated by the power generation module, to the rotating module,
    wherein the power generation module revolves around the rotating module as the rotating module rotates around the frame module, the power generation module being further configured to rotate relative to the frame module.

2. The corner module apparatus of claim 1, wherein a center axis of the power generation module is disposed in parallel to a center axis of the rotating module.

3. The corner module apparatus of claim 1, wherein the rotating module comprises:
    a mounting unit fixed to the bottom surface of the frame module;
    an input shaft rotated by the rotational force received from the power transmission module;
    an output shaft rotatably supported by the mounting unit, and being configured to rotate the steering body around the mounting unit based on a rotation of the input shaft; and a reducer provided between the input shaft and the output shaft.

4. The corner module apparatus of claim 3, wherein a center axis of the rotating module is disposed on a same plane as a center plane of the wheel.

5. The corner module apparatus of claim 3, wherein the reducer comprises a strain wave gear.

6. The corner module apparatus of claim 3, wherein the steering driver further comprises a measurement module fixed to the mounting unit, and being configured to measure a rotation angle of the rotating module.

7. The corner module apparatus of claim 6, wherein the rotating module further comprises:
- a rotating module body installed to be rotatable relative to the mounting unit, and rotated with the output shaft; and
- a steering guide extended from the rotating module body, and being configured to rotate an inner diameter part of the measurement module in connection with a rotation of the rotating module body.

* * * * *